United States Patent
Lee et al.

(10) Patent No.: US 10,869,321 B2
(45) Date of Patent: *Dec. 15, 2020

(54) METHOD FOR OPERATING USER EQUIPMENT IN WIRELESS COMMUNICATION SYSTEM, AND DEVICE THEREFOR

(71) Applicant: LG ELECTRONICS INC., Seoul (KR)

(72) Inventors: Seungmin Lee, Seoul (KR); Suckchel Yang, Seoul (KR); Joonkui Ahn, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/586,847

(22) Filed: Sep. 27, 2019

(65) Prior Publication Data

US 2020/0029338 A1    Jan. 23, 2020

Related U.S. Application Data

(63) Continuation of application No. 15/543,176, filed as application No. PCT/KR2016/000310 on Jan. 12, 2016, now Pat. No. 10,433,318.

(Continued)

(51) Int. Cl.
*H04W 4/00* (2018.01)
*H04W 72/08* (2009.01)
(Continued)

(52) U.S. Cl.
CPC ....... *H04W 72/085* (2013.01); *H04J 11/0073* (2013.01); *H04L 1/00* (2013.01);
(Continued)

(58) Field of Classification Search
CPC . H04W 72/085; H04W 8/22; H04W 72/0446; H04W 48/10; H04W 48/16;
(Continued)

(56) References Cited

U.S. PATENT DOCUMENTS 8,494,454 B2    7/2013    McBeath et al.
8,842,622 B2    9/2014    Zhang et al.
(Continued)

FOREIGN PATENT DOCUMENTS

CN    102215586    10/2011
EP    2512050    10/2012
(Continued)

OTHER PUBLICATIONS

PCT International Application No. PCT/KR2016/000310, Written Opinion of the International Searching Authority dated Apr. 21, 2016, 4 pages.

(Continued)

*Primary Examiner* — Chuong T Ho
(74) *Attorney, Agent, or Firm* — Lee, Hong, Degerman, Kang & Waimey

(57) ABSTRACT

Provided are a method for operating user equipment (UE) having multiple serving cells set therefor in a wireless communication system and UE using the method. The method comprises: receiving a higher-level signal indicating a mapping between the values of the serving cell index (ServingCellID) of a serving cell and a carrier index field (CIF); and identifying the serving cell on the basis of the higher-level signal.

6 Claims, 17 Drawing Sheets

Related U.S. Application Data

(60) Provisional application No. 62/102,109, filed on Jan. 12, 2015, provisional application No. 62/112,739, filed on Feb. 6, 2015, provisional application No. 62/114,080, filed on Feb. 10, 2015, provisional application No. 62/115,159, filed on Feb. 12, 2015, provisional application No. 62/145,499, filed on Apr. 9, 2015, provisional application No. 62/148,705, filed on Apr. 16, 2015, provisional application No. 62/165,949, filed on May 23, 2015, provisional application No. 62/204,956, filed on Aug. 13, 2015, provisional application No. 62/232,430, filed on Sep. 24, 2015, provisional application No. 62/241,121, filed on Oct. 13, 2015, provisional application No. 62/251,665, filed on Nov. 5, 2015.

(51) Int. Cl.

| | | |
|---|---|---|
| *H04L 1/00* | (2006.01) | |
| *H04L 5/00* | (2006.01) | |
| *H04W 48/10* | (2009.01) | |
| *H04W 48/16* | (2009.01) | |
| *H04W 72/04* | (2009.01) | |
| *H04W 76/27* | (2018.01) | |
| *H04W 24/08* | (2009.01) | |
| *H04W 72/12* | (2009.01) | |
| *H04W 24/10* | (2009.01) | |
| *H04W 36/30* | (2009.01) | |
| *H04J 11/00* | (2006.01) | |
| *H04W 48/12* | (2009.01) | |
| *H04W 36/00* | (2009.01) | |
| *H04W 28/06* | (2009.01) | |

(52) U.S. Cl.
CPC .......... *H04L 1/0038* (2013.01); *H04L 1/0045* (2013.01); *H04L 1/0046* (2013.01); *H04L 1/0072* (2013.01); *H04L 5/00* (2013.01); *H04L 5/0053* (2013.01); *H04L 5/0094* (2013.01); *H04W 24/08* (2013.01); *H04W 24/10* (2013.01); *H04W 36/30* (2013.01); *H04W 48/10* (2013.01); *H04W 48/12* (2013.01); *H04W 48/16* (2013.01); *H04W 72/042* (2013.01); *H04W 72/0413* (2013.01); *H04W 72/1289* (2013.01); *H04W 76/27* (2018.02); *H04L 5/0007* (2013.01); *H04W 28/06* (2013.01); *H04W 36/0055* (2013.01); *H04W 36/0088* (2013.01); *H04W 72/1231* (2013.01)

(58) Field of Classification Search
CPC . H04W 72/0413; H04W 76/27; H04W 24/08; H04W 72/1289; H04W 24/10; H04W 36/30; H04W 72/042; H04W 48/12; H04W 36/0055; H04W 36/0088; H04W 72/1231; H04W 28/06; H04L 1/00; H04L 1/0045; H04L 1/0046; H04L 1/0072; H04L 5/00; H04L 1/0038; H04L 5/0053; H04L 5/0094; H04L 5/0007; H04L 5/0048; H04J 11/0069; H04J 2211/005; H04J 11/0073
USPC .................................................. 370/329, 330
See application file for complete search history.

(56) References Cited

U.S. PATENT DOCUMENTS

| | | | |
|---|---|---|---|
| 9,155,091 B2 | 10/2015 | Li et al. | |
| 9,363,797 B2* | 6/2016 | Freda | H04W 16/14 |
| 9,867,174 B2 | 1/2018 | Zhang et al. | |
| 10,123,316 B2* | 11/2018 | Freda | H04L 5/0092 |
| 10,433,318 B2* | 10/2019 | Lee | H04W 24/08 |
| 2009/0238091 A1 | 9/2009 | Kim | |
| 2011/0292891 A1 | 12/2011 | Hsieh et al. | |
| 2012/0021756 A1 | 1/2012 | Kwon et al. | |
| 2012/0051319 A1 | 3/2012 | Kwon et al. | |
| 2012/0176884 A1 | 7/2012 | Zhang et al. | |
| 2012/0176967 A1 | 7/2012 | Kim et al. | |
| 2012/0257552 A1 | 10/2012 | Chen et al. | |
| 2013/0155868 A1 | 6/2013 | Seo et al. | |
| 2013/0163543 A1 | 6/2013 | Freda et al. | |
| 2013/0194931 A1 | 8/2013 | Lee et al. | |
| 2013/0322307 A1 | 12/2013 | Yang et al. | |
| 2013/0336263 A1 | 12/2013 | Wang | |
| 2013/0336273 A1 | 12/2013 | Takeda et al. | |
| 2014/0018124 A1 | 1/2014 | Ahn et al. | |
| 2014/0086224 A1 | 3/2014 | Kwon | |
| 2014/0092836 A1 | 4/2014 | Park et al. | |
| 2014/0105164 A1 | 4/2014 | Moulsley et al. | |
| 2014/0140316 A1* | 5/2014 | Nagata | H04J 11/0053 370/329 |
| 2014/0233470 A1 | 8/2014 | Kim et al. | |
| 2014/0241220 A1 | 8/2014 | Choi et al. | |
| 2014/0241223 A1 | 8/2014 | Takeda et al. | |
| 2014/0269338 A1 | 9/2014 | Jung et al. | |
| 2014/0269600 A1 | 9/2014 | Lee et al. | |
| 2014/0301330 A1 | 10/2014 | Lee et al. | |
| 2014/0307693 A1 | 10/2014 | Feng et al. | |
| 2015/0063252 A1 | 3/2015 | Zhang et al. | |
| 2015/0110032 A1 | 4/2015 | Nagata et al. | |
| 2015/0249980 A1 | 9/2015 | You et al. | |
| 2015/0264667 A1 | 9/2015 | Lee et al. | |
| 2015/0341949 A1* | 11/2015 | Nagata | H04L 5/0098 370/329 |
| 2016/0006546 A1 | 1/2016 | Yi et al. | |
| 2016/0007373 A1 | 1/2016 | Davydov et al. | |
| 2017/0318565 A1 | 11/2017 | Golitschek Edler Von Elbwart et al. | |
| 2018/0027574 A1 | 1/2018 | Lee et al. | |
| 2018/0132215 A1 | 5/2018 | Zhang et al. | |

FOREIGN PATENT DOCUMENTS

| | | |
|---|---|---|
| EP | 2512051 | 10/2012 |
| EP | 2706692 | 3/2014 |
| EP | 2849512 | 3/2015 |
| JP | 2013255209 | 12/2013 |
| KR | 1020110082485 | 7/2011 |
| KR | 1020110134305 | 12/2011 |
| KR | 1020130021393 | 3/2013 |
| KR | 1020140032476 | 3/2014 |
| KR | 1020140088180 | 7/2014 |
| KR | 1020140115369 | 9/2014 |
| WO | 2010123257 | 10/2010 |
| WO | 2010134755 | 11/2010 |
| WO | 2011122825 | 10/2011 |
| WO | 2011122852 | 10/2011 |
| WO | 2012101811 | 8/2012 |
| WO | 2012148239 | 11/2012 |
| WO | 20113022451 | 2/2013 |
| WO | 2013055102 | 4/2013 |
| WO | 2013147532 | 10/2013 |
| WO | 2014027810 | 2/2014 |
| WO | 2014058236 | 4/2014 |
| WO | 2014065585 | 5/2014 |
| WO | 2014119919 | 8/2014 |
| WO | 2014157927 | 10/2014 |

OTHER PUBLICATIONS

Motorola, "Further details on Search space design for PDCCH with CIF," 3GPP TSG-RAN WG1 #62, R1-104703, Aug. 2010, 6 pages.
European Patent Office Application Serial No. 16737525.2 Search Report dated Sep. 17, 2018, 8 pages.
United States Patent and Trademark Office U.S. Appl. No. 15/542,369, Office Action dated Oct. 3, 2019, 10 pages.

(56) References Cited

OTHER PUBLICATIONS

United States Patent and Trademark Office U.S. Appl. No. 15/543,197, Office Action dated Jun. 22, 2018, 17 pages.
Japan Patent Office Application No. 2017-554226, Office Action dated Jun. 12, 2018, 2 pages.
European Patent Office Application Serial No. 16737524.5, Search Report dated Jul. 30, 2018, 8 pages.
Catt, "PDCCH design in LTE-A", 3GPP TSG RAN WG1 Meeting #60bis, R1-101755, Apr. 2010, 8 pages.
Catt, "PDCCH blind decoding in LTE-A", 3GPP TSG RAN WG1 Meeting #59bis, R1-100070, Jan. 2010, 6 pages.
PCT International Application No. PCT/KR2016/000312, International Search Report dated Apr. 21, 2016, 8 pages.
PCT International Application No. PCT/KR2016/000313, International Search Report dated Apr. 21, 2016, 4 pages.
PCT International Application No. PCT/KR2016/000308, International Search Report dated Apr. 21, 2016, 8 pages.
Korean Intellectual Property Office Application No. 10-2017-7018526, Office Action dated Mar. 8, 2019, 5 pages.
Korean Intellectual Property Office Application No. 10-2017-7018527, Office Action dated Mar. 8, 2019, 4 pages.
LG Electronics, "EPDCCH and PDSCH related issues for MTC", 3GPP TSG RAN WG1 Meeting #79, R1-144893, Nov. 2014, 5 pages.
ZTE, "General considerations on UE complexity reduction for LTE", 3GPP TSG RAN WG1 Meeting #78bis, R1-143805, Oct. 2014, 6 pages.
QUALCOMM, "Remaining details of search space and aggregation levels", 3GPP TSG RAN WG1 Meeting #70bis, R1-124448, Oct. 2012, 5 pages.
ZTE, "Discussion on mapping between CIF and Cell Index", 3GPP TSG RAN WG2 Meeting #71bis, R2-105339, Oct. 2010, 5 pages.
Asustek, "CIF presence and CIF value", 3GPP TSG RAN WG2 Meeting #71bis, R2-105761, Oct. 2010, 6 pages.
Texas Instruments, "Additional Details on Carrier Indication", 3GPP TSG RAN WG1 Meeting #59bis, R1-100448, Jan. 2010, 3 pages.
United States Patent and Trademark Office U.S. Appl. No. 15/542,369, Office Action dated Sep. 27, 2018, 17 pages.
United States Patent and Trademark Office U.S. Appl. No. 15/541,692, Office Action dated Jan. 11, 2019, 24 pages.
United States Patent and Trademark Office U.S. Appl. No. 15/543,197, Final Office Action dated Jan. 25, 2019, 24 pages.
United States Patent and Trademark Office U.S. Appl. No. 15/542,369, Final Office Action dated Feb. 11, 2019, 24 pages.
United States Patent and Trademark Office U.S. Appl. No. 15/543,176, Notice of Allowance dated May 16, 2019, 44 pages.
United States Patent and Trademark Office U.S. Appl. No. 15/543,176, Final Office Action dated Feb. 7, 2019, 19 pages.
United States Patent and Trademark Office U.S. Appl. No. 15/543,176, Office Action dated Sep. 19, 2018, 29 pages.
United States Patent and Trademark Office U.S. Appl. No. 16/575,184, Notice of Allowance dated Jan. 15, 2020, 56 pages.
The State Intellectual Property Office of the People's Republic of China Application Serial No. 201680005577, Office Action dated Mar. 5, 2020, 5 pages.
European Patent Office Application Serial No. 16737524.5, Office Action dated Jul. 17, 2019, 4 pages.
European Patent Office Application Serial No. 16737525.2, Office Action dated Sep. 28, 2020, 8 pages.

\* cited by examiner

| (E)PDCCH CANDIDATE #1 | (E)PDCCH CANDIDATE #2 | ... | (E)PDCCH CANDIDATE #P | ... | (E)PDCCH CANDIDATE #K-1 | (E)PDCCH CANDIDATE #K |

(E)PDCCH CANDIDATES on which UE actually performs BD

METHOD FOR OPERATING USER EQUIPMENT IN WIRELESS COMMUNICATION SYSTEM, AND DEVICE THEREFOR

CROSS-REFERENCE TO RELATED APPLICATIONS

This application is a continuation of U.S. patent application Ser. No. 15/543,176, filed on Jul. 12, 2017, now U.S. Pat. No. 10,433,318, which is the National Stage filing under 35 U.S.C. 371 of International Application No. PCT/KR2016/000310, filed on Jan. 12, 2016, which claims the benefit of U.S. Provisional Application No. 62/102,109, filed on Jan. 12, 2015, 62/112,739, filed on Feb. 6, 2015, 62/114,080, filed on Feb. 10, 2015, 62/115,159, filed on Feb. 12, 2015, 62/145,499, filed on Apr. 9, 2015, 62/148,705, filed on Apr. 16, 2015, 62/165,949, filed on May 23, 2015, 62/204,956, filed on Aug. 13, 2015, 62/232,430, filed on Sep. 24, 2015, 62/241,121, filed on Oct. 13, 2015, and 62/251,665, filed on Nov. 5, 2015, the contents of which are all hereby incorporated by reference herein in their entirety.

BACKGROUND OF THE INVENTION

Field of the Invention

The present invention relates to wireless communication and, more particularly, to a method for operating a user equipment (UE) in a wireless communication system and a device using the same.

Related Art

International Telecommunication Union Radio (ITU-R) communication sector is proceeding with standardization of an International mobile telecommunication (IMT)-Advanced, a next-generation mobile communication system following the 3rd-generation. The IMT-Advanced aims at supporting Internet protocol (IP)-based multimedia services at a data rate of 1 Gbps in a stationary and low-speed movement state and at a data rate of 100 Mbps in a high speed movement state.

$3^{rd}$-generation partnership project (3GPP), a system standard that meets the requirements of the IMT-Advanced, provides long term evolution (LTE)-Advanced by improving the LTE which is based on an orthogonal frequency division multiple access (OFDMA)/single carrier-frequency division multiple access (SC-FDMA) transmission scheme. The LTE-advanced is one of potential candidates for the IMT-Advanced.

In the existing LTE-A, a maximum of five carriers (cells) are aggregated to provide carrier aggregation (CA), but, in a future wireless communication system, enhanced CA (eCA) of aggregating a maximum of 32 carriers (cells) is considered.

The increase in the number of aggregated carriers (cells) may cause various problems. For example, it may be difficult or impossible to effectively monitor downlink control information by an existing search space (SS) configuring method for searching for a control channel and the number of times of blind decoding (BS) of each aggregation level (AL).

Also, according to the existing scheme, only a maximum of eight carriers may be indicated unless a size of an existing 3-bit carrier indication field (CIF) included in downlink control information is changed for backward compatibility with a legacy terminal. Thus, it is indefinite how 32 carriers (cells) are to be indicated.

In addition, a maximum number of times of blind decoding that can be supported by each UE to detect downlink control information may differ depending on capabilities of UEs. Also, an amount of control information to be transmitted to each UE may differ depending on a channel state, a data amount currently required by each UE, and the like. These variables may further be increased as the number of carriers to be aggregated is increased.

SUMMARY OF THE INVENTION

The present invention provides a method for operating a user equipment (UE) in a wireless communication system and a device therefor.

In one aspect, provided is a method for operating a user equipment (UE) having multiple serving cells configured therefor in a wireless communication system. The method includes receiving a higher layer signal indicating mapping between a serving cell index of a serving cell and a value of a carrier index field (CIF) and identifying the serving cell on the basis of the higher layer signal.

The CIF may consist of 3 bits.

The method may further include receiving downlink control information (DCI) including a CIF and receiving or transmitting data on the basis of the DCI in a serving cell indicated by the CIF. The serving cell indicated by the CIF may be identified on the basis of the mapping.

The value of the CIF indicating the serving cell through mapping may be set to a value not identical to the serving cell index of the serving cell.

The higher layer signal may be a radio resource control (RRC) message.

The CIF may have a value among any one of integers from 0 to 7.

The serving cell index of the serving cell may be any one of integers from 0 to 31.

The value of the CIF indicating the serving cell through mapping may be set to a value not identical to the serving cell index of the serving cell.

The mapping may be not provided to a scheduling cell scheduling any other serving cell, among the multiple serving cells.

Zero may be always mapped as a CIF value to the scheduling cell.

In another aspect, provided is a user equipment (UE). The UE includes a radio frequency (RF) unit transmitting and receiving a radio signal and a processor connected to the RF unit. The processor receives a higher layer signal indicating mapping between a serving cell index of a serving cell and a value of a carrier index field (CIF), and identifies the serving cell on the basis of the higher layer signal.

In a wireless communication system supporting aggregation of more than five carriers (cells), more than eight carriers (cells) may be indicated even without increasing a bit size of a carrier indication field of downlink control information. Thus, aggregation of more than five carriers (cells) may be supported, while maintaining backward compatibility with a legacy terminal.

BRIEF DESCRIPTION OF THE DRAWINGS

FIG. 15 illustrates an example in which a UE blind-decodes only some (E)PDCCH candidates on the basis of signaled information, among the existing (USS) (E)PDCCH candidates related to a specific cell.

DESCRIPTION OF EXEMPLARY EMBODIMENTS

The following technology can be used in a variety of multiple access schemes, such as Code Division Multiple Access (CDMA), Frequency Division Multiple Access (FDMA), Time Division Multiple Access (TDMA), Orthogonal Frequency Division Multiple Access (OFDMA), and Single Carrier-Frequency Division Multiple Access (SC-FDMA). CDMA can be implemented using radio technology, such as Universal Terrestrial Radio Access (UTRA) or CDMA2000. TDMA can be implemented by radio technology, such as Global System for Mobile communications (GSM)/General Packet Radio Service (GPRS)/Enhanced Data Rates for GSM Evolution (EDGE). OFDMA can be implemented by radio technology, such as IEEE 802.11 (Wi-Fi), IEEE 802.16 (WiMAX), IEEE 802.20, or Evolved UTRA (E-UTRA). IEEE 802.16m is the evolution of IEEE 802.16e, and it provides backward compatibility with a system based on IEEE 802.16e. UTRA is part of a Universal Mobile Telecommunications System (UMTS). 3rd Generation Partnership Project (3GPP) Long Term Evolution (LTE) is part of an Evolved UMTS (E-UMTS) using Evolved-UMTS Terrestrial Radio Access (E-UTRA). 3GPP LTE adopts OFDMA in downlink and adopts SC-FDMA in uplink. LTE-Advanced (A) is the evolution of 3GPP LTE. In order to clarify a description, a situation in which the present invention is applied to an LTE-A system is assumed, but the technical spirit of the present invention is not limited thereto.

Figure 1:
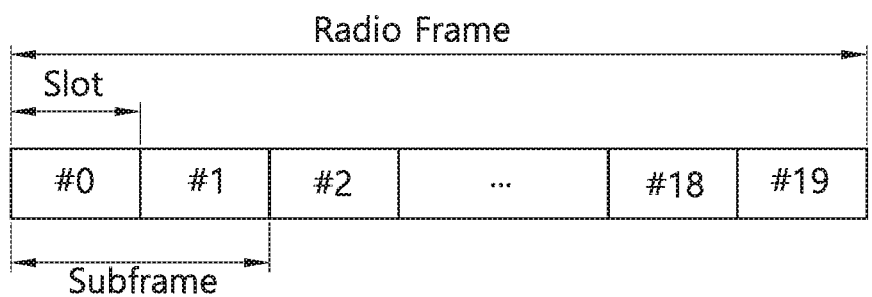
FIG. 1 shows the structure of a radio frame in 3GPP LTE/LTE-A.

FIG. 1 shows the structure of a radio frame in 3GPP LTE/LTE-A.

Referring to FIG. 1, the radio frame includes 10 subframes, and each of the subframes includes 2 slots. The slots within the radio frame are given slot numbers from #0 to #19. The time that is taken for one subframe to be transmitted is called a Transmission Time Interval (TTI). The TTI can be called a scheduling unit for data transmission. For example, the length of one radio frame can be 10 ms, the length of one subframe can be 1 ms, and the length of one slot can be 0.5 ms. The structure of the radio frame is only an example. Accordingly, the number of subframes included in the radio frame or the number of slots included in the subframe can be changed in various ways.

Figure 2:
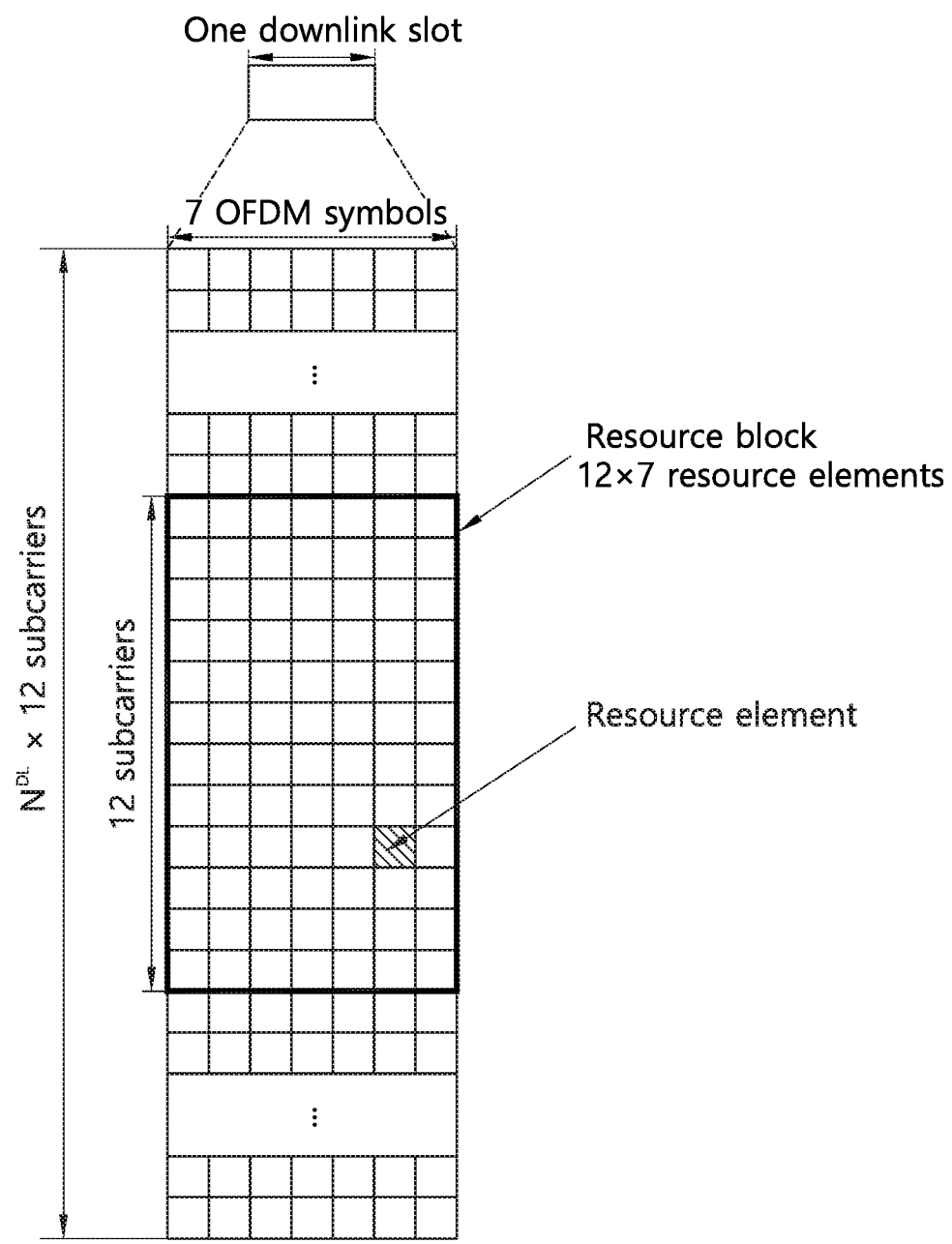
FIG. 2 shows an example of a resource grid for one slot.

FIG. 2 shows an example of a resource grid for one slot.

The slot includes a downlink slot and an uplink slot. The downlink slot includes a plurality of Orthogonal Frequency Division Multiplexing (OFDM) symbols in a time domain. The OFDM symbol indicates a specific time interval, and the OFDM symbol may also be called an SC-FDMA symbol depending on a transmission method. The downlink slot includes an $N_{RB}$ number of Resource Blocks (RBs) in a frequency domain. The RB is a resource allocation unit, and the RB includes one slot in the time domain and a plurality of contiguous subcarriers in the frequency domain.

The number of RBs $N_{RB}$ included in the downlink slot depends on a downlink transmission bandwidth configured in a cell. For example, in an LTE system, the number $N_{RB}$ can be any one of 6 to 110. An uplink slot can have the same structure as the downlink slot.

Each element on the resource grid is called a Resource Element (RE). An RE on the resource grid can be identified by an index pair (k,l) within a slot. Here, $k(k=0, N_{RB} \times 12 - 1)$ is a subcarrier index within the frequency domain, and l $(l=0, \ldots, 6)$ is an OFDM symbol index within the time domain.

One RB is illustrated as including 7×12 REs, including 7 OFDM symbols in the time domain and 12 subcarriers in the frequency domain, but the number of OFDM symbols and the number of subcarriers within one RB are not limited thereto. The number of OFDM symbols and the number of subcarriers can be changed in various ways depending on the length of a CP, frequency spacing, etc. For example, in the case of a normal Cyclic Prefix (CP), the number of OFDM symbols is 7 and in the case of an extended CP, the number of OFDM symbols is 6. In one OFDM symbol, one of 128, 256, 512, 1024, 1536, and 2048 can be selected and used as the number of subcarriers.

Figure 3:
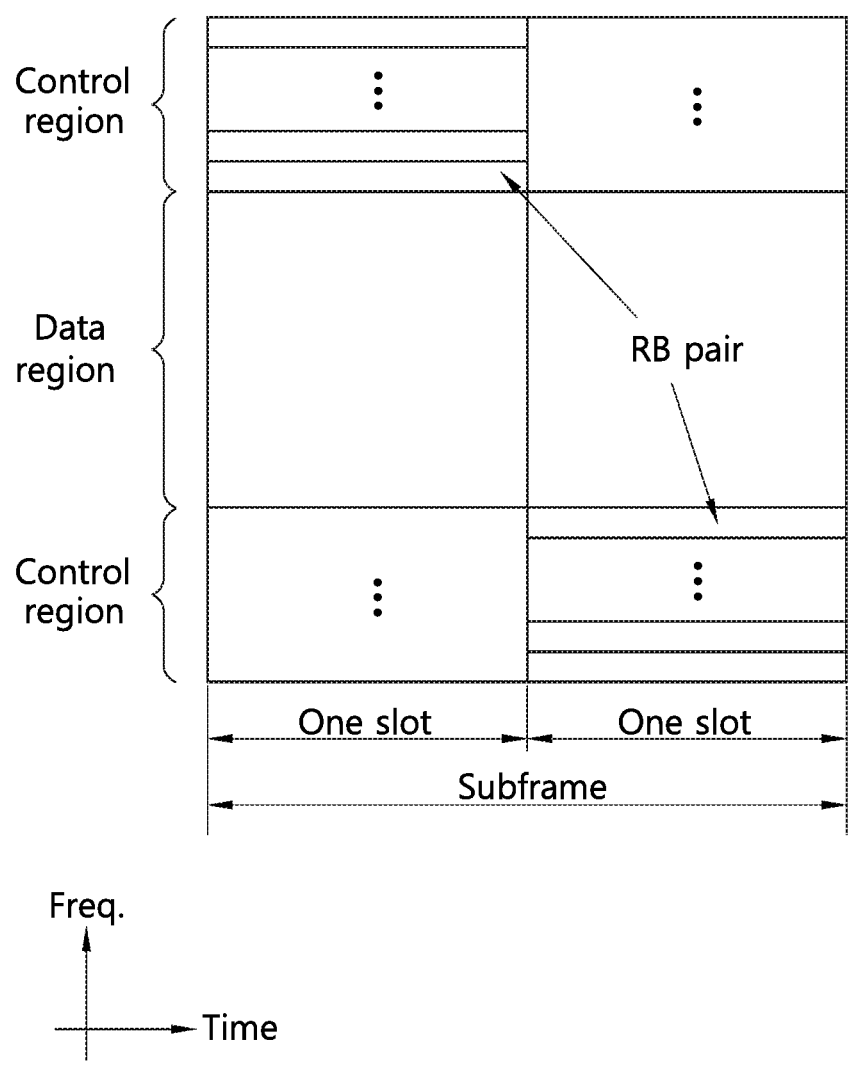
FIG. 3 shows the structure of an uplink subframe.

FIG. 3 shows the structure of an uplink subframe.

The uplink subframe can be divided into a control region and a data region in a frequency domain. Physical uplink control channels (PUCCHs) on which uplink control information is transmitted are allocated to the control region. Physical uplink shared channels (PUSCHs) through which data is transmitted are allocated to the data region. A terminal (user equipment: UE) may send or may not send a PUCCH and a PUSCH at the same time depending on a configuration.

A PUCCH for one terminal is allocated as an RB pair in a subframe. RBs belonging to the RB pair occupy different subcarriers in a first slot and a second slot. A frequency occupied by RBs that belong to an RB pair allocated to a PUCCH is changed on the basis of a slot boundary. This is called that the RB pair allocated to the PUCCH has been frequency-hopped in the slot boundary. A terminal can obtain a frequency diversity gain by sending uplink control information through different subcarriers over time.

Uplink control information transmitted on a PUCCH includes ACK/NACK, Channel State Information (CSI) indicative of a downlink channel state, a Scheduling Request (SR), that is, an uplink radio resource allocation request, etc. The CSI includes a Precoding Matrix Index (PMI) indicative of a precoding matrix, a Rank Indicator (RI) indicative of a rank value that is preferred by UE, a Channel Quality Indicator (CQI) indicative of a channel state, etc.

A PUSCH is mapped to an uplink shared channel (UL-SCH), that is, a transport channel Uplink data transmitted on the PUSCH can be a transmission block, that is, a data block for an UL-SCH that is transmitted during a TTI. The transmission block can be user information. Alternatively, the uplink data can be multiplexed data. The multiplexed data can be obtained by multiplexing the transmission block for the UL-SCH and control information. For example, control information multiplexed with data can include a CQI, a PMI, ACK/NACK, an RI, etc. Alternatively, the uplink data may include only control information.

Figure 4:
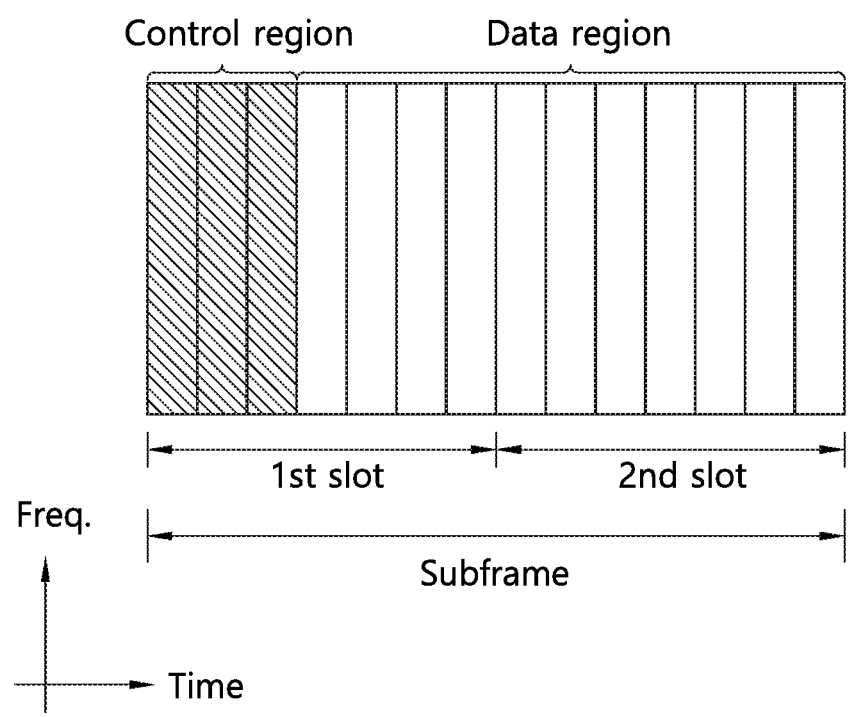
FIG. 4 shows the structure of a downlink subframe.

FIG. 4 illustrates a structure of a downlink (DL) subframe.

A DL subframe includes two slots in a time domain and each slot includes seven 01-DM symbols in a normal CP (or six OFDM symbols in an extended CP). A maximum of first three OFDM symbols of a first slot of the subframe (a maximum of 4 OFDM symbols regarding a 1.4 MHz bandwidth) are a control region to which control channels are allocated, and the other OFDM symbols are a data region to which a physical downlink shared channel (PDSCH) is allocated. The PDSCH refers to a change in which a base station (BS) or a node transmits data to a user equipment (UE).

The control channel transmitted in the control region includes a physical control format indicator channel (PCFICH), a physical hybrid-ARQ indicator channel (PHICH), and a physical downlink control channel (PDCCH).

The PCFICH transmitted in the first OFDM symbol of the subframe carries a control format indicator (CFI), information regarding the number of OFDM symbols (i.e., a size of the control region) used for transmission of control channels within the subframe. After the UE first receives a CFI on the PCFICH, the UE monitors a PDCCH. The PCFICH is transmitted through a fixed PCFICH resource of the subframe.

The PHICH carries a ACK (acknowledgement)/NACK (not-acknowledgement) signal for an uplink hybrid automatic repeat request (HARQ). The ACK/NACK signal regarding uplink data transmitted from the UE is transmitted on the PHICH.

The PDCCH is a control channel transmitting downlink control information (DCI). The DCI may include resource allocation of a PDSCH (which may also be referred to as "downlink (DL) grant", resource allocation of a physical uplink shared channel (PUSCH) (which may also be referred to as "uplink (UL) grant"), an aggregation of a transmission power control command regarding individual UEs of a certain UE group and/or activation of a VoIP (Voice over Internet Protocol).

Figure 5:
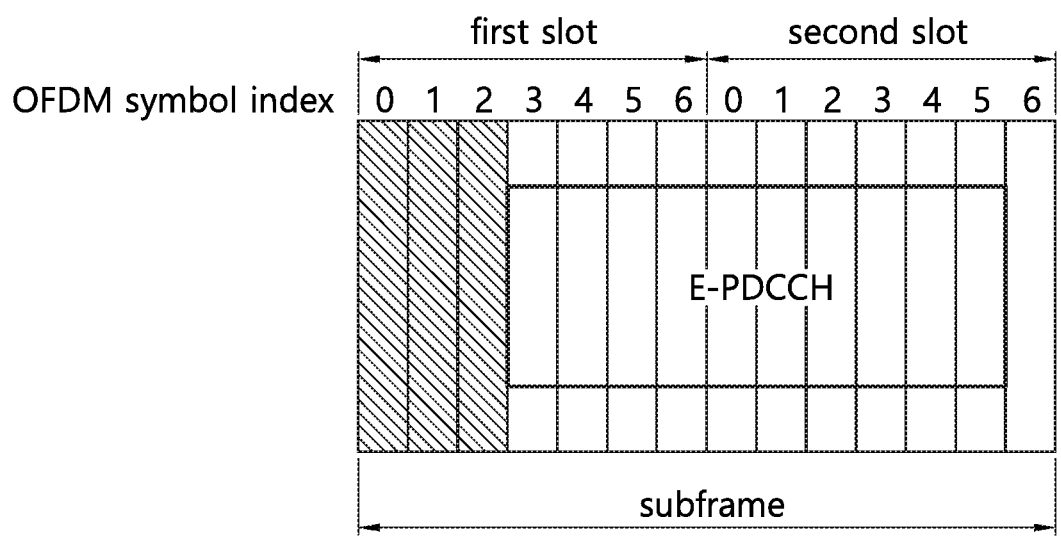
FIG. 5 illustrates an EPDCCH.

FIG. 5 illustrates an EPDCCH.

Referring to FIG. 5, an EPDCCH may be positioned to follow an existing control region in a time domain. For example, when the existing control region is transmitted in first three OFDM symbols of a subframe, the EPDCCH may be positioned in OFDM symbols positioned to follow the three OFDM symbols. In a frequency domain, the existing control region and the PEDCCH may be configured to correspond to each other or to be different. For example, the PDCCH is transmitted in the entire system band, whereas the PEDCCH may be transmitted only in the same frequency band as that of the PDSCH transmitted for a specific UE. In FIG. 5, an example in which the PEDCCH is transmitted only in some frequency band of the existing control region is illustrated. In the EPDCCH, control information for an advanced UE may be transmitted. In the EPDCCH, a reference signal for demodulation of the PDSCH may be transmitted.

Figure 6:
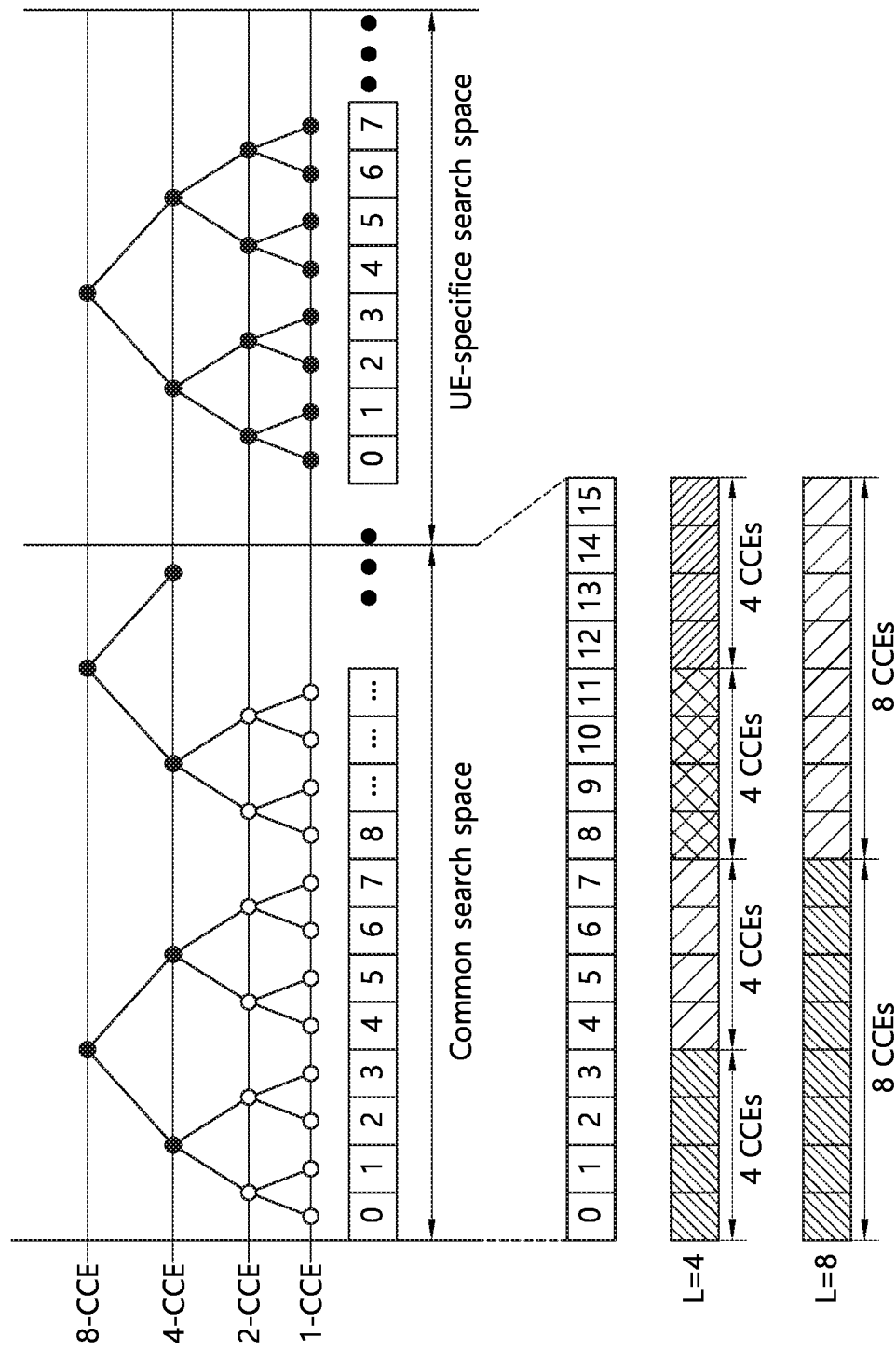
FIG. 6 is a view illustrating monitoring of a control channel and a search space (SS).

FIG. 6 is a view illustrating monitoring of a control channel and a search space (SS).

A control region of a subframe includes a plurality of control channel elements (CCEs). A CCE is a logical allocation unit used for providing a coding rate based on a state of a wireless channel to a PDCCH and corresponds to a plurality of resource element groups (REGs). An REG includes a plurality of resource elements. A format of a PDCCH and the number of available bits of the PDCCH are determined according to a correlation between the number of CCEs and a coding rate provided by the CCEEs. One REG includes four Res, and one CCE includes nine REGs. In order to configure one PDCCH, $\{1, 2, 4, 8\}$ number of CCEs may be used, and each element of $\{1, 2, 4, 8\}$ is called a CCE aggregation level (AL).

In 3GG LTE/LTE-A, blind decoding (BD) is used to detect a PDCCH. A UE does not know, in advance, in which position of a control region a PDCCH of the UE is transmitted. Thus, the UE checks a cyclic redundancy check (CRC) error in a PDCCH received in each of resources in which the PDCCH may be present (which is called a PDCCH candidate) to determine whether a corresponding PDCCH is a control channel of the UE. This is called blind decoding.

That is, a plurality of PDCCHs may be transmitted in a control region of each subframe. The UE monitors the plurality of PDCCHs in each subframe. Here, monitoring refers to UE attempting blind decoding of a PDCCH.

In the 3GPP LTE, in order to reduce a burden of blind decoding, a search space (SS) is used. The SS may be a monitoring set of a CCE for a PDCCH or may be a set of PDCCH candidates. The UE monitors a PDCCH in a corresponding SS.

The SS is divided into a common SS (CSS) and a UE-specific search space (USS). The CSS, a space for searching for a PDCCH having common control information, includes 16 control channel elements (CCEs) from CCE indices 0 to 15 and supports a PDCCH having a CCE aggregation level (AL) of $\{4, 8\}$. However, even in the CSS, a PDCCH (DCI formats 0, 1A) carrying UE-specific information may be transmitted. The UE-specific SS supports a PDCCH having a CCE AL of $\{1, 2, 4, 8\}$.

A starting point of a SS is defined to be different in the CSS and in the UE-specific SS. A starting point of the CSS is fixated, regardless of subframe, while a starting point of the UE-specific SS may differ in each subframe according to a UE identifier (e.g., C-RNTI), a CCE AL and/or a slot number of a radio frame. When a starting point of the UE-specific SS is within the CSS, the UE-specific SS and the CSS may overlap. In FIG. 6, a PDCCH is illustrated and described, but an SS may also be configured for an EPDCCH, like the PDCCH. An SS of the EPDCCH includes an ECCE.

<Carrier Aggregation (CA)>

Hereinafter, CA will be described.

Figure 7:
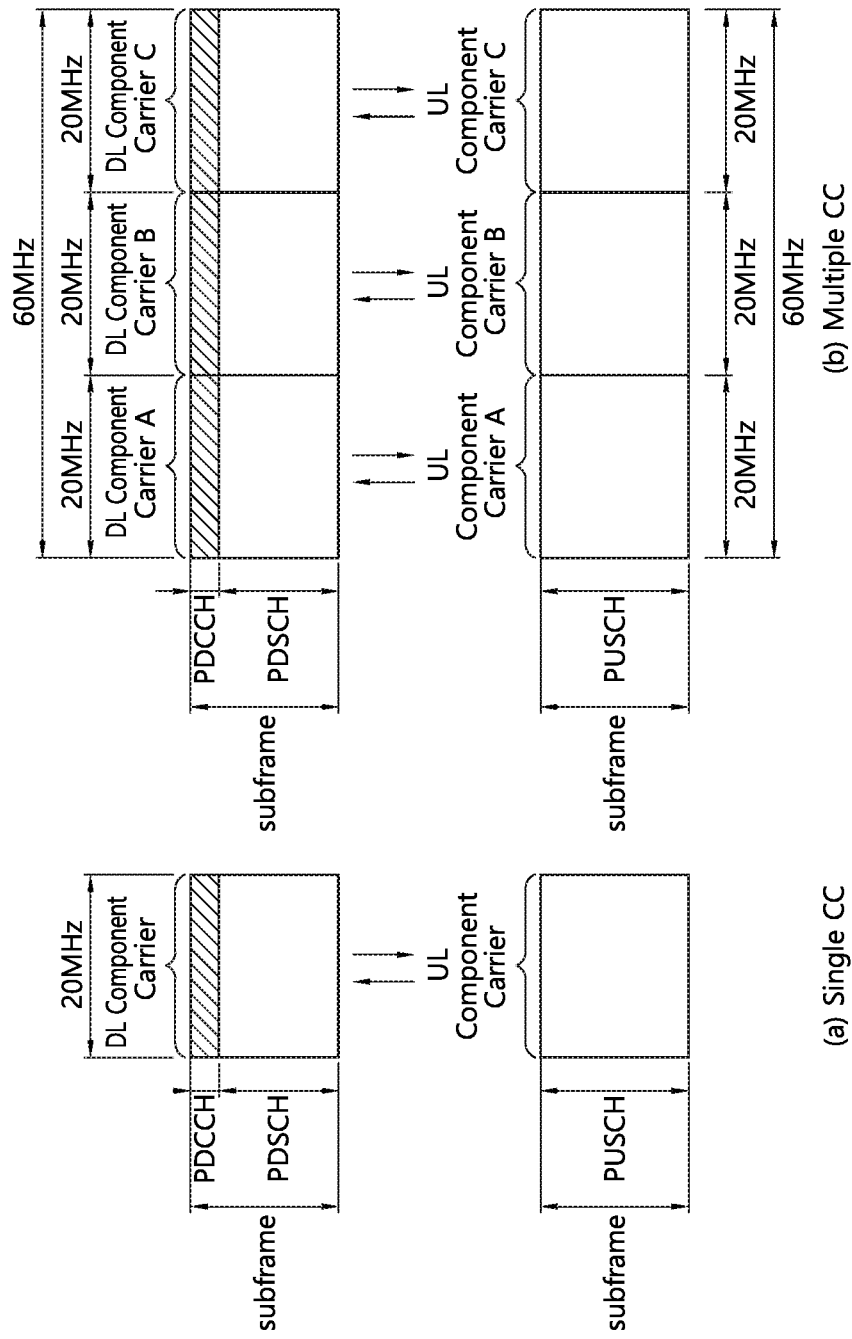
FIG. 7 is a comparison example of an existing single carrier system and a CA system.

FIG. 7 is a comparison example of an existing single carrier system and a CA system.

Referring to FIG. 7, in a single carrier system, only a single carrier is supported for UE in uplink and downlink. The bandwidth of a carrier may be various, but the number of carriers assigned to UE is one. In contrast, in a Carrier Aggregation (CA) system, a plurality of CCs DL CCs A to C and UL CCs A to C may be assigned to UE. A Component Carrier (CC) means a carrier used in a CA system, and it may be abbreviated as a carrier. For example, in order to allocate a bandwidth of 60 MHz to UE, 3 CCs each having 20 MHz may be assigned to the UE.

ACA system may be divided into a contiguous CA system in which aggregated carriers are contiguous to each other and a non-contiguous CA system in which aggregated carriers are separated from each other. When it is simply called a CA system hereinafter, it should be understood that the CA system includes a case where CCs are contiguous and a case where CCS are not contiguous.

A CC, that is, a target when one or more CCs are aggregated, may use bandwidths used in an existing system for backward compatibility with the existing system. For example, a 3GPP LTE system supports bandwidths of 1.4 MHz, 3 MHz, 5 MHz, 10 MHz, 15 MHz, and 20 MHz. A 3GPP LTE-A system may configure a broadband of 20 MHz or higher using only the bandwidths of the 3GPP LTE system. Alternatively, a 3GPP LTE-A system may configure a broadband by defining new bandwidths without using the bandwidths of an existing system.

The system frequency band of a wireless communication system is divided into a plurality of carrier frequencies. In this case, the carrier frequency means the center frequency of a cell. Hereinafter, a cell may mean downlink frequency resources and uplink frequency resources. Alternatively, a cell may mean a combination of downlink frequency resources and optional uplink frequency resources. Furthermore, in general, if a CA is not taken into consideration, a single cell may always include uplink and downlink frequency resources that form a pair.

In order for packet data to be transmitted and received through a specific cell, UE first has to complete a configuration for the specific cell. In this case, the configuration means a state in which the reception of system information necessary to transmit and receive data to and from the specific cell has been completed. For example, the configuration may include an overall process of receiving common physical layer parameters necessary for the transmission/reception of data, Medium Access Control (MAC) layer parameters, or parameters necessary for a specific operation in the RRC layer. A configuration-completed cell is in a state in which the cell may immediately transmit and receive packet data only it has only to receive information about which the packet data may be transmitted.

A cell in the configuration-completed state may be in the activation or deactivation state. In this case, the activation refers to a state in which data is being transmitted or received or a state in which data is ready to be transmitted or received. UE may monitor and receive the control channel (PDCCH) and data channel (PDSCH) of an activated cell in order to check resources (they may be the frequency, the time, etc.) assigned thereto.

Deactivation refers to a state in which traffic data cannot be transmitted or received, but measurement or the transmission/reception of minimum information are possible. UE may receive necessary System Information (SI) in order to receive packets from a deactivated cell. In contrast, the UE does not monitor or receive the control channel (PDCCH) and data channel (PDSCH) of a deactivated cell in order to check resources (they may be a frequency, time, etc.) assigned thereto.

Cells may be classified into a primary cell, a secondary cell, and a serving cell.

The primary cell means a cell that operates in a primary frequency, a cell in which UE performs an initial connection establishment procedure or a connection re-establishment procedure with a BS, or a cell that is indicated as a primary cell in a handover process.

The secondary cell means a cell that operates in a secondary frequency. The secondary cell is configured once RRC establishment is set up and used to provide additional radio resources.

The serving cell is formed of a primary cell in the case of UE in which a Carrier Aggregation (CA) has not been configured or to which a CA cannot be provided. If a CA has been configured for UE, the term 'serving cell' indicates a cell configured for UE and may be plural in this case. One serving cell may include a single DL CC or a pair of {DL CC, UL CC}. A plurality of serving cells may include a primary cell and one of all secondary cells or a set of a plurality of secondary cells.

A Primary Component Carrier (PCC) means a Component Carrier (CC) corresponding to a primary cell. A PCC is a CC through which UE forms connection or RRC connection with a BS at the early stage from among some CCs. A PCC is a special CC that is responsible for connection or RRC connection for signaling regarding a plurality of CCs and that manages UE context, that is, connection information related to UE. Furthermore, a PCC is always in the activation state when it is in RRC connected mode after forming connection or RRC connection with UE. A DL CC corresponding to a primary cell is called a DL Primary Component Carrier (DL PCC), and an UL CC corresponding to a primary cell is called an UL Primary Component Carrier (UL PCC).

A Secondary Component Carrier (SCC) means a CC corresponding to a secondary cell. That is, an SCC is a CC assigned to UE in addition to a PCC and is a carrier extended for additional resource assignment, etc. by UE in addition to a PCC. An SCC may be divided into the activation or deactivation state. A DL CC corresponding to a secondary cell is called a DL Secondary Component Carrier (DL SCC). An UL CC corresponding to a secondary cell is called an UL Secondary Component Carrier (UL SCC).

A primary cell and a secondary cell have the following characteristics.

First, a primary cell is used to transmit a PUCCH. Second, a primary cell is always activated, whereas a secondary cell is a carrier that is activated or deactivated according to specific conditions. Third, when a primary cell experiences a Radio Link Failure (hereinafter referred to as an RLF), RRC re-establishment is triggered. Fourth, a primary cell may be changed by a change of a security key or by a handover procedure that is accompanied by a random access channel (RACH) procedure. Fifth, Non-Access Stratum (NAS) information is received through a primary cell. Sixth, in the case of an FDD system, a primary cell is always formed of a pair of a DL PCC and an UL PCC. Seventh, a different CC may be configured as a primary cell in each UE. Eighth, a primary cell may be replaced through only a handover process or a cell selection/cell reselection process. In adding a new secondary cell, RRC signaling may be used to transmit system information about a dedicated secondary cell.

In relation to a CC that forms a serving cell, a DL CC may form a single serving cell, or a DL CC and an UL CC may form a single serving cell through connection establishment. However, a serving cell is not formed of only a single UL CC.

The activation/deactivation of a CC has the same concept as the activation/deactivation of a serving cell. For example, assuming that a serving cern is formed of a DL CC1, the activation of the serving cell1 means the activation of the DL CC1. Assuming that a serving cell2 is configured through connection establishment of a DL CC2 and an UL CC2, the activation of the serving cell2 means the activation of the DL CC2 and the UL CC2. In this sense, each CC may correspond to a cell.

The number of CCs that are aggregated between downlink and uplink may be differently set. A case where the number of aggregated DL CCs is the same as the number of aggregated UL CCs is called a symmetric aggregation, and a case where the number of aggregated DL CCs is different from the number of aggregated UL CCs is called an asymmetric aggregation. Furthermore, the CCs may have different sizes (i.e., bandwidths). For example, assuming that 5 CCs are used to form a 70 MHz band, the 70 MHz band may be configured like 5 MHz CC (carrier #0)+20 MHz CC (carrier #1)+20 MHz CC (carrier #2)+20 MHz CC (carrier #3)+5 MHz CC (carrier #4).

As described above, unlike a single carrier system, a CA system can support a plurality of CCs, that is, a plurality of serving cells.

Such a CA system can support non-cross-carrier scheduling and cross-carrier scheduling.

Figure 8:
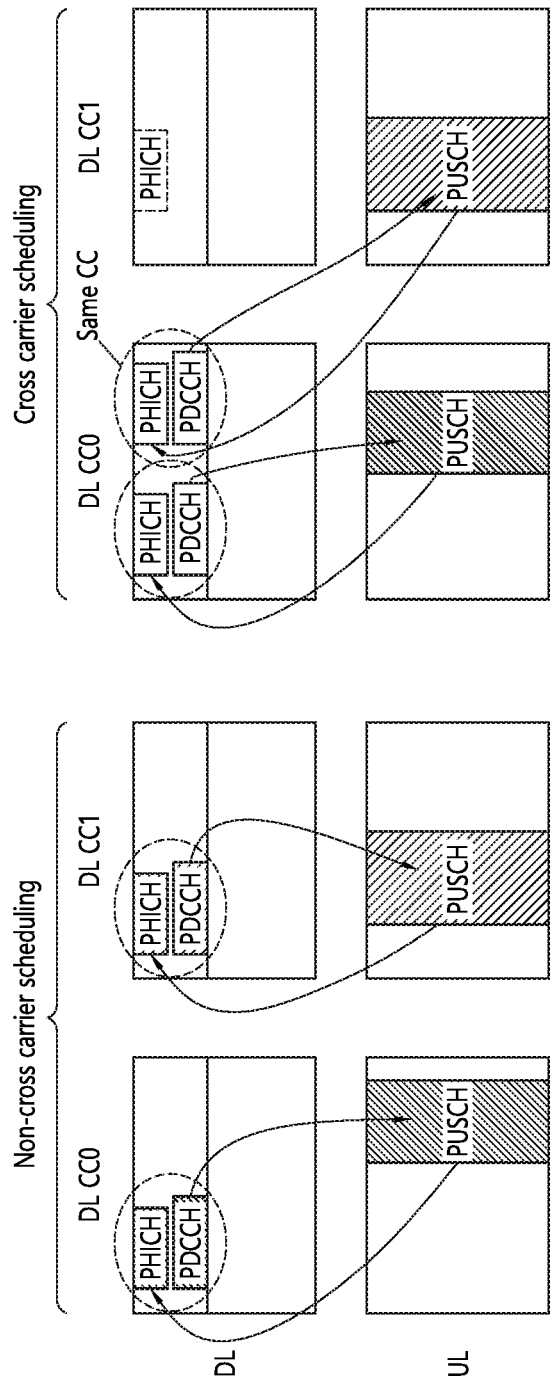
FIG. 8 illustrates non-cross-carrier scheduling and cross-carrier scheduling.

FIG. 8 illustrates non-cross-carrier scheduling and cross-carrier scheduling.

Non-cross-carrier scheduling may be said to be a method of simply extending and applying a conventional scheduling method in a single cell to a plurality of cells. If there is a PDSCH scheduled by a PDCCH, the PDCCH/PDSCH is transmitted through the same CC, and the PDCCH may schedule a PUSCH transmitted through a CC basically linked to a specific CC.

Cross-carrier scheduling is a scheduling method capable of performing the resource assignment of PDSCHs transmitted through different CCs and/or the resource assignment of PUSCHs transmitted through CCs other than CCs basically linked to a specific CC, through a PDCCH transmitted through the specific CC. That is, a PDCCH and a PDSCH may be transmitted through different DL CCs, and a PUSCH may be transmitted through another UL CC other than an UL CC that is linked to a DL CC on which a PDCCH including an UL grant has been transmitted. As described above, in a system supporting cross-carrier scheduling, a carrier indicator informing that a PDSCH/PUSCH providing control information are transmitted through what DL CC/UL CC is necessary for a PDCCH. A field including such a carrier indicator is hereinafter called a Carrier Indication Field (CIF).

A CA system supporting cross-carrier scheduling may include a CIF in a conventional Downlink Control Information (DCI) format. In a system supporting cross-carrier scheduling, for example, in an LTE-A system, 3 bits may be extended because a CIF is added to an existing DCI format (i.e., a DCI format used in LTE). In the structure of a PDCCH, an existing coding method and resource assignment method (i.e., resource mapping based on a CCE) may be reused.

Hereinafter, the present disclosure will be described.

The present disclosure proposes a method for effectively configuring/operating a search space (SS) (a discovery region) in cases where a large number of cells are configured by carrier aggregation (CA) to support an increasing demand of downlink (DL) and/or uplink (UL) data. Hereinafter, for the purposes of description, a search space (a discovery region) may be called an "SS". The SS may be a region in which a UE discovers/searches/monitors a control channel such as a PDCCH or an EPDCCH.

A plurality of cells configured through CA may be configured only as licensed spectrum-based cells (which may also be called a "LCELLs"), may be configured as a combination of an unlicensed spectrum-based cells (which may also be called a "UCELLs") and the LCELL, or may be configured only as UCELLs. The UCELL may be a cell operated in an LTE-U manner. The UCELL may be limitedly configured only as a secondary cell. Or, a rule may be defined such that the UCELL is cross-carrier-scheduled (CCS) from the LCELL.

Considering that a radio resource pool (RRP) section of the UCELL is a resource configured aperiodically or discontinuously depending on a carrier sensing (CS) result, the corresponding RRP section may be re-defined or re-interpreted in terms of a UE operation and assumption. For example, in the UCELL, the RRP section may be (re)-defined as a section in which the UE is assumed to perform a (time/frequency)synchronization operation regarding the UCELL or in which a synchronization signal (e.g., PSS, SSS) therefor is assumed to be transmitted (from a base station (BS)), a section in which the UE is assumed to perform a CSI measurement operation regarding the UCELL or in which a reference signal (e.g., CRS, CSI-RS) therefor is assumed to be transmitted (from the BS), a section in which the UE performs a data transmission(/reception)-related DCI detection operation in the UCELL, and/or a section in which the UE performs a (temporary or provisional) buffering operation on a signal received in the UCELL.

Hereinafter, for the purposes of description, the proposed scheme will be described on the basis of the 3GPP LTE/LTE-A. However, the present disclosure is not limited thereto and the system to which the present disclosure is applied may extend to any other systems in range.

The method for configuring An SS in which DL control information is transmitted will be described in detail again.

A control region includes a plurality of logical CCE strings. The CCE corresponds to a plurality of resource element groups (REGs). For example, the CCE may correspond to 9 REGs. The REG is used to define mapping control channels to REs. For example, one REG may include four Res. A CCE string is a set of entire CCEs forming a control region in a subframe.

A plurality of PDCCHs may be transmitted in a control region. A PDCCH is transmitted on one or an aggregation of some contiguous control channel elements (CCEs). A format of a PDCCH and the number of available bits of the PDCCH are determined according to the number of CCEs forming a CCE aggregation. Hereinafter, the number of CCEs used for PDCCH transmission is called a CCE AL. Also, the CCE AL is a CCE unit for searching for a PDCCH. A size of the CCE AL is defined by the number of adjacent CCEs. For example, the CCE AL may be defined by CCEs such as any one number of {1, 2, 4, 8}.

Table 1 below illustrates an example of a PDCCH format and the number of available PDCCH bits according to CCE ALs.

TABLE 1

| PDCCH format | CCE aggregation level | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

In the CCE AL {1, 2, 4, 8}, an SS $S^{(L)}_k$ may be defined as a set of candidate PDCCHs. CCEs corresponding to a candidate PDCCH m of the SS $S^{(L)}_k$ is given as follows.

$$L\{(Y_k+m')\bmod[N_{CCE,k}/L]\}+i. \quad \text{[Equation 1]}$$

Here, m=0, . . . , L−1, m=0, . . . , $M^{(L)}$−1, and $N_{CCE,k}$ is a total number of CCEs which may be used for transmission of a PDCCH in a control region of a subframe k. The control region includes a set of CCEs numbered from 0 to $N_{CCE,k}$−1. $M^{(L)}$ is the number of candidate PDCCHs in the CCE AL L in the given SS. In a CSS, $Y_k$ is set to 0 for two ALs, L=4 and L=8. In a UE-specific SS of the CCE AL L, the variable $Y_k$ is defined as follows.

$$Y_k=(A \cdot Y_{k-1})\bmod D \quad \text{[Equation 2]}$$

Here, $Y^{-1}=n_{RNTI}\ne 0$, A=39827, D=65537, k=floor($n_s/2$), and $n_s$ denotes a slot number in a radio frame. Floor(x) denotes a largest integer among numbers smaller than x.

Table 2 below illustrates an aggregation level, the number of CCEs, and the number of candidate PDCCHs in a common search space (CSS) and a UE-specific SS.

TABLE 2

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

Meanwhile, when EPDCCH monitoring is not configured and a carrier indicator field (CIF) is not configured, the UE searches for one PDCCH UE-specific SS in each of ALs 1, 2, 4, and 8 in every non-DRX subframe of each of activated serving cells.

When EPDCCH monitoring is not configured and the CIF is configured, the UE searches for one or more UE-specific SSs from each of the ALs 1, 2, 4, and 8 regarding one or more activated serving cells configured by higher layer signaling in every non-DRX subframe.

When EPDCCH monitoring is configured for a serving cell, the serving cell is activated, and a CIF is not configured for the UE, the UE monitors one PDCCH UE-specific SS in each of the ALs 1, 2, 4, and 8 in every non-DRX subframe in which the EPDCCH has not been monitored in the serving cell.

When EPDCCH monitoring is configured for the serving cell, the serving cell is activated, and a CIF is configured for the UE, the UE monitors one or more PDCCH UE-specific SSs in each of the ALs 1, 2, 4, and 8 in every non-DRX subframe in which the EPDCCH has not been monitored in the serving cell configured by the higher layer signaling.

In a primary cell, the CSS and the PDCCH UE-specific SS may overlap.

A UE, in which a CIF associated with PDCCH monitoring in a serving cell c is configured, monitors a PDCCH in which the CIF is configured and which is CRC-scrambled with a C-RNTI from a PDCCH UE-specific SS of the serving cell c.

A UE, in which a CIF associated with PDCCH monitoring in a primary cell is configured, monitors a PDCCH in which the CIF is configured and which is CRC-scrambled with a SRS C-RNTI from a PDCCH UE-specific SS of the primary cell.

A UE may monitor a PDCCH without a CIF in the CSS.

In a serving cell in which the PDCCH is monitored, when a CIF is not configured for a UE, the UE monitors a PDCCH without a CIF in a PDCCH UE-specific SS. When a CIF is configured for a UE, the UE monitors a PDCCH with a CIF in the PDCCH UE-specific SS.

When a UE is configured to monitor a PDCCH with a CIF corresponding to a secondary cell from another serving cell, the UE does not monitor a PDCCH of the secondary cell (is not expected to monitor it). For a serving cell in which the PDCCH is monitored, the UE may monitor PDCCH candidates in the serving cell.

Hereinafter, an EPDCCH allocation procedure will be described.

Regarding each serving cell, one or two EPDCCH PRB sets may be configured through higher layer signaling for EPDCCH monitoring of a UE. A PRB pair corresponding to the EPDCCH PRB set is indicated by higher layer signaling. Each EPDCCH PRB set includes ECCEs numbered from 0 to $N_{ECCE,p,k}$−1. Here, $N_{ECCE,p,k}$ is the number of ECCEs in an EPDCCH PRB set p of a subframe k. The EPDCCH PRB set may be configured in a localized or distributed manner. The UE monitors one or more EPDCCH candidates, and here, monitoring refers to attempting decoding each EPDCCH according to DCI formats to be monitored.

The EPDCCH candidates to be monitored may be defined as a EPDCCH UE-specific SS. Regarding each serving cell, subframes in which the UE is to monitor an EPDCCH UE-specific SS may be configured by higher layer signaling.

The UE does not monitor an PEDCCH in a special subframe, and does not monitor an EPDCCH in a subframe indicated to decode a PMCH by a higher layer.

In an AL LE {1,2,4,8,16,32}, when an EPDCCH UE-specific SS is $ES^{(L)}_k$, it may be set as a set of EPDCCH candidates, and EPDCCH PRB set p may be expressed by Equation 3 below.

$$L\left\{\left(Y_{p,k}+\left\lfloor\frac{m \cdot N_{ECCE,p,k}}{L \cdot M_p^{(L)}}\right\rfloor+b\right)\bmod\lfloor N_{ECCE,p,k}/L\rfloor\right\}+i \quad \text{[Equation 3]}$$

In Equation 3, i=0, . . . , L−1, and when a CIF regarding a serving cell in which the EPDCCH is monitored is configured, $b=n_{CI}$, or when the CIF is not set, b=0. $n_{CI}$ is a value of CIF. M=0, 1, . . . , $M^{(L)}_p$−1.

When a CIF regarding the serving cell in which the EPDCCH is monitored is not configured, $M^{(L)}_p$ is the number of EPDCCH candidates regarding the AL L in the EPDCCH PRB set p of the serving cell in which the EPDCCH is monitored.

Otherwise, $M^{(L)}_p$ is the number of EPDCCH candidates regarding the AL L in the EPDCCH PRB set p of the serving cell indicated by no.

When ECCE corresponding to an EPDCCH candidate is mapped to a PRB set overlapping a frequency at which a PBCH of the same subframe and a synchronization signal (PSS or SSS) is transmitted, the UE may not monitor the EPDCCH candidate.

$Y_{p,k}$ may be defined by Equation 4 below.

$$Y_{p,k}=(A_p \cdot Y_{p,k-1})\bmod D \quad \text{[Equation 4]}$$

$Y_{p,-1}=n_{RNTI}\ne 0$, $A_0$=39827, $A_1$=39829, D=65537, and k=floor($n_s/2$).

ALs defining an SS and the number of EPDCCH candidates may be given as follows.

In cases where one EPDCCH PRB set for distributed transmission is configured in the UE, ALs and the number of EPDCCH candidates may be defined as illustrated in the following tables.

TABLE 3

| | Number of EPDCCH candidates $M_p^{(L)}$ for Case 1 | | | | | Number of EPDCCH candidates $M_p^{(L)}$ for Case 2 | | | | |
|---|---|---|---|---|---|---|---|---|---|---|
| $N_{RB}^{X_p}$ | L = 2 | L = 4 | L = 8 | L = 16 | L = 32 | L = 1 | L = 2 | L = 4 | L = 8 | L = 16 |
| 2 | 4 | 2 | 1 | 0 | 0 | 4 | 2 | 1 | 0 | 0 |
| 4 | 8 | 4 | 2 | 1 | 0 | 8 | 4 | 2 | 1 | 0 |
| 8 | 6 | 4 | 3 | 2 | 1 | 6 | 4 | 3 | 2 | 1 |

TABLE 4

| | Number of EPDCCH candidates $M_p^{(L)}$ for Case 3 | | | | |
|---|---|---|---|---|---|
| $N_{RB}^{X_p}$ | L = 1 | L = 2 | L = 4 | L = 8 | L = 16 |
| 2 | 8 | 4 | 2 | 1 | 0 |
| 4 | 4 | 5 | 4 | 2 | 1 |
| 8 | 4 | 4 | 4 | 2 | 2 |

TABLE 5

| | Number of EPDCCH candidates $M_p^{(L)}$ for Case 1 | | | | Number of EPDCCH candidates $M_p^{(L)}$ for Case 2 | | | |
|---|---|---|---|---|---|---|---|---|
| $N_{RB}^{X_p}$ | L = 2 | L = 4 | L = 8 | L = 16 | L = 1 | L = 2 | L = 4 | L = 8 |
| 2 | 4 | 2 | 1 | 0 | 4 | 2 | 1 | 0 |
| 4 | 8 | 4 | 2 | 1 | 8 | 4 | 2 | 1 |
| 8 | 6 | 6 | 2 | 2 | 6 | 6 | 2 | 2 |

TABLE 6

| | Number of EPDCCH candidates $M_p^{(L)}$ for Case 3 | | | |
|---|---|---|---|---|
| $N_{RB}^{X_p}$ | L = 1 | L = 2 | L = 4 | L = 8 |
| 2 | 8 | 4 | 2 | 1 |
| 4 | 6 | 6 | 2 | 2 |
| 8 | 6 | 6 | 2 | 2 |

In the above tables, Case 1 includes 1) a case where DCI formats 2/2A/2B/2C/2D are monitored in a normal subframe and a normal DL CP and the number of resource blocks of a DL band is 25 or greater, 2) a case where DCI formats 2/2A/2B/2C/2D are monitored in a special subframe and a normal DL CP and the number of resource blocks of a DL band is 25 or greater, 3) a case where DCI formats 1A/1B/1D/1/2/2A/2B/2C/2D/0/4 are monitored in a normal subframe and a normal DL CP, 4) a case in which DCI formats 1A/1B/1D/1/2/2A/2B/2C/2D/0/4 are monitored in a special subframe and a normal DL CP, and the like.

Case 2 includes 1) a case where DCI formats 1A/1B/1D/1/2A/2/2B/2C/2D/0/4 are monitored in a normal subframe and an extended DL CP, 2) a case where DCI formats 1A/1B/1D/1/2A/2/2B/2C/2D/0/4 are monitored in a special subframe and a normal DL CP, 3) a case where DCI formats 1A/1B/1D/1/2A/2/2B/2C/2D/0/4 are monitored in a special subframe and an extended DL CP, and the like.

Other cases are included in Case 3.

$N^{X_p}{}_{RB}$ is the number of PRB pairs constituting an EPDCCH PRB set p.

In cases where one EPDCCH PRB set for localized transmission is configured in the UE, ALs and the number of EPDCCH candidates may be defined as illustrated in the following tables.

In cases where two EPDCCH PRB sets for distributed transmission are configured in the UE, ALs and the number of EPDCCH candidates may be defined as illustrated in the following tables.

TABLE 7

| | | Number of EPDCCH candidates $[M_{p1}^{(L)}, M_{p2}^{(L)}]$ for Case 1 | | | | | Number of EPDCCH candidates $[M_{p1}^{(L)}, M_{p2}^{(L)}]$ for Case 2 | | | | |
|---|---|---|---|---|---|---|---|---|---|---|---|
| $N_{RB}^{X_{p1}}$ | $N_{RB}^{X_{p2}}$ | L = 2 | L = 4 | L = 8 | L = 16 | L = 32 | L = 1 | L = 2 | L = 4 | L = 8 | L = 16 |
| 2 | 2 | 4, 4 | 2, 2 | 1, 1 | 0, 0 | 0, 0 | 4, 4 | 2, 2 | 1, 1 | 0, 0 | 0, 0 |
| 4 | 4 | 3, 3 | 3, 3 | 1, 1 | 1, 1 | 0, 0 | 3, 3 | 3, 3 | 1, 1 | 1, 1 | 0, 0 |
| 8 | 8 | 3, 3 | 2, 2 | 1, 1 | 1, 1 | 1, 1 | 3, 3 | 2, 2 | 1, 1 | 1, 1 | 1, 1 |
| 4 | 2 | 5, 3 | 3, 2 | 1, 1 | 1, 0 | 0, 0 | 5, 3 | 3, 2 | 1, 1 | 1, 0 | 0, 0 |
| 8 | 2 | 4, 2 | 4, 2 | 1, 1 | 1, 0 | 1, 0 | 4, 2 | 4, 2 | 1, 1 | 1, 0 | 1, 0 |
| 8 | 4 | 3, 3 | 2, 2 | 2, 1 | 1, 1 | 1, 0 | 3, 3 | 2, 2 | 2, 1 | 1, 1 | 1, 0 |

TABLE 8

| | | Number of EPDCCH candidates $[M_{p1}^{(L)}, M_{p2}^{(L2)}]$ for Case 3 | | | | |
|---|---|---|---|---|---|---|
| $N_{RB}^{X_{p1}}$ | $N_{RB}^{X_{p2}}$ | L = 1 | L = 2 | L = 4 | L = 8 | L = 16 |
| 2 | 2 | 2.2 | 3.3 | 2.2 | 1.1 | 0.0 |
| 4 | 4 | 2.2 | 2.2 | 2.2 | 1.1 | 1.1 |
| 8 | 8 | 2.2 | 2.2 | 2.2 | 1.1 | 1.1 |
| 4 | 2 | 3.1 | 3.2 | 3.1 | 1.1 | 1.0 |
| 8 | 2 | 3.1 | 4.1 | 3.1 | 1.1 | 1.0 |
| 8 | 4 | 2.2 | 2.2 | 2.2 | 1.1 | 1.1 |

In cases where two EPDCCH PRB sets for localized transmission are configured in the UE, ALs and the number of EPDCCH candidates may be defined as illustrated in the following tables.

TABLE 9

| | | Number of EPDCCH candidates $[M_{p1}^{(L)}, M_{p2}^{(L)}]$ for Case 1 | | | | Number of EPDCCH candidates $[M_{p1}^{(L)}, M_{p2}^{(L)}]$ for Case 2 | | | |
|---|---|---|---|---|---|---|---|---|---|
| $N_{RB}^{Xp1}$ | $N_{RB}^{Xp2}$ | L = 2 | L = 4 | L = 8 | L = 16 | L = 1 | L = 2 | L = 4 | L = 8 |
| 2 | 2 | 4, 4 | 2, 2 | 1, 1 | 0, 0 | 4, 4 | 2, 2 | 1, 1 | 0, 0 |
| 4 | 4 | 3, 3 | 3, 3 | 1, 1 | 1, 1 | 3, 3 | 3, 3 | 1, 1 | 1, 1 |
| 8 | 8 | 3, 3 | 3, 3 | 1, 1 | 1, 1 | 3, 3 | 3, 3 | 1, 1 | 1, 1 |
| 4 | 2 | 4, 3 | 4, 2 | 1, 1 | 1, 0 | 4, 3 | 4, 2 | 1, 1 | 1, 0 |
| 8 | 2 | 5, 2 | 4, 2 | 1, 1 | 1, 0 | 5, 2 | 4, 2 | 1, 1 | 1, 0 |
| 8 | 4 | 3, 3 | 3, 3 | 1, 1 | 1, 1 | 3, 3 | 3, 3 | 1, 1 | 1, 1 |

TABLE 10

| | | Number of EPDCCH candidates $[M_{p1}^{(L)}, M_{p2}^{(L)}]$ for Case 3 | | | |
|---|---|---|---|---|---|
| $N_{RB}^{Xp1}$ | $N_{RB}^{Xp2}$ | L = 1 | L = 2 | L = 4 | L = 8 |
| 2 | 2 | 3, 3 | 3, 3 | 1, 1 | 1, 1 |
| 4 | 4 | 3, 3 | 3, 3 | 1, 1 | 1, 1 |
| 8 | 8 | 3, 3 | 3, 3 | 1, 1 | 1, 1 |
| 4 | 2 | 4, 2 | 4, 2 | 1, 1 | 1, 1 |
| 8 | 2 | 4, 2 | 4, 2 | 1, 1 | 1, 1 |
| 8 | 4 | 3, 3 | 3, 3 | 1, 1 | 1, 1 |

In cases where one EPDCCH PRB set for distributed transmission and one EPDCCH PRB set for localized transmission are configured in the UE, ALs and the number of EPDCCH candidates may be defined as illustrated in the following tables.

TABLE 11

| | | Number of EPDCCH candidates $[M_{p1}^{(L)}, M_{p2}^{(L)}]$ for Case 1 | | | | | Number of EPDCCH candidates $[M_{p1}^{(L)}, M_{p2}^{(L)}]$ for Case 2 | | | | |
|---|---|---|---|---|---|---|---|---|---|---|---|
| $N_{RB}^{Xp1}$ | $N_{RB}^{Xp2}$ | L = 2 | L = 4 | L = 8 | L = 16 | L = 32 | L = 1 | L = 2 | L = 4 | L = 8 | L = 16 |
| 2 | 2 | 4, 4 | 2, 2 | 1, 1 | 0, 0 | 0, 0 | 4, 4 | 2, 2 | 1, 1 | 0, 0 | 0, 0 |
| 4 | 4 | 4, 2 | 4, 3 | 0, 2 | 0, 1 | 0, 0 | 4, 2 | 4, 3 | 0, 2 | 0, 1 | 0, 0 |
| 8 | 8 | 4, 1 | 4, 2 | 0, 2 | 0, 2 | 0, 1 | 4, 1 | 4, 2 | 0, 2 | 0, 2 | 0, 1 |
| 2 | 4 | 4, 3 | 2, 4 | 0, 2 | 0, 1 | 0, 0 | 4, 3 | 2, 4 | 0, 2 | 0, 1 | 0, 0 |
| 2 | 8 | 4, 1 | 2, 2 | 0, 4 | 0, 2 | 0, 1 | 4, 1 | 2, 2 | 0, 4 | 0, 2 | 0, 1 |
| 4 | 2 | 5, 2 | 4, 2 | 1, 1 | 1, 0 | 0, 0 | 5, 2 | 4, 2 | 1, 1 | 1, 0 | 0, 0 |
| 4 | 8 | 4, 1 | 4, 2 | 0, 2 | 0, 2 | 0, 1 | 4, 1 | 4, 2 | 0, 2 | 0, 2 | 0, 1 |
| 8 | 2 | 5, 1 | 4, 2 | 2, 1 | 1, 0 | 0, 0 | 5, 1 | 4, 2 | 2, 1 | 1, 0 | 0, 0 |
| 8 | 4 | 6, 1 | 4, 2 | 0, 2 | 0, 1 | 0, 0 | 6, 1 | 4, 2 | 0, 2 | 0, 1 | 0, 0 |

$p_1$ is the identity of the localized EPDCCH-PRB-set,
$p_2$ is the identity of the distributed EPDCCH-PRB-set

TABLE 12

| | | Number of EPDCCH candidates $[M_{p1}^{(L)}, M_{p2}^{(L)}]$ for Case 3 | | | | |
|---|---|---|---|---|---|---|
| $N_{RB}^{Xp1}$ | $N_{RB}^{Xp2}$ | L = 1 | L = 2 | L = 4 | L = 8 | L = 16 |
| 2 | 2 | 4, 1 | 4, 2 | 2, 2 | 0, 1 | 0, 0 |
| 4 | 4 | 4, 1 | 4, 1 | 2, 2 | 0, 1 | 0, 1 |
| 8 | 8 | 4, 1 | 4, 1 | 2, 2 | 0, 1 | 0, 1 |
| 2 | 4 | 4, 1 | 4, 1 | 2, 2 | 0, 1 | 0, 1 |
| 2 | 8 | 4, 1 | 4, 1 | 2, 2 | 0, 1 | 0, 1 |
| 4 | 2 | 4, 1 | 4, 1 | 2, 2 | 1, 1 | 0, 0 |
| 4 | 8 | 4, 1 | 4, 1 | 2, 2 | 0, 1 | 0, 1 |
| 8 | 2 | 4, 1 | 4, 1 | 4, 1 | 0, 1 | 0, 0 |
| 8 | 4 | 4, 1 | 4, 1 | 2, 2 | 0, 1 | 0, 1 |

When a CIF is not configured in the UE, the UE monitors one EPDCCH UE-specific SS regarding each of the ALs provided in the Table 3 to Table 12 in each of activated serving cells configured to monitor an EPDCCH.

When EPDCCH monitoring is configured and a CIF is configured, the UE may monitor one or more EPDCCH UE-specific SSs regarding each of the ALs given in Table 3 to Table 12 in each of one or more activated serving cells configured by higher layer signaling.

A UE, in which a CIF associated with EPDCCH monitoring in a serving cell c is configured, monitors an EPDCCH in which the CIF is configured and which is CRC-scrambled with a C-RNTI from an EPDCCH UE-specific SS of the serving cell c.

A UE, in which a CIF associated with EPDCCH monitoring in a primary cell is configured, monitors an EPDCCH in which the CIF is configured and which is CRC-scrambled with a SRS C-RNTI from an EPDCCH UE-specific SS of the primary cell.

The UE may monitor a PDCCH without a CIF in the CSS.

In a serving cell in which the EPDCCH is monitored, when a CIF is not configured for a UE, the UE monitors an EPDCCH without a CIF from an EPDCCH UE-specific SS.

When a CIF is configured for a UE, the UE monitors an EPDCCH with a CIF in the EPDCCH UE-specific SS.

When the UE is configured to monitor an EPDCCH with a CIF corresponding to a secondary cell from another serving cell, the UE may not monitor an EPDCCH in the secondary cell.

The related art CA presupposes that up to 5 cells are aggregated. However, in a future wireless communication technology, CA of aggregating cells more than 5 ones, e.g., a maximum of 32 cells, is also considered. When the number of cells is increased, various matters are to be considered. For example, in the case of using cross-carrier scheduling, how a search space (SS) is to be configured if DL control information (DCI) regarding a maximum of 32 cells is transmitted in a scheduling cell in which scheduling information of other cells is transmitted may be an issue.

The following proposed schemes propose a method effectively configuring/operating a search space (SS) (or a discovery region) for searching/discovering a control channel (or control information) when a large number of cells are configured by CA scheme. By applying some (or all) of the corresponding proposed schemes, SS(s) related to multiple cell(s) may be effectively shared on a specific cell.

Also, in the present disclosure, a proportional increase in the number of times of blind decoding (BD) as a large number of cell(s) are configured may also be alleviated.

In cases where a first cell transmits scheduling information of a second cell (in cases where scheduling information of the second cell is transmitted through the first cell), the first cell may be referred to as a scheduling cell and the second cell may be referred to as a scheduled cell. The first and second cells may be the same or different. A case in which the first and second cells are different cells corresponds to the aforementioned cross-carrier scheduling (CCS). Since RRP is configured for each Ucell appears aperiodically or discontinuously according to a carrier sensing (CS) result of each Ucell, a probability in which a large number of Ucell(s) RRP(s) are simultaneously configured at a specific timing is relatively low. In other words, a probability in which a large number of UCELL(s) RRP(s) are simultaneously configured at a specific timing and a large amount of scheduling information related to data transmission is simultaneously transmitted in the corresponding Ucell(s) RRP(s) is low. That is, a probability in which scheduling information regarding Ucells is simultaneously transmitted on an SS of a specific cell such as a scheduling cell scheduling a large number of Ucell(s) is not high. Thus, the corresponding large number of UCELL(s) SS(s) may be shared on a specific cell (i.e., a scheduling cell of the large number of Ucell(s)) through application of some (or all) of the proposed schemes. However, although such a method is applied, a blocking probability (BP) may not be high. Here, a scheduling cell (related to cross-carrier scheduling) of Ucell(s) may be configured to a Lcell (and/or Pcell and/or (previously configured (or signaled) Ucell), and/or a representative cell of a previously configured (or signaled) cell group (CG) (or a primary (S)cell of CG). Here, for example, a specific CG may include only Ucell(s) including (or not including) a scheduling cell or include a combination of Ucell(s)/Lcell(s) including (or not including) a scheduling cell. Also, for example, in cases where a specific CG does not include a scheduling cell, an SS regarding a plurality of previously configured (or signaled) CG(s)-related cell(s) (i.e., scheduled cell(s)) may be configured on one scheduling cell.

Also, for example, in cases where a scheduling cell may be configured to a representative cell of a previously configured (or signaled) CG (or primary (S)cell of the CG), an SS regarding the other remaining cell(s) of the corresponding CG may be configured on the corresponding representative cell (or primary (S)cell). Also, for example, a rule may be defined such that a common search space (CSS) is (exceptionally) defined on the representative cell of the CG described above (or primary (S)cell of the CG). Also, for example, some (or all) of the proposed schemes of the present disclosure may be extendedly applied to an SS configuration on a scheduling cell of Lcell(s), as well as a scheduling cell of a Ucell(s).

Hereinafter, for the purposes of description, a scheduling cell in which a multiple cell(s)-related SS is configured will be termed a "SCH_CELL". That is, another cell or a cell in which an SS for monitoring a DCI which schedules the cell is configured is termed a "SCH_CELL". Also, for example, a rule may be defined such that some (or all) of the proposed schemes of the present disclosure are limitedly applied only to a PDCCH USS (UE-specific SS)/common search space (CSS) (and/or EPDCCH USS/CSS) configuration. Also, for example, a rule may be defined such that some (or all) of the proposed schemes of the present disclosure are limitedly applied only to scheduled cell(s) (and/or SCH-CELL) of (the same system bandwidth (which belongs to the same CG or not), a transmission mode (and/or a CP configuration), a special subframe configuration, and/or the number of RE(s) available for EPDCCH transmission on a PRB pair of configuration of an EPDCCH set). Also, for example, in some (or all) of the proposed schemes of the present disclosure a representative CIF value (and/or a representative RNTI value) of each CG may be defined by a UE group-specific value or UE-specific value or CG-specific value). Also, for example, a rule may be defined such that some (or all) of the proposed schemes of the present disclosure are limitedly applied only to a CG including Ucell(s) (and/or Lcell(s)), may be limitedly applied only to Ucell(s) (or Lcell(s) or Ucell(s)/Lcell(s)) of a CG including Ucell(s) (and/or Lcell(s)), or may be limitedly applied only to a CG including only Ucell(s) (or Lcell(s)). Here, in another example, a rule may be defined such that some (or all) of the proposed methods of the present disclosure are limitedly applied only to Ucell(s) (or Lcell(s) or Ucell(s)/Lcell(s)) cross-carrier scheduled (CCS-ed) (and/or Ucell(s) (or Lcell(s) or Ucell(s)/Lcell(s)) self-scheduled (SFS-ed) from a previously configured (or signaled) SCH_CELL.

[Proposed method #1] A representative CIF (carrier indicator field) value (and/or representative RNTI value) of each cell group (CG) may be informed to the UE through predefined signaling. The representative CIF value may be provided to the UE through higher layer signaling or physical layer signaling.

Also, for example, when the UE receives the representative CIF value (and/or representative RNTI value) of each cell group, the UE configures/discovers a specific scheduled cell SS (and/or SCH_CELL SS) on a previously configured (or signaled) SCH_CELL using a representative CIF value (and/or representative RNTI value) of a CG to which the corresponding scheduled cell (and/or SCH_CELL) belongs. Here, in a specific example, the representative CIF value may be substituted to the aforementioned $n_{CI}$ parameter and the representative RNTI value may be substituted to an $n_{RNTI}$ parameter.

Also, for example, when the [proposed method #1] is applied, scheduled cell(s) (and/or SCH_CELL) constituting a specific CG share a common SS region on a previously configured (or signaled) SCH_CELL. In another example, when the [proposed method #1] is applied, the UE performs BD on scheduling information (i.e., (UL/DL) DCI format (or (UL/DL) grant)) related to (entire) configuration scheduled cell(s) (and/or SCH_CELL) of the CG through a single (common) SS region configured on the basis of (previously signaled (or designated)) representative CIF value and/or representative RNTI value. In another example, a rule may be defined such that a representative CIF value (and/or representative RNTI value) is information by UE groups through pre-defined signaling. Here, for example, the corresponding signaling may be defined as higher layer signaling or physical layer signaling. In a specific example, a UE which belongs to a specific UE group configures/discovers an SS related to a plurality of scheduled cell(s) (and/or SCH_CELL) configured for the UE on a previously configured (or signaled) SCH_CELL (the representative e CIF value is substituted to the $n_{CI}$ parameter and the representative RNTI value is substituted to the $n_{RNTI}$ parameter) using the corresponding specific UE group-related representative CIF value (and/or representative RNTI value).

In another example, a rule may be defined such that the [proposed method #1] is limitedly applied only to a cell group including Ucell(s) (and/or Lcell(s) (or such that the [proposed method #1] is limitedly applied to Ucell(s) (and/or Lcell(s) on a CG including Ucell(s) (and/or Lcell(s)), such that the [proposed method #1] is limitedly applied only to the Ucell(s)/Lcell(s), or such that the [proposed method #1] is limitedly applied only to a CG including Ucell(s) (or Lcell(s)). Here, in another example, a rule may be defined such that the [proposed method #1] is limitedly applied only to Ucell(s) (or Lcell(s) or Ucell(s)/Lcell(s)) CCS-ed (and/or Ucell(s) (or Lcell(s) or Ucell(s)/Lcell(s)) SFS-ed) from a previously configured (or signaled) SCH_CELL.

[Proposed method #2] Among the scheduled cell(s) (and/or SCH_CELL) constituting a certain cell group (CG), an SS configuration/region of a previously signaled (or designated) specific scheduled cell (and/or SCH_CELL) may also be shared (or equally assumed) also to the other configuration scheduled cell(s) (and/or SCH_CELL).

Here, for example, the corresponding signaling may be defined as higher layer signaling or physical layer signaling. Also, for example, application of such rule may also be interpreted such that when the UE uses (or substitutes) a CIF value of a (previously signaled (or designated)) specific scheduled cell (and/or SCH_CELL) (and/or a previously signaled representative RNTI value of each CG) when configuring/discovering an SS of the other configuration scheduled cell(s) (and/or SCH_CELL) of the corresponding cell group (CG).

For example, when the [proposed method #2] is applied, a scheduled cell(s) (and/or SCH_CELL) configuring a specific CG share a common SS region on a previously configured (or signaled) SCH_CELL. In another example, when the [proposed method #2] is applied, the UE performs BD on scheduling information (i.e., (UL/DL) DCI format (or (UL/DL) grant)) related to the other remaining configuration scheduled cell(s) (and/or SCH_CELL) (or corresponding specific scheduled cell (and/or (entire) configuration scheduled cell(s) of CG including SCH_CELL) (and/or SCHE_CELL)) of a CG of a corresponding specific scheduled cell (and/or SCH_CELL) and (specific scheduled cell (and/or SCH_CELL belonging thereto) through a single (common) SS region configured on the basis of a CIF value of (previously signaled (or designated)) specific scheduled cell (and/or SCH_CELL) and/or a representative RNTI value (of each previously signaled CG). Also, in another example, a rule may be defined such that the [proposed method #2] is limitedly applied only to a cell group including Ucell(s) (and/or Lcell(s) (or such that the [proposed method #2] is limitedly applied to Ucell(s) (and/or Lcell(s) on a CG including Ucell(s) (and/or Lcell(s)), such that the [proposed method #2] is limitedly applied only to the Ucell(s)/Lcell(s), or such that the [proposed method #2] is limitedly applied only to a CG including Ucell(s) (or Lcell(s)). Here, in another example, a rule may be defined such that the [proposed method #2] is limitedly applied only to Ucell(s) (or Lcell(s) or Ucell(s)/Lcell(s))CCS-ed (and/or Ucell(s) (or Lcell(s) or Ucell(s)/Lcell(s)) SFS-ed) from a previously configured (or signaled) SCH_CELL.

[Proposed method #3] The following some or all of rules may be applied when an Ss related to multiple scheduled cell(s) (and/or SCH_CELL) is configured (or shared) on a previously configured (or signaled) SCH_CELL through application of some or all of the proposed methods (e.g., at least one of [proposed method #1] and [proposed method #2]).

In another example, a rule may be defined such that the [proposed method #3] is limitedly applied only to a cell group (CG) including Ucell(s) (and/or Lcell(s)). Or, a rule may be defined such that the [proposed method #3] is limitedly applied only to Ucell(s) (or Lcell(s) or Ucell(s)/Lcell(s)) of a CG including U cell(s) (and/or Lcell(s)). Or, a rule may be defined such that the [proposed method #3] is limitedly applied only to a CG including only Ucell(s) (or Lcell(s)). Here, in another example, a rule may be defined such that the [proposed method #3] is limitedly applied only to Ucell(s) (or Lcell(s) or Ucell(s)/Lcell(s))CCS-ed (and/or Ucell(s) (or Lcell(s) or Ucell(s)/Lcell(s)) SFS-ed) from a previously configured (or signaled) SCH_CELL.

Example #3-1

In the [proposed method #1], for example, a rule may be defined such that a representative CIF value of each CG is used only when configuring/discovering an SS of scheduled cell(s) (and/or SCH_CELL) included in a specific CG (that is, the representative CIF value is substituted to the $n_{CI}$ parameter) and a CIF value of a (UL/DL) DCI format (or (UL/DL) grant, the same hereinafter) indicating scheduling information of an individual scheduled cell (and/or SCH_CELL) is configured to SERVCELLINDEX of each scheduled cell (and/or SCH_CELL).

Also, for example, in the [proposed method #2], a rule may be defined such that a CIF value of a specific scheduled cell (and/or SCH_CELL) is used only when configuring/discovering an SS of remaining scheduled cell(s) (and/or SCH_CELL) of a cell group (CG) (to which the corresponding specific scheduled cell (and/or SCH_CELL) belongs) (e.g., the representative CIF value is substituted to the $n_{CI}$ parameter) and a CIF value on a (UL/DL) DCI format (or (UL/DL) grant) indicating scheduling information of an individual scheduled cell (and/or SCH_CELL) is configured to SERVCELLINDEX of each scheduled cell (and/or SCH_CELL).

In another example, in the [proposed #1], a rule may be defined such that the representative CIF value of each CG is used as a CIF value on the (UL/DL) DCI format (or (UL/DL) grant) indicating scheduling information of an individual scheduled cell (and/or SCH_CELL), as well as when configuring/discovering an SS of a configuration scheduled cell(s) (and/or SCH_CELL) of a specific CG (e.g., the representative CIF value is substituted to the $n_{CI}$ parameter). Here, for example, according to the proposed method, the (UL/DL) DCI format (or (UL/DL) grant) transmitted on the basis of the representative CIF value may also be interpreted as scheduling information commonly applied to scheduled cell(s) (and/or SCH_CELL) forming a cell group interworking with (or linked to) the corresponding representative CIF value. That is, it may be interpreted as a form of multi-carrier scheduling.

In another example, in the [proposed method #2], a rule may be defined such that the CIF value of a specific scheduled cell (and/or SCH_CELL) is also used as a CIF value on the (UL/DL) DCI format (or (UL/DL) grant) indicating scheduling information of an individual scheduled cell (and/or SCH_CELL), as well as when configuring/discovering an SS of remaining scheduled cell(s) (and/or SCH_CELL) of a cell group (CG) (to which the corresponding specific scheduled cell (and/or SCH_CELL) belongs) (e.g., the representative CIF value is substituted to the $n_{CI}$ parameter).

In another example, in the [proposed method #1] and/or the [proposed method #2], in cases where a representative RNTI value of each cell group is not set (for example, in cases where a representative CIF value is configured or in cases where a CIF value of a previously signaled or designated specific scheduled cell (and/or SCH_CELL) is used (or substituted), the UE configures/discovers a specific scheduled cell SS (and/or SCH_CELL SS) on a previously configured (or signaled) SCH_CELL using a C-RNTI, or performs CRC parity bit(s) scrambling related to scheduling information (i.e., (UL/DL) DCI format (or (UL/DL) grant)) of an individual scheduled cell (and/or SCH_CELL).

Example #3-2

In the [proposed method #1], for example, a rule may be defined such that the representative RNTI value of each CG is used only when configuring/discovering an SS of configuration scheduled cell(s) (and/or SCH_CELL) of a specific CG (e.g., the representative RNTI value is substituted to $n_{RNTI}$ parameter) and a C-RNTI is used in CRC parity bit(s) scrambling related to scheduling information (i.e., (UL/DL) DCI format (or (UL/DL) grant)) of an individual scheduled cell (and/or SCH_CELL).

Also, for example, in the [proposed method #2], the representative RNTI value of a specific scheduled cell (and/or SCH_CELL) is used only in configuring/discovering an SS of the other remaining configuration scheduled cell(s) (and/or SCH_CELL) of the CG (to which the corresponding specific scheduled cell (and/or SCH_CELL) belongs) and a C-RNTI is used in CRC parity bit(s) scrambling related to scheduling information (i.e., (UL/DL) DCI format (or (UL/DL) grant)) of an individual scheduled cell (and/or SCH_CELL).

In another example, in the [proposed method #1], a rule may be defined such that the representative RNTI value of each CG is also used in CRC parity bit(s) scrambling related to scheduling information (i.e., (UL/DL) DCI format (or (UL/DL) grant)) of an individual scheduled cell (and/or SCH_CELL), as well as when configuring/discovering an SS of a configuration scheduled cell(s) (and/or SCH_CELL) of a specific CG (e.g., the representative RNTI value is substituted to the $n_{RNTI}$ parameter).

In another example, in the [proposed method #2], the representative RNTI value of the specific scheduled cell (and/or SCH_CELL) is also used in CRC parity bit(s) scrambling related to scheduling information (i.e., (UL/DL) DCI format (or (UL/DL) grant)) of an individual scheduled cell (and/or SCH_CELL), as well as when configuring/discovering an SS of the other remaining configuration scheduled cell(s) (and/or SCH_CELL) of the CG (to which the corresponding specific scheduled cell (and/or SCH_CELL) belongs)

In another example, in the [proposed method #1] and/or the [proposed method #2], in cases where the representative CIF value of each CG is not configured (i.e., in cases where only the representative RNTI value is configured), the UE configures/discovers a specific scheduled cell SS (and/or SCH_CELL SS) from a previously configured (or signaled) SCH_CELL or configure a CIF value on (UL/DL) DCI format (or (UL/DL) grant) indicating scheduling information of an individual scheduled cell (and/or SCH_CELL).

Example #3-3

As described above, in the SS of the SCH_CELL, scheduling information (UL/DL DCI format (i.e., UL/DL grant at the same meaning) regarding the SCH_CELL itself and scheduling information regarding another cell, i.e., a scheduled cell, may be transmitted. A rule may be defined such that a size (or length) of (UL/DL) DCI format (or (UL/DL) grant) related to multiple scheduled cell(s) (and/or SCH_CELL) transmitted in the SS of the SCH_CELL is set to be equal to a size (or length) of a (UL/DL) DCI format (or (UL/DL) grant) of a cell (referred to as a "MAX_BW_CELL") having a largest system bandwidth among the corresponding scheduled cell(s) (and/or SCH_CELL) or a cell (referred to as a "MIN_BW_CELL") having a smallest system bandwidth among the corresponding scheduled cell (s) (and/or SCH_CELL).

In a specific example, in the case of a (UL/DL) DCI format (or (UL/DL) grant) related to the scheduled cell (and/or SCH_CELL) having a system bandwidth smaller than that of the MAX_BW_CELL, zero padding is applied until a size thereof is equal to a size (or length) of the a (UL/DL) DCI format (or (UL/DL) grant) related to the MAX_BW_CELL.

Also, in another example, a rule may be defined such that a size (or length) of a (UL/DL) DCI format (or (UL/DL) grant) related to multiple scheduled cell(s) (and/or SCH_CELL) transmitted in the SS of the SCH_CELL is equal to a size (or length) of a (UL/DL) DCI format (or (UL/DL) grant) of previously signaled (or designated) scheduled cell (or SCH_CELL) among the corresponding scheduled cell(s) (and/or SCH_CELL).

Also, in another example, a rule may be defined such that a size (or length) of a (UL/DL) DCI format (or (UL/DL) grant) related to multiple scheduled cell(s) (and/or SCH_CELL) transmitted in the SS of the SCH_CELL is adjusted according to a system bandwidth signaled (or configured) previously for the corresponding purpose.

Also, in another example, a rule may be defined such that a size (or length) of a (UL/DL) DCI format (or (UL/DL) grant) related to multiple scheduled cell(s) (and/or SCH_CELL) transmitted in the SS of the SCH_CELL is configured (or fit) to be equal to that of a longest (or shortest) one of sizes (or lengths) of (UL/DL) DCI formats (or (UL/DL) grant) related to the corresponding scheduled cell(s) (and/or SCH_CELL).

Figure 9:
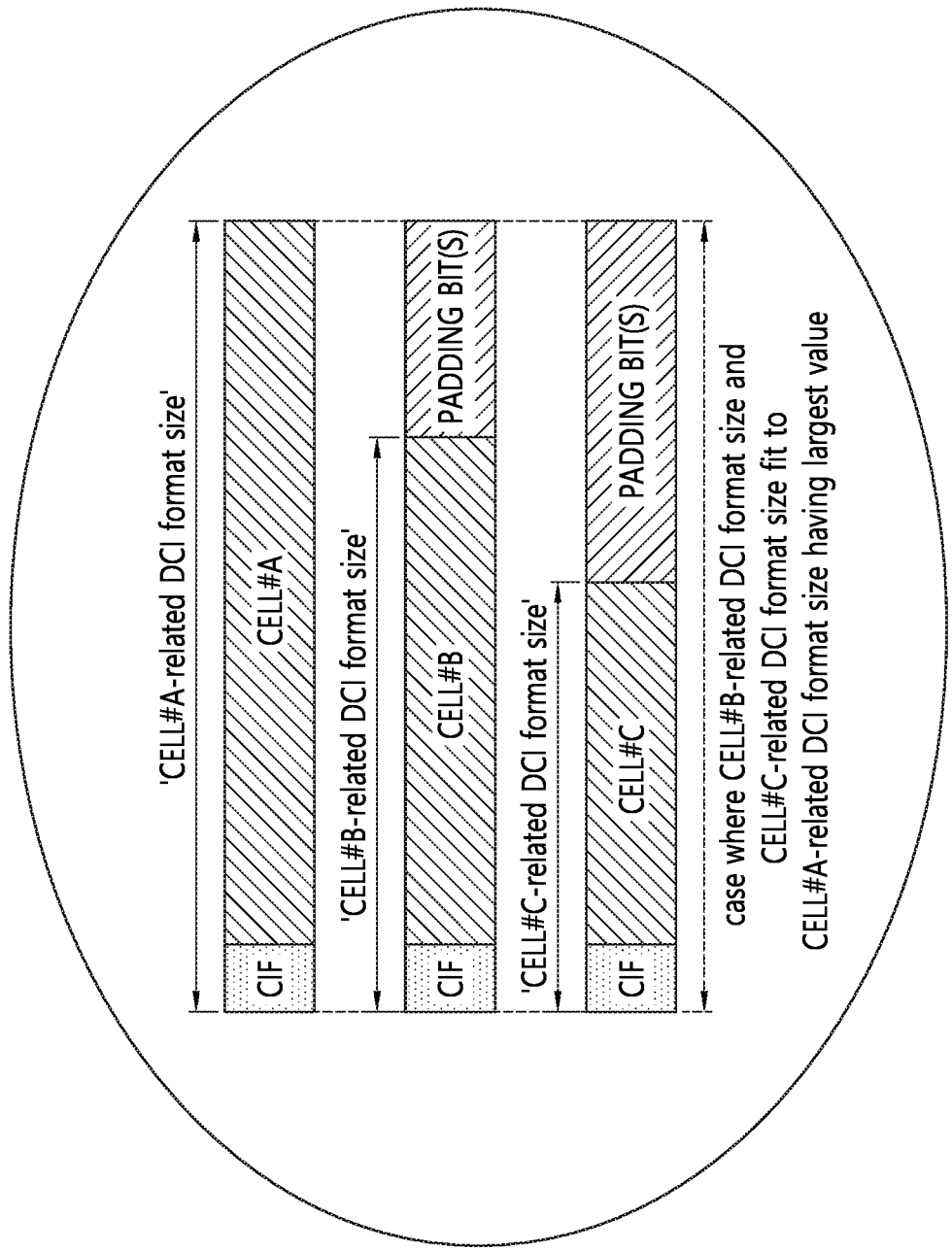
FIG. 9 illustrates an example of determining a size of scheduling information in a search space (SS) according to example #3-3.

FIG. 9 illustrates an example of determining a size of scheduling information in a search space (SS) according to example #3-3.

In FIG. 9, it is assumed that three preset or signaled cells (CELL#A, CELL#B, CELL#C) share an SS according to some or all of the proposed methods ([proposed method #1], [proposed method #2], (example #3-1), (example #3-2), and (example #3-3)).

It is assumed that the shared SS is configured in the CELL#A, and also, it is assumed that CELL#A-related (DL/UL) DCI format size>CELL#B-related (DL/UL) DCI format size>CELL#C-related (DL/UL) DCI format size (that is, CELL#B-related DCI format size and CELL#C-related DCI format size fit to CELL#A-related DCI format size having a largest value.

When a UE finally (actually) receives (individual) DCI format (or scheduling information) regarding each cell (CELL#A, CELL#B, and CELL#C), "DCI FORMAT SIZE FITTING"-applied DCI format (or scheduling information) is received as illustrated in FIG. 9. That is, DCE formats of CELL#B and CELL#C are zero-padded to have the same length as that of a DCI format of CELL#A. As a result, since lengths of the DCI formats of CELL#A, B, and C are equal, the UE may perform blind decoding on the premise that the DCI formats have one length, and thus, the number of times of attempting blind decoding may be reduced.

In another example, a size (or length) of a (UL/DL) DCI format (or (UL/DL) grant) related to multiple scheduled cell(s) (and/or SCH_CELL) transmitted in the SS of the SCH_CELL may be determined according to a previously signaled (or designated) system bandwidth and a transmission mode TM.

Also, in another example, the process of adjusting the sizes (or lengths) of (UL/DL) DCI formats (or (UL/DL) grant) related to multiple scheduled cell(s) (and/or SCH_CELL) transmitted in the SS of the SCH_CELL to be equal, as described above, may be separately (or independently) performed on a (previously designated (or signaled) TM common DCI format and a (previously designated (or signaled) TM dedicated DCI format. Here, for example, the TM common DCI format may be set to DCI format 0/1A, and the TM dedicated DCI format may be set to DCI format 2C/2D/4(/1B/1D/1/2A/2/2B). That is, in the SS of SCH_CELL, the DCI format 0/1A is adjusted to a DCI format having a first length, and the DCI format 2C/2D/4(/1B/1D/1/2A/2/2B) is adjusted to a DCI format having a second length. The first and second lengths may be previously determined or signaled.

Also, in another example, a rule may be defined such that the process of adjusting the sizes (or lengths) of (UL/DL) DCI formats (or (UL/DL) grant) related to multiple scheduled cell(s) (and/or SCH_CELL) transmitted in the SS of the SCH_CELL to be equal, as described above, is applied only to a specific CG among a CG including only Ucell(s), a CG including only Lcell(s), and both a Ucell and an Lcell.

Also, in another example, a rule may be defined such that (example #3-3) is limitedly applied only to scheduled cell(s) (and/or SCH_CELL) in which the same transmission mode TM is set (among multiple scheduled cell(s) (and/or SCH_CELL) sharing the SS of the SCH_CELL). Here, since system bandwidths are different although the transmission mode is the same, an increase in the number of times of blind decoding may be prevented.

Example #3-4

A rule may be defined such that some (or all) of the following parameters of previously signaled (or designated) scheduled cells (or SCH_CELL, MAX_BW_CELL, or MIN_BW_CELL) are considered to configure an aggregation level (AL) candidate for (UL/DL) DCI format (or (UL/DL) grant) blind decoding (BD) related to multiple scheduled cell(s) (and/or SCH-CELL) performed in the SS of SCH_CELL and/or determine the number of times of BD of each AL. That is, for blind decoding scheduling information in the SS of SCH_CELL, an AL, and the number of times of blind decoding of each AL may be determined. Here, parameters of a predetermined or signaled scheduled cell, a SCH_CELL, a MAX_BW_CELL, or a MIN_BW_CELL may be considered. Here, the parameters may include 1) a system bandwidth, 2) transmission mode, 3) cyclic prefix configuration, special frame configuration, the number of resource elements (REs) which may be used in EPDCCH transmission in a PRB pair forming an EPDCCH (which is called "N_EPDCCH"), and the like.

Here, for example, parameters such as AL candidate configuration, CP configuration for finally determining the number of times of blind decoding for each AL, a special subframe configuration, and or N_EPDCCH (exceptionally) SCH_CELL may be considered.

Also, in another example, it may be defined such that representative parameters selected according to some (or all) of following rules are considered in configuring an AL candidate for (UL/DL) DCI format (or (UL/DL) grant) BD related to multiple scheduled cell(s) (and/or SCH_CELL) performed on the SS of SCH_CELL and/or determining the number of times of BD for each AL. Here, for example, a rule may be defined such that parameters of SCH_CELL are considered as the representative parameters of the CP configuration for configuring an AL candidate and/or finally determining the number of times of BD in each AL, a special subframe configuration, and/or N_EPDCCH.

For example, among system bandwidths of scheduled cell(s) (and/or SCH_CELL), a largest (or smallest) bandwidth may be set as a representative system bandwidth value. Also, in another example, among system bandwidths of scheduled cell(s) (and/or SCH_CELL), a largest (or smallest) number of bandwidths may be set as representative system bandwidths.

For example, among transmission modes TM of scheduled cell(s) (and/or SCH_CELL), a TM having a largest (or smallest) TM-dependent DCI size (or length) may be set as a representative TM. Also, in another example, among TM(s) of scheduled cell(s) (and/or SCH_CELL) may be set as a representative TM.

For example, among CP configuration(s) (or special subframe configuration(s) or N_EPDCCH(s)) of scheduled cell(s) (and/or SCH_CELL), a largest (or smallest) number of CP configurations (or special subframe configurations or N_EPDCCHs) may be set as representative CP configurations.

In another example, a rule may be defined such that RE(s) number parameters which may be used for EPDCCH transmission on a system bandwidth, a transmission mode, a CP configuration, and/or a configuration PRB pair of a specific EPDCCH set previously signaled (or configured) for the purpose in determining an AL candidate configuration for (UL/DL) DCI format (or (UL/DL) grant) BD related to multiple scheduled cell(s) (and/or SCH_CELL) performed in SS(s) of SCH_CELL. For example, when (example #3-3) and/or (example #3-4) are applied, the UE performs BD on (UL/DL) DCI format (or (UL/DL) grant) related to multiple scheduled cell(s) (and/or SCH_CELL) on an SS of previously configured (or signaled) SCH-CELL.

[Proposed method #22] In order to create "single unified DL grant DCI format" by ("SS-shared or "non-SS shared") cells, a cell-related "DCI format 1A/DCI format 0" size" and "TM-dependent DCI format (e.g., DCI format 2C/2D size)" may be (re)configured to be equal to a shortest (or shortest) among the two. Through this, the number of times of BD may be reduced. That is, a single DCI format having a common length is used in an SS, and a length thereof is determined according to a longest or shortest DCI format among DCI format 0/1A and DCI formats whose length is varied depending on a transmission mode.

Here, for example, when such a rule is applied, a "DCI type indicator" field may be additionally (or newly) defined in a "single unified DL grant DCI format", and the corresponding DCI type indicator field serves to indicate which of "DCI format 1A (/DCI format 0) (type)" and "TM-dependent DCI format (type)" a (transmitted/received) "single unified DL grant DCI format" is. Here, in a specific example, when the UE finally (actually) receives the "single unified DL grant DCI format", if the DCI type indicator field indicates "DCI format 1A(/DCI format 0) (type)", "DCI format 1A(/DCI format 0)" which is "DCI format size fitted" to "TM-dependent DCI format" is (actually) received (on the assumption of "TM-dependent DCI format size>DCI format 1A (/DCI format 0)", and here, the other remaining portion excluding a scheduling information field corresponding to the DCI format 1A (/DCI format 0) within the "single unified DL grant DCI format" is padded with a bit of predefined (or signaled) value (e.g., "0").

Also, in another example, in order to create "single unified UL grant DCI format" by ("SS shared" or "non-SS shared") cells, a rule may be defined such that a cell-related "DCI format 0(/DCI format 1A) size" and "TM-dependent DCI format (e.g., DCI format 4) size" is (re)set (or adjusted) to be the same as a longest (or shortest) among the two.

[Proposed method #4] For example, cell(s) configured to the same cell group (CG) may be interpreted such that some or all of the following parameters are equally configured (or shared). In other words, all (or some) of the following parameters may be interpreted to be configured in units of CGs.

Also, in another example, a rule may be defined such that all (or some) of the following parameters are configured such that only the same cell(s) are configured to the same cell group.

In another example, a rule may be defined such that the [proposed method #4] is limitedly applied only to a CG including Ucell(s) (and/or Lcell(s)), or a rule may be defined such that the [proposed method #4] is limitedly applied only to Ucell(s) (or Lcell(s) or Ucell(s)/Lcell(s)) of a CG including Ucell(s) (and/or Lcell(s)). Or, a rule may be defined such that the "proposed method #4] is limitedly applied only to a CG including only Ucell(s) or Lcell(s).

Also, in another example, a rule may be defined such that the [proposed method #4] is limitedly applied only to Ucell(s) (or Lcell(s) or Ucell(s)/Lcell(s))CCS-ed (and/or Ucell(s) (or Lcell(s) or Ucell(s)/Lcell(s)) SFS-ed) from a previously configured (or signaled) SCH_CELL.

Parameters in the [proposed method #4] are as follows.
1) TM and/or system bandwidth and/or CP configuration and/or special subframe configuration (and/or N-EPDCCH)
2) Aperiodic CSI (A-CSI) reporting-related serving cell(s) set and/or CSI process(es) set interworking by values (or states) of a CSI request field
3) Periodic CSI (P-CSI) reporting configuration
4) ((E)PDCCH) USS (and/or CSS)

[Proposed method #5] For example, control channel information (and/or SS type information) interworking (or to be monitored) by cell groups (or cells) may be provided to the UE through predefined signaling. Here, for example, the corresponding signaling may be defined as higher layer signaling or physical layer signaling. Also, for example, the corresponding control channel information may be indicated by one of PDCCH (USS and/or CSS) and EPDCCH (USS), indicated by one of PDCCH (USS and/or CSS), EPDCCH SET#0 (USS), and EPDCCH set#1 (USS) (in cases where two EPDCCH set(s) are configured), or indicated by one of EPDCCH SET#0 (USS) and EPDCCH set#1 (USS) (in cases where two EPDCCH set(s) are configured).

In a specific example, in cases where two CG(s) (e.g., CG#0 and CG#1) are configured, it may be configured such that scheduling information (i.e., (UL/DL) DCI format (or (UL/DL) grant)) related to scheduled cell(s) (and/or SCH_CELL#X) forming the CG#0 is received through a PDCCH (USS and/or CSS) on a previously configured (or signaled) SCH_CELL#X, and scheduling information (i.e., (UL/DL) DCI format (or (UL/DL) grant)) related to scheduled cell(s) (and/or SCH_CELL#Y) forming the CG#1 is received through an EPDCCH (USS) on a previously configured (or signaled) SCH_CELL#Y.

Here, for example, SCH_CELL#X and SCH_CELL#Y may be configured as different (or the same) cells. Also, in another example, it may be configured such that scheduling information (i.e., (UL/DL) DCI format (or (UL/DL) grant)) related to scheduled cell#W (and/or SCH_CELL#A) is received through a PDCCH (USS and/or CSS) on a previously configured (or signaled) SCH_CELL#A and scheduling information (i.e., (UL/DL) DCI format (or (UL/DL) grant)) related to scheduled cell#Q (and/or SCH_CELL#B) is received through an EPDCCH (USS) on a previously configured (or signaled) SCH_CELL#B. Here, for example, scheduled cell#W and scheduled cell#Q may belong to the same CG or different CGs. Also, for example, SCH_CELL#A and SCH_CELL#B may be configured as the same cell (or different cells). Also, in another example, scheduling information related to scheduled cell(s) (and/or SCH_CELL#N) forming a CG to which predefined (or signaled) cells belong (i.e., scheduling information related to (UL/DL) DCI format (or (UL/DL) grant)) (or predefined (or signaled) scheduled cell (and/or SCH_CELL#N) may be configured to be received through a PDCCH (USS and/or CSS) on the SCH_CELL#N (or EPDCCH (USS) or EPDCCH set#0 (USS) or EPDCCH set#1 (USS)). Here, for example, the predefined (or signaled) cell may be configured as a Pcell.

By applying some rules of the [proposed method #5], for example, excessive concentration of every scheduling information transmissions related to scheduled cell(s) (and/or SCH_CELL) interworking with the corresponding SCH_CELL on a specific control channel of the SCH_CELL (and/or SS) may be alleviated.

Also, for example, in cases where an SS related to a specific scheduled cell (and/or SCH_CELL) is configured/discovered on a predefined (or signaled) SCH_CELL by applying the [proposed method #5], some (or all) of the proposed methods (e.g., [proposed method #1], [proposed method #2], [proposed method #3] and [proposed method #4] described above may be applied together. Also, in another example, a rule may be defined such that the [proposed method #5] is limitedly applied only to a CG including Ucell(s) (and/or Lcell(s)) (or a rule may be defined such that the [proposed method #5] is limitedly applied only to Ucell(s) (or Lcell(s) or Ucell(s)/Lcell(s)) of a CG including Ucell(s) (and/or Lcell(s)). Here, in another example, a rule may be defined such that the [proposed method #5] is limitedly applied only to Ucell(s) (or Lcell(s) or Ucell(s)/Lcell(s))CCS-ed (and/or Ucell(s) (or Lcell(s) or Ucell(s)/Lcell(s)) SFS-ed) from a previously configured (or signaled) SCH_CELL.

[Proposed method #6] For example, a rule may be defined such that an SS related to scheduled cell(s) (and/or SCH_CELL#R) configured on the SCH_CELL#R by subframes and a n SS related to a cell group (CG) are partially (or entirely) different through predefined rule (or signaling).

Here, for example, corresponding CG and/or scheduled cell(s) may be configured as (or limited to) a CG to which the SCH_CELL#R belongs and/or scheduled cell(s) forming the CG to which the SCH_CELL#R belongs, or may be configured as a CG to which SCH_CELL#R does not belong or scheduled cell(s) forming the CG to which the SCH_CELL#R does not belong according to a predefined (or signaled) rule. In a specific example, at a subframe #N (SF#N) timing, an SS related to scheduled cell#A (and/or SCH_CELL#R) (belonging to the same CG or different CGs) is configured on the SCH_CELL#R and, at a subframe #M (SF#M) timing, an SS related to scheduled cell#B (and/or SCH_CELL#R) (belonging to the same CG or different CGs) is configured on the SCH_CELL#R. Also, for example, in cases where an SS related to specific scheduled cell (and/or SCH_CELL#R) is configured/discovered on a predefined (or signaled) SCH_CELL#R) by applying the [proposed method #6], some (or all) of the proposed methods (e.g., proposed method #1), [proposed method #2], [proposed method #3], [proposed method #4], and [proposed method #5] described above may be applied together.

Also, in another example, a rule may be defined such that the [proposed method #6] is limitedly applied only to a CG including Ucell(s) (and/or Lcell(s)) (or a rule may be defined such that the [proposed method #6] is limitedly applied only to Ucell(s) (or Lcell(s) or Ucell(s)/Lcell(s)) of a CG including Ucell(s) (and/or Lcell(s)), or a rule may be defined such that the [proposed method #6] is limitedly applied only to a CG including only Ucell(s) (or Lcell(s)). Here, in another example, a rule may be defined such that the [proposed method #6] is limitedly applied only to Ucell(s) (or Lcell(s) or Ucell(s)/Lcell(s))CCS-ed (and/or Ucell(s) (or Lcell(s) or Ucell(s)/Lcell(s)) SFS-ed) from a previously configured (or signaled) SCH_CELL.

[Proposed method #7] For example, the number of symbols forming a control channel or the number of PRB-pairs may be increased through predefined rule (or signaling). Here, for example, the control channel may be interpreted as a PDCCH or an EPDCCH (or EPDCCH set#0, EPDCH set#1).

Before describing the proposed method in detail, an example regarding existing CFI codeword(s) mapping of each CFI is illustrated in Table 13 below.

TABLE 13

| CFI | CFI code word $<b_0, b_1, \ldots, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

A CFI indicates the number of OFDM symbols forming a PDCCH and is transmitted through a PCFICH. The CFI has values of 1, 2, and 3, and in cases where the number of resource blocks constituting a system band is greater than 10, the CFI value sequentially indicates 1, 2, and 3 OFDM symbols. In cases where the number of resource blocks constituting a system band is 10 or less, the CFI value sequentially indicates 2, 3, and 4 OFDM symbols.

Also, in another example, a rule may be defined such that the [proposed method #7] is limitedly applied only to a CG including Ucell(s) (and/or Lcell(s)) (or a rule may be defined such that the [proposed method #7] is limitedly applied only to Ucell(s) (or Lcell(s) or Ucell(s)/Lcell(s)) on a CG including Ucell(s) (and/or Lcell(s)) or a rule may be defined such that the [proposed method #7] is limitedly applied only to a CG including only Ucell(s) (or Lcell(s)). Here, in another example, the [proposed method #7] is limitedly applied only to Ucell(s) (or Lcell(s) or Ucell(s)/Lcell(s))CCS-ed (and/or Ucell(s) (or Lcell(s) or Ucell(s)/Lcell(s)) SFS-ed) from a previously configured (or signaled) SCH_CELL.

In a specific example, in the case of PDCCH, an additional value may be linked to an advanced UE (A-UE) through predefined signaling by CFI values (or CFI states) transmitted through a PCFICH. Here, as an example of application of the corresponding rule, existing CFI values 1, 2, 3, (,4) may be linked to sequentially indicate 1, 2, 4 (,5) OFDM symbols or 2, 3, 4 (,5) OFDM symbols. In such a case, for example, the A-UE may assume that the number of OFDM symbols corresponding to a CFI value is the number of symbols constituting a PDCCH.

Table 14 below illustrates an example of mapping between CFI values and CFI codewords.

TABLE 14

| CFI for L-UE | CFI for A-UE | CFI code word $<b_0, b_1, \ldots, b_{31}>$ |
|---|---|---|
| 1 | 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | 4 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| (4) (Reserved) | (5) (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

Table 14 will be referred to as an example #7-1 hereinafter.

TABLE 15

| CFI for L-UE | CFI for A-UE | CFI code word $<b_0, b_1, \ldots, b_{31}>$ |
|---|---|---|
| 1 | 2 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | 3 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | 4 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| (4) (Reserved) | (5) (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

Table 15 will be referred to as an example #7-2 hereinafter.

An L-UE refers to an existing UE and an A-UE refers to an advanced UE. As can be seen from Table 14 and Table 15, although CFI codewords are the same, the L-UE and the A-UE may interpret the same CFI codewords to have different CFI values.

Also, in another example, in the case of PDCCH, it may be configured such that a reserved state (e.g., fourth CIF codeword in the above Table) is informed to the A-UE through a PCFICH so that the A-UE can interpret the corresponding reserved state as a predefined (or signaled) CFI value (e.g., 4). Here, for example, interpretation regarding the other remaining state(s) (e.g., 1, 2, 3) excluding the corresponding reserved state (e.g., 4) is assumed to be the same as the related art.

The following table illustrates an example of applying such a proposed scheme.

TABLE 16

| CFI for L-UE | CFI for A-UE | CFI code word $<b_0, b_1, \ldots, b_{31}>$ |
|---|---|---|
| 1 | 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | 4 | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

Table 16 will be referred to as an example #7-3 hereinafter.

Also, in another example, in the case of PDCCH, an offset value (hereinafter, referred to as "OFFSET") is informed to the A-UE through predefined signaling, and when a CFI value (e.g., "L") transmitted through a PCFICH is interpreted, the corresponding OFFSET may be added to assume a final CFI value (e.g., "L+OFFSET").

The following table illustrates an example of applying such a proposed technique. Here, an example in which the corresponding OFFSET value is set to 1 (through predefined signaling).

TABLE 17

| CFI for L-UE | CFI for A-UE | CFI code word $<b_0, b_1, \ldots, b_{31}>$ |
|---|---|---|
| 1 | '1 + 1' | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | '2 + 1' | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | '3 + 1' | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| (4) (Reserved) | ('4 + 1') (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

Table 17 will be referred to as an example #7-4 hereinafter.

Also, in another example, in cases where some (or all) of the proposed rules described above are applied, it may be defined such that a region (referred to as "LA_REGION") in which control (/scheduling) information of the legacy (L-UE) and the advanced UE (A-UE) can be multiplexed and a region (referred to as an "A-REGION") in which only control (/scheduling) information of the A-UE can be transmitted are independently configured.

Here, for example, the LA_REGION may include a (PDCCH) region based on the existing CFI value, and the A_REGION may include a (PDCCH) region obtained by subtracting the (PDCCH) region based on the existing CFI value from a (PDCCH) region based on an additionally set (or extended) CFI value.

Here, for example, (DCI transmission-related) (E)CCE/(E)REG indexing (and/or mapping) may be independently performed on LA_REGION/A_REGION. In a specific example, in cases where the aforementioned (example #7-2) is configured/applied, if a CFI value indicates "1", the L-UE interprets (or regards) the corresponding CFI value (equally) as "1", and the A-UE interprets (or regards) the corresponding CFI value as (previously signaled) "2". In this context, for example, when the aforementioned proposed method is applied, a region including a first (OFDM) symbol and a region including a second (OFDM) symbol are interpreted (or regarded) as the LA_REGION and A_REGION, respectively, and (DCI transmission-related) (E)CCE/(E)REG indexing (and/or mapping) is independently performed in the individual regions.

Also, in another example, in cases where the aforementioned example #7-2 is configured/applied, if the CFI value indicates "3", the L-UE interprets (or regards) the corresponding CFI value (equally) as "3" and the A-UE interprets (or regards) the corresponding CFI value as (previously signaled) "4". In this context, for example, when the aforementioned proposed method is applied, a region including first, second and third (OFDM) symbols and a region including a fourth (OFDM) symbol are interpreted (or regarded) as the LA_REGION and the A-REGION, respectively, and (DCI transmission-related) (E)CCE/(E)REG indexing (and/or mapping) is independently performed in the individual regions.

Also, in another example, in cases where a CFI value transmitted to the A-UE indicates a reserved state and the corresponding reserved state is configured to be interpreted (or regarded) as "4" through a predefined rule (or signaling), a region including first, second and third (OFDM) symbols and a region including a fourth (OFDM) symbol are interpreted (or regarded) as the LA_REGION and the A-REGION, respectively, and (DCI transmission-related) (E)CCE/(E)REG indexing (and/or mapping) is independently performed in the individual regions.

Also, in another example, in cases where a CFI value transmitted to the A-UE indicates a reserved state and the corresponding reserved state is configured to be interpreted (or regarded) as "4" through a predefined rule (or signaling), a region including first, second, third, and fourth (OFDM) symbols is interpreted (or regarded) entirely as the A-REGION (or LA_REGION) and the A-REGION and (DCI transmission-related) (E)CCE/(E)REG indexing (and/or mapping) is performed in the corresponding region.

Also, for example, a rule may be defined such that configuring/mapping a (L-UE/A-UE) PCFICH and/or a PHICH-related resource is performed on the LA_REGION (or configuring/mapping a PHICH-related resource is performed on the basis of a PHICH duration value signaled through a PBCH). Here, in another example, a rule maybe defined such that configuring/mapping a PHICH-related resource of the L-UE is performed on the LA_REGION and configuring/mapping a PHICH-related resource of the A-UE is performed on the A_REGION (i.e., configuring/mapping a PCFICH-related resource is performed on the LA_REGION. Also, in another example, a rule may be defined such that a PDCCH CSS is (exceptionally) configured on the LA_REGION. Also, in another example, a rule may be defined such that, when some (or all) of the proposed rules described above are applied, a remaining (PDCCH) region obtained by subtracting the existing CFI value-based (PDCCH) region from the additionally configured (or extended) CFI value-based (PDCCH) region in the (existing CFI value (i.e., PDSCH starting symbol position)-based) PDSCH region transmitted to the L-UE is punctured in consideration of the fact that the CFI values assumed by the L-UE and the A-UE on the corresponding subframe are different.

Also, in another example, a rule may be defined such that A-UE-related scheduling information transmission and/or PDSCH transmission are assumed to be performed on a corresponding subframe in cases where some (or all) of the proposed rules described above are applied. Here, for example, a rule may be defined such that the corresponding subframe information is informed to the L-UE through predefined signaling. When such a rule is applied, for example, it may be configured such that, (since there is no L-UE-related control (/scheduling) information transmission), configuring/mapping of A-UE-related (DCI transmission-related) (E)CCE/(E)REG indexing (and/or mapping) and/or PCFICH and/or PHICH-related resource is performed on the additionally configured (or extended) CFI value-based (PDCCH) region. Also, in another example, a rule may be defined such that the some (or all) of the proposed rules described above are not applied to a subframe in which an SIB and/or PAR and/or PBCH and/or paging is received.

The following tables illustrate an example regarding setting the number of times of blind decoding (BD) of each AL when one EPDCCH set includes 12 PRB-pair(s).

TABLE 18

| | Number of EPDCCH candidates $M_p^{(L)}$ for Case 1 | | | | | Number of EPDCCH candidates $M_p^{(L)}$ for Case 2 | | | | |
|---|---|---|---|---|---|---|---|---|---|---|
| $N_{RB}^{X_p}$ | L = 2 | L = 4 | L = 8 | L = 16 | L = 32 | L = 1 | L = 2 | L = 4 | L = 8 | L = 16 |
| 12 | 4 | 4 | 4 | 3 | 1 | 4 | 4 | 4 | 3 | 1 |

In Table 18, regarding one distributed EPDCCH-PRB set, the number of EPDCCH candidates monitored by a UE for each of Cases 1 and 2 is illustrated.

TABLE 19

| | Number of EPDCCH candidates $M_p^{(L)}$ for Case 3 | | | | |
|---|---|---|---|---|---|
| $N_{RB}^{X_p}$ | L = 1 | L = 2 | L = 4 | L = 8 | L = 16 |
| 12 | 4 | 4 | 4 | 2 | 2 |

In Table 19, regarding one distributed EPDCCH-PRB set, the number of EPDCCH candidates monitored by a UE for Case 3 is illustrated.

TABLE 20

| | Number of EPDCCH candidates $M_p^{(L)}$ for Case 1 | | | | Number of EPDCCH candidates $M_p^{(L)}$ for Case 2 | | | |
|---|---|---|---|---|---|---|---|---|
| $N_{RB}^{X_p}$ | L = 2 | L = 4 | L = 8 | L = 16 | L = 1 | L = 2 | L = 4 | L = 8 |
| 12 | 6 | 6 | 2 | 2 | 6 | 6 | 2 | 2 |

In Table 20, regarding one localized EPDCCH-PRB set, the number of EPDCCH candidates monitored by a UE for each of Cases 1 and 2 is illustrated.

TABLE 21

| | Number of EPDCCH candidates $M_p^{(L)}$ for Case 3 | | | |
|---|---|---|---|---|
| $N_{RB}^{X_p}$ | L = 1 | L = 2 | L = 4 | L = 8 |
| 12 | 6 | 6 | 2 | 2 |

In Table 21, regarding one localized EPDCCH-PRB set, the number of EPDCCH candidates monitored by a UE for Case 3 is illustrated.

[Proposed method #8] For example, it may be configured such that, in some (or all) of the proposed methods described above (e.g., [proposed methods #1 to #7]), scheduled cell(s) (and/or SCH_CELL) having the same representative CIF value (and/or representative RNTI value) share AL candidate configuration and/or the number of times of BD in each AL, as well as sharing an SS on a predefined (or signaled) SCH_CELL).

Here, for example, when the corresponding method is applied, scheduled cell(s) (and/or SCH_CELL) having the same representative CIF value (and/or representative RNTI value) may be interpreted as one virtual cell.

For example, in the case of K number of scheduled cell(s) having the same representative CIF value (and/or representative RNTI value) (e.g., the same (DL/UL) TM(S)/USS is assumed), when BD is performed on scheduling information ((UL/DL) DCI format (or (UL/DL) grant)) related to the corresponding cell(s), '{AL, BD}={1, 6}, {2, 6}, {4, 2}, {8, 2}' (or '{AL, BD}={1, 3}, {2, 3}, {4, 1}, {8, 1}' (e.g., it may be interpreted as a case where the number of times of BD for each AL is halved (BD (NUMBER) REDUCTION)), or '{AL, BD}={1, 6}, {2, 6}, {4, 1 (or 0)}, {8, 1 (or 0)}' (e.g., it may be interpreted as a case where the number of times of BD for relatively high ALs is reduced), or '{AL, BD}={1, 1 (or 0)}, {2, 1 (or 0)}, {4, 2}, {8, 2}' (e.g., it may be interpreted as a case where the number of times of BD for relatively low ALs is reduced), rather than '{AL, BD}={1, 6*K}, {2, 6*K}, {4, 2*K}, {8, 2*K}', are applied.

In another example, in the some (or all) of the proposed methods described above (e.g., [proposed methods #1 to #7]), scheduled cell(s) (and/or SCH_CELL) having the same representative CIF value (and/or representative RNTI value) share only an SS on the predefined (or signaled) SCH_CELL and AL candidate configuration and/or the number of times of BD for each AL are regarded (or configured) to be independent (or not shared). Here, for example, when the corresponding method is applied, the scheduled cell(s) (and/or SCH_CELL) having the same representative CIF value (and/or representative RNTI value) may share only the SS and may be interpreted as independent cell(s).

For example, in the case of K number of scheduled cell(s) having the same representative CIF value (and/or representative RNTI value) (e.g., the same (DL/UL) TM(S)/USS is assumed), when BD is performed on scheduling information ((UL/DL) DCI format (or (UL/DL) grant)) related to the corresponding cell(s), '{AL, BD}={1, 6*K}, {2, 6*K}, {4, 2*K}, {8, 2*K}' (or '{AL, BD}={1, 3*K}, {2, 3*K}, {4, 1*K}, {8, 1*K}' (e.g., it may be interpreted as a case where the number of times of BD for each AL is halved), or '{AL, BD}={1, 6*K}, {2, 6*K}, {4, 1*K (or 0)}, {8, 1*K (or 0)}' (e.g., it may be interpreted as a case where the number of times of BD for relatively high ALs is reduced), or '{AL, BD}={1, 1*K (or 0)}, {2, 1*K (or 0)}, {4, 2*K}, {8, 2*K}' (e.g., it may be interpreted as a case where the number of times of BD for relatively low ALs is reduced) are applied.

In another example, in the case of K number of scheduled cell(s) having the same representative CIF value (and/or representative RNTI value) (e.g., the same (DL/UL) TM(S)/USS is assumed), when BD is performed on scheduling information ((UL/DL) DCI format (or (UL/DL) grant)) related to the corresponding cell(s), it may be configured to apply '{AL, BD}={1, 1*K}, {2, 1*K}, {4, 1*K}, {8, 1*K}'. Here, for example, the corresponding rule may be useful in cases where a relative small number (e.g., 1) of scheduling information ((UL/DL) DCI format (or (UL/DL) grant)) is transmitted by scheduled cells (from a vantage point of a specific UE).

Also, for example, such a rule may be limitedly applied to a case where the K number of scheduled cell(s) include only Ucell(s) (or Lcell(s) or a combination of Ucell(s) and Lcell(s)). In additional example, a rule may be defined such that the [proposed method #8] is limitedly applied only to cell(s) that belong to the same CG (and/or different CGs).

Also, in another example, a rule may be defined such that the [proposed method #8] is limitedly applied only to a CG including Ucell(s) (and/or Lcell(s)) (or a rule may be defined such that the [proposed method #8] is limitedly applied only to Ucell(s) (or Lcell(s) or Ucell(s)/Lcell(s)) of a CG including Ucell(s) (and/or Lcell(s)) or a rule may be defined such that the [proposed method #8] is limitedly applied only to a CG including only Ucell(s) (or Lcell(s)).

Also, in another example, a rule may be defined such that the [proposed method #8] is limitedly applied only to Ucell(s) (or Lcell(s) or Ucell(s)/Lcell(s))CCS-ed (and/or Ucell(s) (or Lcell(s) or Ucell(s)/Lcell(s)) SFS-ed) from a previously configured (or signaled) SCH_CELL.

[Proposed method #9] For example, a rule may be defined such that, in some (or all) of the proposed methods described above (e.g., [proposed methods #1 to #8]), when an SS related to multiple scheduled cell(s) (and/or SCH_CELL#T) is configured (or shared) in a previously configured (or signaled) SCH_CELL#T, AL candidate configuration for scheduling information ((UL/DL) DCI format (or (UL/DL) grant)) BD and/or the number of times of BD for each AL are configured (or assumed) to be partially (or entirely) different according to cell types.

Here, for example, the corresponding scheduled cell(s) and/or SCH_CELL#T may belong to the same CG (or different CGs). In a specific example of application of the proposed method, when a scheduled Ucell#X, a scheduled Ucell#Y, and a scheduling Lcell#T belong to a CG#N and an SS related to the scheduled Ucell#X, the scheduled Ucell#Y, and the scheduling Lcell#T is shared (/configured) in the scheduling Lcell#T, '{AL, BD}={1, 3}, {2, 3}, {4, 1}, {8, 1}' (e.g., it may be interpreted as a case where the number of times of BD for each AL is halved, compared with Lcell) (o '{AL, BD}={1, 6}, {2, 6}, {4, 0}, {8, 0}' (e.g., it may be interpreted as a case where BD is not performed on a relatively high AL(s) or ' {AL, BD}={1, 0}, {2, 0}, {4, 2}, {8, 2}' (e.g., it may be interpreted as a case where BD is not performed on a relatively low AL(s)) may be configured for the scheduled Ucell#X and the scheduled Ucell#Y, and '{AL, BD}={1, 6}, {2, 6}, {4, 2}, {8, 2}' may be configured to the scheduling Lcell#T.

Here, for example, in the corresponding example, a case (i.e., the [proposed method #8] where the scheduled cell(s) (and/or SCH_CELL) having the same representative CIF value (and/or representative RNTI value) shares only an SS of the predefined (or signaled) SCH_CELL and the AL candidate configuration and/or the number of times of BD for each AL are regarded as being independent (or not shared) is assumed.

Also, in another example, in cases where an SS related to the scheduled Ucell#X, the scheduled Ucell#Y, and the scheduling Lcell#T (i.e., CG#N) is shared (/configured) in the scheduling Lcell#T and the AL candidate configuration for scheduling information ((UL/DL) DCI format (or (UL/DL) grant)) BD of the corresponding cell(s) and/or the number of times of BD for each AL is shared (or configured) as '{AL, BD}={1, 6}, {2, 6}, {4, 2}, {8, 2}' by applying some (or all) of the proposed methods described above (e.g., [proposed methods #1 to #8]), '{AL, BD}={1, 2}, {2, 2}, {4, 1}, {8, 1}' (e.g., it may be interpreted as a case where the number of times of BD is configured to be smaller than that of Lcell) may be set for the scheduled Ucell#X and the scheduled Ucell#Y and '{AL, BD}={1, 4}, {2, 4}, {4, 1}, {8, 1}' (i.e., the number of times of BD for the entire ALs is maintained as '{AL, BD}={1, 6}, {2, 6}, {4, 2}, {8, 2}') may be set for the scheduling Lcell#T. Here, for example, in the corresponding example, a case where scheduled cell(s) (and/or SCH_CELL) having the same representative CIF value (and/or representative RNTI value) share AL candidate configuration and/or the number of times of BD in each AL, as well as sharing an SS on a predefined (or signaled) SCH_CELL) is assumed (i.e., please refer to the [proposed method #8])

Also, in another example, a rule may be defined such that the [proposed method #9] is limitedly applied only to a CG including Ucell(s) (and/or Lcell(s)), or a rule may be defined such that the [proposed method #9] is applied only to Ucell(s) (or Lcell(s) or Ucell(s)/Lcell(s)) of a CG including Ucell(s) (and/or Lcell(s)). Or, a rule may be defined such that the [proposed method #9] is limitedly applied only to a CG including Ucell(s) (or Lcell(s)). Here, in another example, a rule may be defined such that the [proposed method #9] is limitedly applied only to Ucell(s) (or Lcell(s) or Ucell(s)/Lcell(s))CCS-ed (and/or Ucell(s) (or Lcell(s) or Ucell(s)/Lcell(s)) SFS-ed) from a previously configured (or signaled) SCH_CELL.

The existing PDSCH starting position (referred to as "PDSCH_SP") and an EPDCCH starting position (referred to as "EPDCCH_SP") may be defined as follows.

A starting OFDM symbol (positioned in a first slot of a subframe) of a PDSCH of each activated serving cell may be given by an index $l_{Datastart}$.

Regarding a given activated serving cell, the UE configured by the transmission mode 1-9 is configured to be allocated a PDSCH by an EPDCCH received from the same serving cell or monitor an EPDCCH in a subframe, and in cases where a PDSCH is not allocated by a PDCCH/EPDCCH, if epdcch-StartSymbol-r11, a higher layer parameter, is configured, $l_{Datastart}$ is given by the epdcch-StartSymbol-r11.

If, however, the PDSCH and the corresponding PDCCH/EPDCCH are received from different serving cells, $l_{Datastart}$ is given by a higher layer parameter pdsch-Start-r10 regarding a serving cell from which the PDSCH is received.

In other cases, $l_{Datastart}$ is given by a CFI value. When the number of resource blocks of a (DL) system band is greater than 10, $l_{Datastart}$ is given as a CIF value, and when the number of resource blocks of the (DL) system band is equal to or smaller than 10, $l_{Datastart}$ is given as a CFI value+1.

A starting position of an EPDCCH may be given as follows.

When a UE is configured to receive a PDSCH data transmitted according to a transmission mode 1-9 by a higher layer signal and a higher layer signal epdcch-Start-Symbol-r11 has been set, a starting OFDM symbol of the EPDCCH is given by an index $l_{EPDCCHStart}$. If not, the starting OFDM symbol of the EPDCCH given by $l_{EPDCCHStart}$ is determined by a CFI value.

For example, in cases where the number of symbols constituting a PDCCH is increased by applying the aforementioned proposed method (e.g., [proposed method #7], EPDCCH_SP and PDSCH_SP are required to be redefined in consideration of a relatively increased PDCCH region. In other words, the existing EPDCCH_SP and/or PDSCH_SP may be designated by one of values from 1 (first symbol) to 4 (fourth symbol) through higher layer signaling. However, if the PDCCH region is increased (or designated) to a region from the first symbol to a fifth symbol, a maximum value of the existing EPDCCH_SP and/or PDSCH_SP is 4 (fourth symbol), causing a problem that the increased PDCCH region and the EPDCCH region and/or PDSCH_SP region overlap. This problem may be solved by applying the following proposed methods. For example, a rule may be defined such that the following proposed methods are limitedly applied only to a case where EPDCCH_SP-related EPDCCH-STARTSYMBOL-R11 is configured, a case of a PDSCH (cell#X) self-scheduled (SFS-ed) from an EPDCCH (cell#X) of the same serving cell#X, a case of a PDSCH (cell#X) cross-carrier scheduled (CCS-ed) from an EPDCCH/PDCCH (cell#Y) of a different serving cell#Y, a case of an EPDCCH set scheduling TM 10 PDSCH (when the PDSCH-START-R11 is configured and the corresponding PDSCH-START-R11 indicates one of {1, 2, 3, 4}, a case where a predefined TM (e.g., TM 1 to 9, TM 10) is configured, a case where PDCCH CRC scrambling is performed on the basis of predefined RNTI(s) (e.g., P-RNTI/RA-RNTI/SI-RNTI/temporary C-RNTI, C-RNTI), a case where a PDSCH is scheduled through a predefined DCI format (e.g., DCI format 1C, DCI format 1A), a case of an MBSFN SF, a case of a special SF (or TDD SF#1 or SF#6), a case where a PDSCH is scheduled from a predefined control channel (e.g., PDCCH, EPDCCH), a case where a PDSCH is scheduled on the basis of an SFS (or CCS), and a case where an (E)PDCCH/PDSCH is transmitted on a predefined cell (e.g., Pcell, Scell, Lcell, Ucell).

[Proposed method #10] A rule may be defined such that, when a final symbol position value (referred to as "INC_PDC_LS") of a PDCCH region increased (in an EPDCCH monitoring SF#K as a subframe configured to monitor an PEDCCH in a specific serving cell#N) is greater than a (serving cell#N-related) EPDCCH_SP value (related to serving cell#N) configured through predefined signaling (or rule) or a threshold value (e.g., 4), the corresponding EPDCCH_SP value is assumed as (or replaced with) an INC_PDC_LS value.

For example, if the INC_PDC_LS value and the (serving cell#N-related) EPDCCH_SP value are set to 5 and 3, respectively, the EPDCCH_SP value may be assumed to be 5.

Also, in another example, a rule may be defined such that, in cases where the INC_PDC_LS value is greater than a (serving cell#N-related) PDSCH_SP value configured through predefined signaling (or rule) (or a predefined (or signaled) threshold value (e.g., 4)) (at a point of SF#K of the specific serving cell#N), the corresponding PDSCH_SP value is assumed as (or replaced with) the INC_PDC_LS value.

Here, for example, the PDSCH_SP value may be configured through PDSCH-START-R11 or PDSCH-START-R10. In a specific example, if the INC_PDC_LS value and the (serving cell#N-related) PDSCH_SP value are respectively set to 5 and 3 in the SF#K of the serving cell#N, the PDSCH_SP value may be assumed to be 5.

[Proposed method #11] A rule may be defined such that, when an INC_PDC_LS value at a point of EPDCCH monitoring SF#K of a specific serving cell#N is greater than a (serving cell#N-related) EPDCCH_SP value configured through predefined signaling (or rule) (or a predefined (or signaled) threshold value (e.g., 4)) and/or when the INC_PDC_LS value (at a SF#K point of the specific serving cell#N) is greater than a (serving cell#N-related) PDSCH_SP value configured through predefined signaling (or rule) (or a predefined (or signaled) threshold value (e.g., 4)), a final (serving cell#N-related) EPDCCH_SP value (i.e., '(EPDCCH_SP+ST_OFFSET)') and/or a final PDSCH_SP value (i.e., '(PDSCH_SP+ST_OFFSET)') are calculated by applying a preset (or signaled) offset value (referred to as "ST_OFFSET") to the corresponding EPDCCH_SP value and/or the PDSCH_SP value.

For example, in cases where ST_OFFSET is set (or signaled) to 2, if the INC_PDC_LS value and (serving cell#N-related) EPDCCH_SP value are respectively set to 5 and 3 at the EPDCCH monitoring SF#K of the serving cell#N, a final EPDCCH_SP value is calculated to 5 through computation of (3+2). Also, for example, a rule may be defined such that the corresponding ST_OFFSET value is (implicitly) assumed to the INC_PDC_LS value. Here, for example, when such a rule is applied, an (INC_PDC_LS+1) point may be regarded as a first virtual symbol of the (serving cell#N) SF#K, and a (se serving cell#N-related) EPDCCH_SP value set through predefined signaling (or rule) and/or a (serving cell#N-related) PDSCH_SP value set through predefined signaling (or rule) are applied with respect to the corresponding first virtual symbol to determine a final EPDCCH_SP position and/or final PDSCH_SP position. Also, for example, a rule may be defined such that, in cases where the INC_PDC_LS value (at an EPDCCH monitoring SF#K point of the specific serving cell#N) is greater than the (serving cell#N-related) EPDCCH_SP value set through predefined signaling (or rule) (or predefined (or signaled) threshold value (e.g., 4)) and/or in cases where the INC_PDC_LS value (at the SF#K of the specific serving cell#N) is greater than a (serving cell#N-related) PDSCH_SP value set through predefined signaling (or rule) (or predefined (or signaled) threshold value (e.g., 4)), a final EPDCCH_SP position and/or a final PDSCH_SP position are determined according to a predefined (or signaled) specific value.

Hereinafter, UE capability information reported by a UE to a network in a carrier aggregation (CA) situation in which aggregation of a plurality of cells is supported or in a situation in which a large number of cell(s) are configured through CA to support an increasing (DL and/or UL) data demand will be described. In the related art CA, aggregation of a maximum of 5 cells is supported, but in future CA, aggregation of cells more than 5 ones (e.g., a maximum of 32 cells) may be supported. Here, supporting aggregation of cells more than 5 ones does not mean that cells more than 5 ones are always aggregated in the case of CA. That is, the UE may support aggregation of cells less than 5 ones. The present disclosure may be applied, regardless of the number of configured cells.

The UE capability information may include at least one of CA (1) BD (blind decoding) capability information, (2) buffering capability information, and (3) RRM capability information, as well as CA capability information (e.g., information regarding a maximum number of component carriers (CC) for the UE to support CA and/or a combination of CCs). The UE may (independently) report UE capability information through predefined signaling.

The BD capability information may include at least one of the number of (maximum) (USS) PDCCH (or EPDCCH)

candidates available for blind decoding (BD) in one subframe (SF) and the number of CCs capable of supporting BD when the (maximum) (USS) BD number of each CC in one SF is assumed to a certain specific value.

Here, for example, the minimum supported number of BD by UE categories (or minimum BD number (/capability) per UE category) may be defined (or signaled) independently from (or regardless of) CA capability (of UE). Also, in another example, the minimum BD number (/capability) per UE category may be interpreted (/defined) as (predefined (or signaled) "unit BD (number)", and the final (total) BD number supportable by the specific CA capability and UE of UE category (in one SF (and USS)) may be determined (/defined).

Also, in another example, the minimum BD number (and/or capability) to be supported by the UE may be defined (/configured) in proportion to the total number of peak data rate (/soft channel bit(s)) (which can be supported by the UE according to UE category of the UE reported (to a base station (BS)) (and/or buffer capability and/or CA capability).

Also, for example, a rule may be defined such that some (or all) of pieces of information are reported per band (or per band or per band combination). Also, for example, a rule may be defined such that the UE reports (or signals) (some or all) of pieces of capability information, or a rule may be defined such that (previously configured (or signaled) combination of capability information is reported (or signaled).

Figure 10:
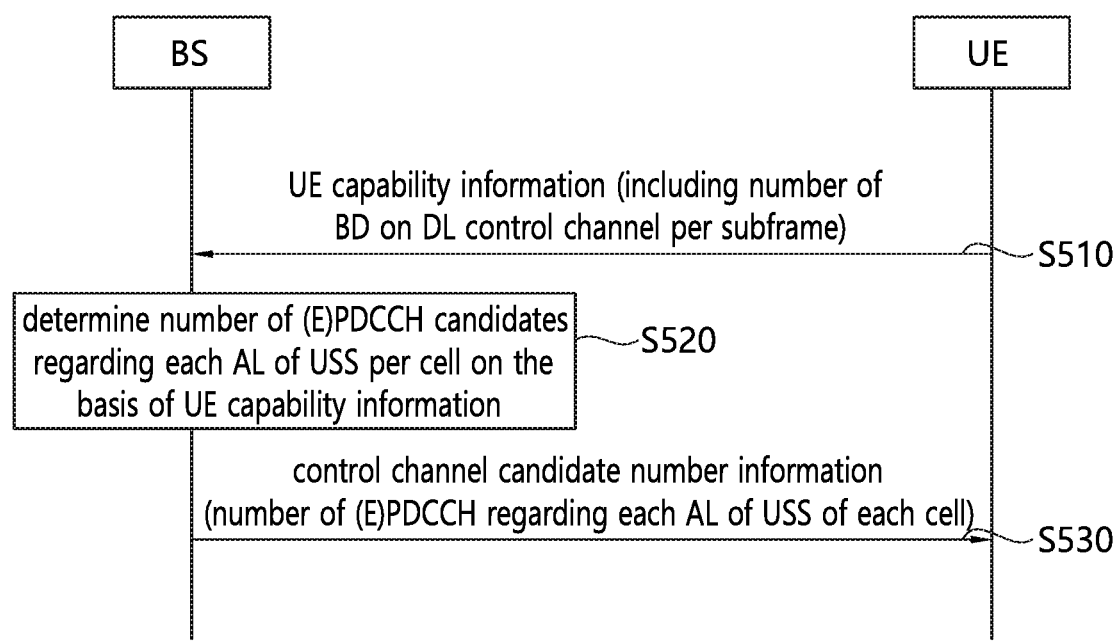
FIG. 10 illustrates a method for reporting UE capability information of a UE according to an embodiment of the present disclosure.

FIG. 10 illustrates a method for reporting UE capability information of a UE according to an embodiment of the present disclosure.

Referring to FIG. 10, a UE reports UE capability information to a BS (S510). As described above, UE capability information, which informs the BS about capability of the UE, may include BD capability information indicating (USS) DL control channel decoding capability of each subframe. Through the UE capability information, the UE informs the BS about a (maximum) number for the UE to perform blind decoding on a DL control channel such as a PDCCH/EPDCCH in a USS of a subframe. The BD capability information may include any one value among a predetermined number of candidate values (e.g., 32). That is, the UE reports capability for decoding (USS) DL control channel by subframes to a network. For example, the UE may report a (maximum number of times for blind decoding the PDCCH or the EPDCCH in a UE-specific search space (USS) of a subframe to the network.

The BS determines the number of control channels (EPDCCH and/or PDCCH) candidates regarding each AL of a USS of each cell on the basis of the UE capability information (S520). Information indicating the number of control channels (EPDCCH or/and PDCH) candidates regarding each AL of a USS of each cell may be referred to as control channel candidate number information.

The BS transmits the control channel candidate number information to the UE (S530). As described above, the control channel candidate number information may inform about the number of control channels (EPDCCH or/and PDCCH) regarding each AL of a USS of each cell. For example, the control channel candidate number information may be provided through a higher layer signal such as an RRC message. The control channel candidate number information will be described in detail later with reference to FIG. 16. Meanwhile, for example, when the BS fails to receive UE capability information described above from the UE, the BS may assume that the UE has capability of aggregating/scheduling certain CCs.

Example #A

In the case of a UE type in which BD capability is smaller than CA capability, a reduction in the number of entire BDs for receiving an (E)PDCCH (at a specific SF point) may be considered to support large number of (DL) cell(s) with the limited BD capability. For example, the UE may reduce the number of predefined (or signaled) cell-related (E)PDCCH candidates or may perform scheduling on multiple cell(s) and/or SF(s) with one DCI.

Example #B

In cases where a lower peak rate (e.g., the entire number of soft channel bits(s)) against CA capability is considered, PDSCH reception-related (DL) soft buffer handling may be considered to support a large number of (DL) cell(s) with a limited size of a soft buffer. For example, an operation of sharing a soft buffer between previously configured (or signaled) cell(s).

Example #C

In cases where a specific cell is configured (or signaled) to cross-carrier schedule (CCS) multiple cell(s) (from the point view of one UE) or in cases where Pcell/scheduling cell are equally configured (or signaled) among multiple UE(s), an operation of sharing an SS (among multiple cell(s) or among multiple UE(s) may be considered to alleviate an increase in intra-UE (EPDCCH) blocking capability and/or inter-UE (E)PDCCH blocking probability due to simple concatenation (of multiple cell(s) or multiple UE(s)-related) search spaces (SSs).

Hereinafter, in order to support an increasing DL/UL data demand, a method for effectively defining/operating a carrier indicator field (CIF) when a large number of cell(s) are configured through CA is proposed.

Here, for example, the following proposed rules may be configured to be limitedly applied only to some of various situations such as a case where a massive CA mode in which cells (carriers) more than five ones are aggregated is configured, a case where cell(s) (Lcell(s), Ucell(s), or (UL) Lcell(s)/Ucell(s)) are configured to be equal to or greater than a predefined (or signaled) number, a case where configured cell(s) (configured Lcell(s), configured Ucell(s), or configured Lcell(s)/Ucell(s)) are configured to be equal to or greater than a predefined (or signaled) number, a case where activated cell(s) (activated Lcell(s), activated Ucell(s), or activated Lcell(s)/Ucell(s)) are configured to be equal to or greater than a predefined (or signaled) number, a case where the number of scheduled cell(s) configured in one scheduling cell is equal to or greater than a predefined (or signaled) threshold value, or a case where a cross carrier scheduling (CCS) technique is configured.

Before describing the proposed method in detail, a method for designating a (serving) cell index of each cell and a method for designating a (serving) cell index of each Scell will be described.

The BS provides an information element (IE) called "ServCellIndex" to the UE. The "ServCellIndex" is a short identity used for identifying a serving cell such as a primary cell and a secondary cell and may have any one integer value among 0 to 7. Here, value 0 is applied to the primary cell, and the other values are applied to the secondary cell.

"SCellIndex" is a short identity used for identifying a secondary cell and may have any one value among 1 to 7.

A related art carrier indication field (CIF) is set to be equal to a ServCellIndex value or a SCellIndex value regarding a specific serving cell. For example, when a ServCellIndex value of a first serving cell is 2, a CIF value indicating the first serving cell is also 2. In the existing CA, a maximum of five CCs are aggregated and a CIF field has 3 bits, and thus, 5 CCs are aggregated in CA and the CIF value and the ServCellIndex value (or SCellIndex value) may be equally used. However, in future massive CA in which CCs more than 8 ones may be aggregated, each CC may not be properly indicated by the related art method.

Hereinafter, for the purposes of description, a (serving cell index (ServCellIndex) of each cell will be referred to as "CIDX", and a (serving) cell index (SCellIndex) of each Scell will be referred to as "SCIDX".

[Proposed method #12] In cases where a CIF size is maintained (fixed) to the same value as that of the related art, a CIF may be used on the basis of (some or all of) the following rules. Here, for example, the existing CIF size refers to 3 bit(s). Also, for example, application of the [proposed method #12] may be interpreted as limiting a maximum number of scheduled cell(s)CCS-ed from one scheduling cell to 5 or 8 (or TH_N).

Also, for example, a rule may be defined such that, when the [proposed method #12] is applied, a configuration/position of an SS related to a specific (scheduled cell is determined on the basis of a CIDX (or SCIDX) of the corresponding (scheduled) cell (i.e., the CIDX (or SCIDX) of the specific (scheduled) cell is substituted to an $n_{CI}$ parameter), or a rule may be defined such that, when the [proposed method #12] is applied, a configuration/position of an SS related to a specific (scheduled cell is determined on the basis of a (re)mapped CIF value of the corresponding (scheduled) cell (i.e., a (re)mapped CIF value of a specific (scheduled) cell is substituted to the $n_{CI}$ parameter).

Also, for example, a rule may be defined such that, when the [proposed method #12] is applied, a PHR (power headroom report) mapping order/position (of a MAC control element) related to a specific (scheduled) cell (and/or HARQ-ACK (and/or CSI) mapping order/position (of a PUCCH or PUSCH) are determined on the basis of the CIDX (or SCIDX) of the corresponding (scheduled) cell (or a rule is defined such that it is determined on the basis of a (re)mapped CIF value of the corresponding (scheduled) cell).

(Rule #12-A) In cases where the number (referred to as "CONF_N") of cells configured for the UE is equal to or smaller than a predefined (or signaled) threshold value (referred to as "TH_N"), a CIF value related to the specific (scheduled) cell may be assumed/configured to be equal to the CIDX (or SCIDX) value related to the corresponding (scheduled) cell. For example, TH_N may be set to 5 or 8. Also, for example, such a rule may be applied when a CIF size and a size of the CIDX (or SCDIX) are equal. Here, the CIF size may have 3 bits and the CIDX (or SCDIX) may be set to have 3 bits.

(Rule #12-B) In cases where CONF_N is greater than TH_N, (re)mapping (CDIX (SCIDX)-to-CIF mapping) may be configured/performed between a CIDX (or SCIDX) value related to the specific (scheduled) cell and the CIF value related to the corresponding (scheduled) cell on the basis of (some or all of) the following methods.

For example, this method may be applied to a case where CONF_N configured by CA is greater than a maximum number of (scheduled) cell(s) which can be indicated by the 3-bit CIF (or than a maximum number of scheduled cell(s) which can be supported by the existing CCS. In this manner, scheduled cell(s)CCS-ed from a specific scheduling cell may be effectively indicated without changing a size of the existing CIF. In other words, when such a method is applied, a CIF value related to a specific (scheduled) cell and a CIDX (or SCIDX) value of the corresponding (scheduled) cell may be different.

Also, for example, a rule may be defined such that (rule 12-B) is (limitedly) applied only to (scheduled) cell(s) having a CIDX (or SCIDX) value higher than a maximum number of (scheduled) cell(s) which may be indicated by the 3-bit CIF (or a maximum number of scheduled cell(s) which can be supported by the existing CCS). For example, CIDX-to-CIF mapping may be defined only for a CIF indicating cells having a value of 8 or greater as a CIDX (or SCIDX).

Also, for example, application of such a rule may be interpreted such that a CIF size and a CIDX (or SCDIX) size are different (or that a CIDX (or SCDIX) size is greater than the CIF size). For example, the CIF size may be 3 bits and the CIDX (or SCDIX) size may be 5 bits.

Example #12-B-1

It may be configured through predefined signaling that to which CIF value scheduled cell(s)CCS-ed from a specific scheduling cell are to be mapped or re-mapped. Here, for example, the corresponding signaling may be defined as physical layer signaling or higher layer signaling such as an RRC message.

In a specific example, in cases where 16 cell(s) (i.e., Cell (i.e., PCELL) of CIDX 0, Scell of SCIDX 1, Scell of SCIDX 2, Scell of SCIDX 3, Scell of SCIDX 4, Scell of SCIDX 5, Scell of SCIDX 6, Scell of SCIDX 7, Scell of SCIDX 8, Scell of SCIDX 9, Scell of SCIDX 10, Scell of SCIDX 1, Scell of SCIDX 12, Scell of SCIDX 13, Scell of SCIDX 14, Scell of SCIDX 15) are configured through CA, if cell(s) (i.e., scheduled cell(s))CCS-ed from the cell (i.e., scheduling cell) of CIDX 0) is set to Scell of SCIDX 1, Scell of SCIDX 3, Scell of SCIDX 1, and Scell of SCIDX 12, (Scell of SCIDX 1, Scell of SCIDX 3,) Scell of SCIDX 10 and Scell of SCIDX 12 may respectively be (re)mapped to (CIF 1, CIF 3,) CIF 2, and CIF 4 (through predefined signaling). In other words, for example, by (re)mapping CIF values of the scheduled Scell of SCIDX 10 and scheduled Scell of SCIDX 12 to CIF 2 and CIF4, rather than to CIF10 and CIF12, the scheduled Scell of SCIDX 10 and scheduled Scell of SCIDX 12 CCS-ed from the scheduling cell of CIDX 0 may be effectively indicated without having to change the existing CIF size (i.e., 3 bits).

Example #12-B-2

It may be configured through a predefined rule that to which CIF value scheduled cell(s) of CCS-ed from a specific scheduling cell are to be (re)mapped. In a specific example, a rule may be defined such that CIF values are (sequentially) (re)mapped to scheduled cell(s)CCS-ed from one scheduling cell in ascending order (or descending order) of CIDX (or SCIDX (or CG index)).

For example, it may be configured such that the CIF value of the scheduling cell may be set (or (re)mapped) to a predefined (or signaled) value (e.g., 0) and CIF values are (sequentially) (re)mapped only to scheduled cell(s)CCS-ed from the corresponding scheduling cell in ascending order (or descending order) of CIDX (or SCIDX (or CG index)). Here, for example, the CIF values (re)mapped to the scheduled cell(s) refer to remaining CIF values excluding the CIF value (e.g., 0) related to the scheduling cell.

Also, in another example, it may be configured such that the CIF value of the scheduling cell is set (or (re)mapped) to a predefined (or signaled) value (e.g., 0) and the CIF values are (re)mapped only to the scheduled cell(s)CCS-ed from the corresponding scheduling cell by "CDIX (or SCIDX (or CG index)) modulo 8" or "CDIX (or SCIDX (or CG index)) modulo 5". N modulo M refers to the remainder obtained by dividing N by M.

Also, in another example, CIF values may (sequentially) be (re)mapped to (all of) a specific scheduling cell#X and scheduled cell(s)CCS-ed from the corresponding scheduling cell#X in ascending order (or descending order) of CIDX (or SCIDX (or CG index)). Or, CIF values may be (re)mapped by "CDIX (or SCIDX (or CG index)) modulo 8" or "CDIX (or SCIDX (or CG index)) modulo 5".

Application of such a rule may be interpreted such that a CIF value related to a scheduling cell and/or scheduled cell(s) and an (actual) CIDX (or SCIDX) value related to the corresponding scheduling cell and/or scheduled cell(s) are different.

Example #12-B-3

A rule may be defined such that "CDIX (or SCDIX)-to-CIF value" (re)mapping information related to a scheduling cell and/or scheduled cell(s) is transferred (to a UE) through predefined signaling. Here, for example, the corresponding information may be configured to be included together and transmitted on (existing) RRC signaling providing CCS-related information.

[Proposed method #13] In cases where a CIF size is not maintained as (or fixed to) a value which is the same as an existing value, a CIF may be used on the basis of (some or all of) following rules. Here, for example, the existing CIF size refers to 3 bit(s). Also, for example, a rule may be defined such that, when the [proposed method #13] is applied, a specific (scheduled) cell-related SS configuration/ position is determined on the basis of CIDX (or SCIDX) of the corresponding (scheduled) cell (that is, CIDX (or SCIDX) of the specific (scheduled) cell is substituted to a $n_{CI}$ parameter) (or may be determined on the basis of (re)mapped CIF value of the corresponding (scheduled) cell (i.e., the (re)mapped CIF value of the specific (scheduled) cell is substituted to the $n_{CI}$ parameter).

Also, for example, when the [proposed method #13] is applied, a rule may be defined such that a mapping order/ position of PHR (on a MAC control element) related to a specific (scheduled) cell (and/or a mapping order/position of HARQ-ACK (and/or CSI) (on a PUCCH or PUSCH) are determined on the basis of a CIDX (or an SCIDX) of the corresponding (scheduled) cell or a rule may be defined such that it is determined on the basis of a (re)mapped CIF value of the corresponding (scheduled) cell.

(Rule #13-A) In cases where the number of cells (hereinafter, referred to as "CONF_M") set for the UE is equal to or smaller than a predefined (or signaled) threshold value (hereinafter, referred to as "TH_M"), a CIF size may be assumed/configured to have the same value (e.g., 3 bit(s)) as an existing value.

Here, for example, TH_N may be set to 5 or 8. Also, for example, in cases where (rule #13-A) is applied, a specific (scheduled) cell-related CIF value may be assumed/configured to be the same as the corresponding (scheduled) cell-related CIDX (or SCIDX) value.

Also, for example, application of such a rule may be interpreted such that the CIF size and a size of the CIDX (or SCIDX) are equal. Here, for example, the CIF size may be set to 3 bits and a size of the CIDX (or SCIDX) may be set to 3 bits.

(Rule #13-B) In cases where CONF_N is greater than TH_N, a (mapping) relationship may be assumed/configured between the CIF size and/or specific (scheduled) cell-related CIDX (or SCIDX) value and the corresponding (scheduled) cell-related CIF value.

Example #13-B-1

The CIF size may be assumed/set to 5 bit(s). Here, for example, in cases where such a method is applied, the specific (scheduled) cell-related CIF value may be assumed/ set to be the same as the corresponding (scheduled) cell-related CIDX (or SCIDX) VALUE.

Also, for example, application of such a rule may be interpreted such that the CIF size and the CIDX (or SCIDX) size are the same. Here, for example, the CIF size may be set to 5 bits and the CIDX (or SCIDX) size may be set to 5 bits.

Example #13-B-2

The CIF size may be assumed/set to MAX{ceiling(log 2(number of scheduled cell(s) of each scheduling cell)), 3} by scheduling cells. Here, in the MAX {X, Y} function, a value which is relatively large or equal is derived from among X and Y, and in the ceiling (Z) function, a minimum integer value which is greater than or equal to Z is derived.

When (example #13-B-2) is applied, a different CIF size may be applied/assumed to (different) scheduled cell(s) CCS-ed from scheduling cell(s) having different number of scheduled cell(s).

When (example #13-B-2) is applied, (re)mapping may be configured/performed between the specific (scheduled) cell-related CIDX (or SCIDX) value and the corresponding (scheduled) cell-related CIF value on the basis of the (example #12-B-1) and/or the (example #12-B-2). Here, for example, through application of such a rule, in cases where scheduled cell(s) larger than a maximum (scheduled) cell(s) which may be indicated by MAX{ceiling(log 2(number of scheduled cell(s) of each scheduling cell#X)), 3} bit-CIF from a view point of the specific scheduling cell#X, scheduled cell(s)CCS-ed from the corresponding scheduling cell#X may be effectively indicated. Application of such a rule may be interpreted such that the CIF size and the CIDX (or SCIDX) size are different (or CIDX (or SCIDX) is greater than the CIF size). Here, for example, the CIF size may be 3 bits and the CISX (or SCIDX) size may be set to 5 bits.

Example #13-B-3

The CIF size may be assumed/set to ceiling(log 2(number of scheduled cell(s))). When the (example #13-B-3) is applied, a different CIF size may be applied/assumed to (different) scheduled cell(s)CCS-ed from scheduling cell(s) having a different number of scheduled cell(s).

When the (example #13-B-3) is applied, (re)mapping may be configured/performed between the specific (scheduled) cell-related CIDX (or SCIDX) value and the corresponding (scheduled) cell-related CIF value on the basis of the (example #12-B-1) and/or the (example #12-B-2). Here, for example, by applying such a rule, when a greater number of scheduled cell(s) than a maximum number of (scheduled)

cell(s) which may be indicated by a ceiling (log 2)Number of scheduled cell(s)) bit-CIF are configured as CCS, scheduled cell(s)CCS-ed from the corresponding scheduling cell#X may be effectively indicated.

Also, for example, application of such a rule may be interpreted such that a CIF size and a CIDX (or SCIDX) size are different (or the CIDX (or SCIDX) size is greater than the CIF size). Here, for example, the CIF size may be set to 3 bits and the CIDX (or SCDIX) size may be set to 5 bits.

Example #13-B-4

A CIF size may be assumed/set to MAX{ceiling(log 2(number of configured cells)), 3} or ceiling(log 2(number of configured cells))

[Proposed method #17] In cases where the CIF size is maintained as (or fixed to) a value which is the same as the existing value, the CIF may be used on the basis of (some or all) of the following rules. The existing CIF size is meant to be 3 bit(s).

Application of the [proposed method #17] may be interpreted such that a maximum number of scheduled cell(s) CCS-ed from one scheduling cell is limited to 5 or 8.

Also, a rule may be defined such that, when the [proposed method #17] is applied, a configuration/position of an SS related to a specific (scheduled cell is determined on the basis of a CIDX (or SCIDX) of the corresponding (scheduled) cell (i.e., the CIDX (or SCIDX) of the specific (scheduled) cell is substituted to an $n_{CI}$ parameter). Or, a rule may be defined such that, when the [proposed method #12] is applied, a configuration/position of an SS related to a specific (scheduled cell is determined on the basis of a (re)mapped CIF value of the corresponding (scheduled) cell (i.e., a (re)mapped CIF value of a specific (scheduled) cell is substituted to the $n_{CI}$ parameter).

Also, when the [proposed method #17] is applied, a PHR (power headroom report) mapping order/position (of a MAC control element) related to a specific (scheduled) cell (and/or HARQ-ACK (and/or CSI) mapping order/position (of a PUCCH or PUSCH) may be determined on the basis of the CIDX (or SCIDX) of the corresponding (scheduled) cell, or may be determined on the basis of a (re)mapped CIF value of the corresponding (scheduled) cell). Also, for example, a rule may be defined such that the [proposed method #17] is limitedly applied only to a case where a massive CA mode is configured, a case where cell(s) (Lcell(s), Ucell(s), or Lcell(s)/Ucell(s)) are configured to be equal to or greater than a predefined (or signaled) number (or a case where configured cell(s) (configured Lcell(s), configured Ucell(s), or configured Lcell(s)/Ucell(s)) are configured to be equal to or greater than a predefined (or signaled) number), a case where activated cell(s) (activated Lcell(s), activated Ucell(s), or activated Lcell(s)/Ucell(s)) are configured to be equal to or greater than a predefined (or signaled) number, and/or a case where the number of scheduled cell(s) configured in one scheduling cell is equal to or greater than a predefined (or signaled) threshold value.

The existing (REL-12 LTE) operation may be applied to a case where the massive CA mode is not configured, a case where cell(s) (Lcell(s), Ucell(s), or Lcell(s)/Ucell(s)) are configured to be smaller than a predefined (or signaled) number, a case where configured cell(s) (configured Lcell(s), configured Ucell(s) (or configured Lcell(s)/Ucell (s)) are configured to be smaller than a predefined (or signaled) number), a case where activated cell(s) (activated Lcell(s), activated Ucell(s), or activated Lcell(s)/Ucell(s)) are configured to be smaller than a predefined (or signaled) number, and/or a case where the number of scheduled cell(s) configured in one scheduling cell is smaller than a predefined (or signaled) threshold value.

(Rule #17-A) (Re)mapping (CDIX (SCIDX)-to-CIF mapping) may be configured/performed between a CIDX (or SCIDX) value related to the specific (scheduled) cell and the CIF value related to the corresponding (scheduled) cell on the basis of (some or all of) the following methods (regardless of the number of configured cell(s) (hereinafter, referred to as "CONF_N")).

Application of such a rule may be interpreted such that a CIF size and a CIDX (or SCDIX) size are different (or that a CIDX (or SCDIX) size is greater than the CIF size). Here, for example, the CIF size may be set to 3 bits and the CIDX (or SCDIX) size may be set to 5 bits.

Also, for example, this method may be applied to a case where CONF_N configured by CA is greater than a maximum number of (scheduled) cell(s) which can be indicated by the 3-bit CIF (or than a maximum number of scheduled cell(s) which can be supported by the existing CCS, whereby scheduled cell(s)CCS-ed from a specific scheduling cell may be effectively indicated (without changing a size of the existing CIF). In other words, when such a method is applied, a CIF value related to a specific (scheduled) cell and an (actual) CIDX (or SCIDX) value related to the corresponding (scheduled) cell may be different. Also, the (rule 17-A) may be (limitedly) applied only to (scheduled) cell(s) having a CIDX (or SCIDX) value higher than a maximum number of (scheduled) cell(s) which may be indicated by the 3-bit CIF (or a maximum number of scheduled cell(s) which can be supported by the existing CCS). For example, CIDX-to-CIF mapping may be defined only for a CIF indicating cells having a value of 8 or greater as a CIDX (or SCIDX).

Example #17-A-1

It may be configured through predefined signaling that to which CIF value scheduled cell(s)CCS-ed from a specific scheduling cell are to be re-mapped. Here, for example, the corresponding signaling may be physical layer signaling or higher layer signaling (e.g., RRC signaling). Here, for example, the CIF values (re)mapped to the scheduled cell(s) may be configured (or limited) to remaining CIF values excluding the (fixed) CIF value (e.g., 0) related to the scheduling cell.

Figure 11:
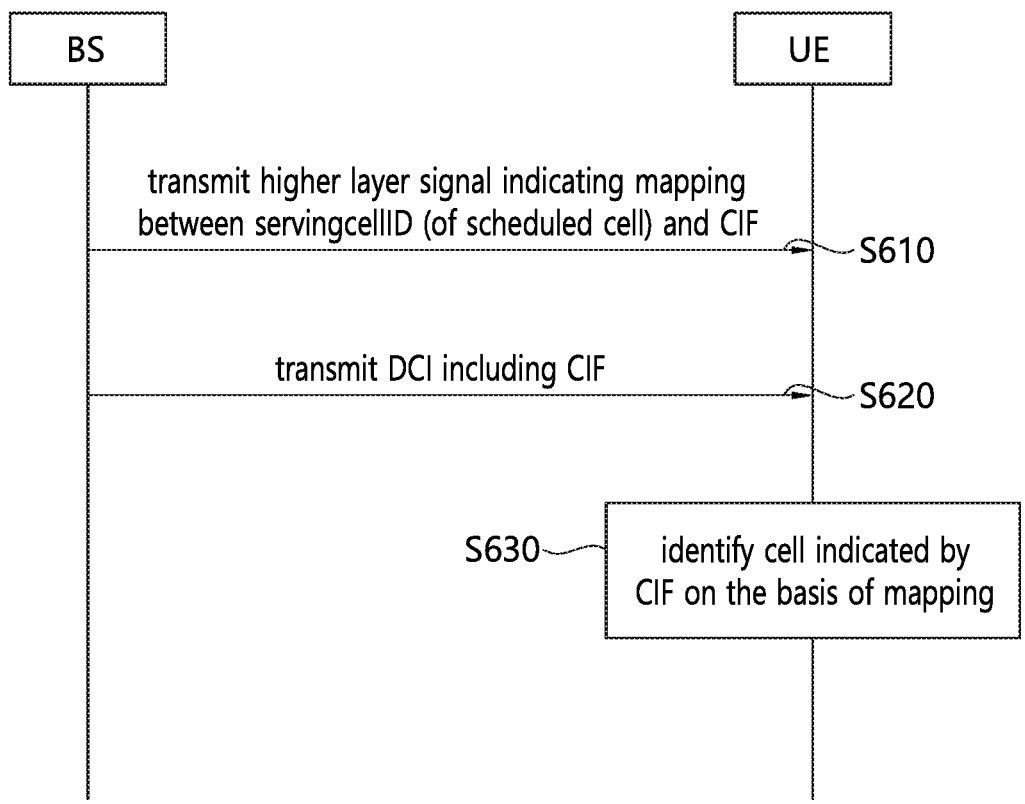
FIG. 11 illustrates an operation method of a UE according to the aforementioned rule #17-A or example #17-A-1.

FIG. 11 illustrates an operation method of a UE according to the aforementioned rule #17-A or example #17-A-1.

Referring to FIG. 11, a BS transmits, to a UE, a higher layer signal indicating mapping between ServingCellID (or SCellID) and a carrier index field (CIF) (S610). Here, the mapping will be described in detail with reference to FIG. 12 hereinafter. The higher layer signal may be an RRC message.

Here, for example, the higher layer signal indicating mapping between ServingCellID (or SCellID) and a CIF is aimed at only scheduled cell(s), and a CIF value of a scheduling cell may be set (or mapped) to a predefined (or fixed or signaled) value (e.g., 0). That is, in cases where cell#A is a scheduling cell which transmits scheduling information of other cells and cells #B and #C are cells scheduled by the scheduling information from the cell#A, mapping between ServingCellID and a CIF may indicating only mapping between ServingCellID of the cells #B and #C and a CIF value. That is, the higher layer signal does not provide mapping between ServingCellID and a CIF for the cell#A, a scheduling cell, and a predetermined or fixed CIF value (e.g., 0) is always allocated (mapped) to the cell#A.

Or, the higher layer signal may indicated mapping between ServingCellID regarding the cell#A and a CIF value, and here, a fixed value (e.g., 0) may be always mapped to the cell #A.

The higher layer signal may be provided through the cell#a or may be provided through any other cell than the cell#A.

The BS transmits downlink control information (DCI) including a CIF (S620).

The UE identifies a cell indicated by the CIF on the basis of the mapping (S630).

In FIG. 11, an example in which a cell indicated by the CIF included in the DCI is identified on the basis of the higher layer signal indicating mapping between ServingCellID and the CIF, but the present disclosure may also be applied to any other cases.

The UE may receive the DCI including the CIF, and receives or transmits data on the basis of the DCI in a serving cell indicated by the CIF. Here, the serving cell indicated by the CIF may be identified on the basis of the higher layer signal indicating mapping between the serving cell index (ServingCellID) of the serving cell and the CIF value (in the case of scheduled cell(s)). Also, in the case of a scheduling cell, it is identified on the basis of a (mapping) relationship between the predefined (or fixed or signaled) serving cell index (ServingCellID) of the serving cell and the CIF value (e.g., 0). For example, as described above, the CIF may consist of 3 bits and have one of values from 0 to 7, and the serving cell index may have one of values from 0 to 31.

For example, more than five serving cells may be allocated to the UE. Here, the CIF value indicating the serving cell may be set to a value which is not the same as the serving cell index (ServingCellID) of the serving cell by the mapping. Here, for example, mapping between the serving cell index (ServingCellID) of the serving cell and the CIF value may be configured by a higher layer signal indicating mapping between the serving cell index (ServingCellID) of the serving cell and the CIF value (in the case of scheduled cell(s)) (and/or may be configured by a (mapping) relationship between the predefined (or fixed or signaled) serving cell index (ServingCellID) of the serving cell and the CIF value (e.g., 0) (in the case of a scheduling cell)).

Figure 12:
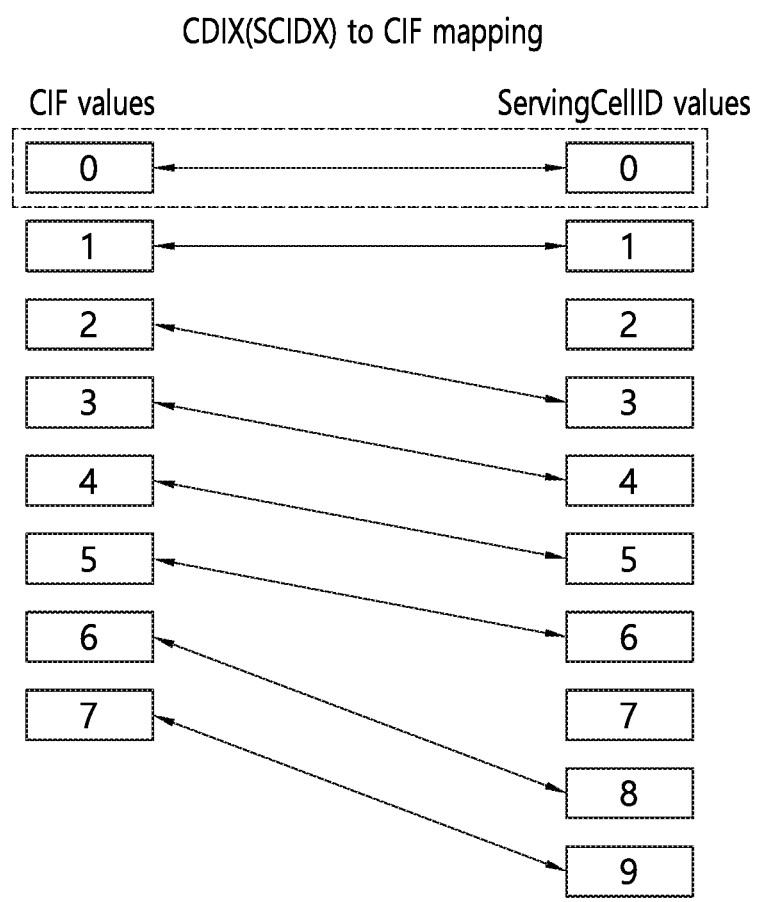
FIG. 12 illustrates mapping between ServingCellID (or SCellID) and a CIF.

FIG. 12 illustrates mapping between ServingCellID (or SCellID) and a CIF.

Referring to FIG. 12, it is illustrated that a cell (i.e., Pcell) of a serving cell index (indicated by ServingCellID) 0 and Scells of serving indices 1 to 9 are aggregated/configured to the UE. Also, it is illustrated that Scells having serving cell indices 1, 3, 4, 5, 6, 8, and 9, as well as the Pcell (i.e., serving cell index 0) (i.e., self-scheduling), are cross-carrier scheduled (CCS-ed) on the Pcell.

Here, the BS transmits a higher layer signaling indicating mapping between a serving cell ID (ServingCellID) of a cell scheduled through the higher layer signal and a CIF. For example, the UE may be informed that the CIF values 1, 2, 3, 4, 5, 6, and 7 are sequentially mapped or remapped to serving cell indices 1, 3, 4, 5, 6, 8, and 9 (e.g., scheduled cell(s)). Here, for example, a predefined (or fixed or signaled) CIF value 0 is mapped to the Pcell, a scheduling cell, (i.e., serving cell index 0). That is, CIDX-to-CIF mapping is not provided to the Pcell, a scheduling cell, and a previously fixed/predetermined value (e.g., 0) may be used or a certain CIF value (e.g., 0) may be mapped if CIDX-to-CIF mapping is provided.

For example, when the UE receives DCI having a CIF value 6 is received in the Pcell, the DCI may be recognized as scheduling information regarding a cell having a serving cell index 8. Thus, cross-carrier scheduling may be performed in CA in which more than eight cells are aggregated, without having to change a size of the 3-bit CIF.

In a specific example, in cases where 16 cell(s) (i.e., Cell (i.e., PCELL) of CIDX 0, Scell of SCIDX 1, Scell of SCIDX 2, Scell of SCIDX 3, Scell of SCIDX 4, Scell of SCIDX 5, Scell of SCIDX 6, Scell of SCIDX 7, Scell of SCIDX 8, Scell of SCIDX 9, Scell of SCIDX 10, Scell of SCIDX 1, Scell of SCIDX 12, Scell of SCIDX 13, Scell of SCIDX 14, Scell of SCIDX 15) are configured through CA, if cell(s) (i.e., scheduled cell(s))CCS-ed from the cell (i.e., scheduling cell) of CIDX 0) is set to Scell of SCIDX 1, Scell of SCIDX 3, Scell of SCIDX 1, and Scell of SCIDX 12, (Scell of SCIDX 1, Scell of SCIDX 3,) Scell of SCIDX 10 and Scell of SCIDX 12 may respectively be (re)mapped to (CIF 1, CIF 3,) CIF 2, and CIF 4 (through predefined signaling). In other words, for example, by (re)mapping CIF values of the scheduled Scell of SCIDX 10 and scheduled Scell of SCIDX 12 to CIF 2 and CIF4, rather than to CIF10 and CIF12, the scheduled Scell of SCIDX 10 and scheduled Scell of SCIDX 12 CCS-ed from the scheduling cell of CIDX 0 may be effectively indicated without having to change the existing CIF size (i.e., 3 bits).

Example #17-A-2

It may be configured through a predefined rule that to which CIF value scheduled cell(s) of CCS-ed from a specific scheduling cell are (re)mapped. In a specific example, a rule may be defined such that CIF values are (sequentially) (re)mapped (or CIF values are (re)mapped according to (example #17-A-1) to scheduled cell(s)CCS-ed from one scheduling cell in ascending order (or descending order) of CIDX (or SCIDX (or CG index)). Here, for example, it may be configured such that the CIF value of the scheduling cell may be set (or (re)mapped) to a predefined (or signaled) value (e.g., 0) and CIF values are (sequentially) (re)mapped (or CIF values are (re)mapped according to (example #17-A-1) only to scheduled cell(s)CCS-ed from the corresponding scheduling cell in ascending order (or descending order) of CIDX (or SCIDX (or CG index)).

For example, the CIF values (re)mapped to the scheduled cell(s) may refer to remaining CIF values excluding the CIF value (e.g., 0) related to the scheduling cell. Here, in another example, it may be configured such that the CIF value of the scheduling cell is set (or (re)mapped) to a predefined (or signaled) value (e.g., 0) and the CIF values are (re)mapped only to the scheduled cell(s)CCS-ed from the corresponding scheduling cell by "CDIX (or SCIDX (or CG index)) modulo 8" or "CDIX (or SCIDX (or CG index)) modulo 5".

Also, in another example, CIF values may (sequentially) be (re)mapped to (all of) a specific scheduling cell#X and scheduled cell(s)CCS-ed from the corresponding scheduling cell#X in ascending order (or descending order) of CIDX (or SCIDX (or CG index)) (or, CIF values are (re)mapped (or CIF values are (re)mapped according to (example #17-A-1)) by "CDIX (or SCIDX (or CG index)) modulo 8" or "CDIX (or SCIDX (or CG index)) modulo 5".

Application of such a rule may be interpreted such that a CIF value related to a scheduling cell and/or scheduled cell(s) and an (actual) CIDX (or SCIDX) value related to the corresponding scheduling cell and/or scheduled cell(s) are different.

Example #17-A-3

"CDIX (or SCDIX)-to-CIF value" (re)mapping information related to a scheduling cell and/or scheduled cell(s) may be transferred (to a UE) through predefined signaling (e.g., RRC signaling). For example, the corresponding information may be included together and transmitted on (existing) RRC signaling providing CCS-related information.

[Proposed method #18] When a cell group (CG) of cell(s) (including (or not including) CELL_PUCCH) interworking with a specific cell (hereinafter, referred to as "CELL_PUCCH") in which PUCCH transmission is configured (or allowed) is referred to as "PUCCH_CG", a CIF size related to CCS configured between corresponding PUCCH_CG configuration cell(s) may be changed according to the number of cells constituting the corresponding PUCCH_CG.

The CIF size may be determined as "MAX{ceiling(log 2(number of cells (including (or not including) CELL_PUCCH) constituting PUCCH_CG)), 3}" or "CEILING(log 2(number of cells (including (or not including) CELL_PUCCH) constituting PUCCH_CG))"

For example, in cases where the former rule is applied, if a specific PUCCH_CG#X includes 8 cell(s) (including (or not including) CELL_PUCCH), a CIF size related to a CCS configured between the corresponding PUCCH_CG#X configuration cell(s) may be determined to 3 bit(s), and if a specific PUCCH_CG#Y includes 24 cell(s) (including (or not including) CELL_PUCCH), a CIF size related to a CCS configured between the cell(s) forming the corresponding PUCCH_CG#Y may be determined to 5 bit(s).

In another example, in cases where the number of cells (including (or not including) CELL_PUCCH) forming the PUCCH_CG is equal to or smaller than a predefined (or signaled) threshold value (e.g., 5 or 8), the CIF size may be determined to be equal to the existing value (e.g., 3 bit(s) or "MAX{ceiling(log 2(number of cells forming PUCCH_CG)), 3}", and in cases where the number of cells (including (or not including) CELL_PUCCH) forming the PUCCH_CG is greater than a predefined (or signaled) threshold value (e.g., 5 or 8), the CIF size may be determined as 5 bit(s) or "CEILING(log 2(number of cells forming PUCCH_CG))".

Also, for example, when the [proposed method #18] is applied, the aforementioned (re)mapping (CDIX (SCDIX)-to-CIP mapping) rule may be additionally applied to the specific (scheduled) cell-related CIDX (or SCIDX) value and the corresponding (scheduled) cell-related CIF value to effectively manage/control the specific (scheduled) cell-related SS configuration/position, PHR mapping order/position (on the MAC control element), and/or HARQ-ACK (and/or CSI) mapping order/position (on a PUCCH or PUSCH).

In another example, the [proposed method #18] may be limitedly applied only to a case where a massive CA mode is configured, a case where an Scell (or Lcell (or Ucell)) is configured as CELL_PUCCH, a case where CELL_PUCCH (or PUCCH_CG) is configured to be equal to or greater than a predefined (or signaled) number, a case where cell(s) (Lcell(s), Ucell(s), or (UL) Lcell(s)/Ucell(s)) (forming the PUCCH_CG) are configured to be equal to or greater than a predefined (or signaled) number (or a case where configured cell(s) (configured Lcell(s), configured Ucell(s), or configured Lcell(s)/Ucell(s)) are configured to be equal to or greater than a predefined (or signaled) number), a case where activated cell(s) (activated Lcell(s), activated Ucell(s), or activated Lcell(s)/Ucell(s)) (forming the PUCCH_CG) are configured to be equal to or greater than a predefined (or signaled) number, and/or a case where the number of scheduled cell(s) configured in one scheduling cell (forming the PUCCH_CG) is equal to or greater than a predefined (or signaled) threshold value (and/or a CCS is limitedly configured only between PUCCH_CG configuration cell(s)).

Here, the existing (REL-12 LTE) operation may be applied to a case where the massive CA mode is not configured, a case where an Scell (or Lcell (or Ucell)) is not configured as CELL_PUCCH, a case where CELL_PUCCH (or PUCCH_CG) is configured to be smaller than a predefined (or signaled) number, a case where cell(s) (Lcell(s), Ucell(s), or (UL) Lcell(s)/Ucell(s)) are configured to be smaller than a predefined (or signaled) number, a case where configured cell(s) (configured Lcell(s), configured Ucell(s)) (or configured Lcell(s)/Ucell(s)) are configured to be smaller than a predefined (or signaled) number), a case where activated cell(s) (activated Lcell(s), activated Ucell(s), or activated Lcell(s)/Ucell(s)) (forming the PUCCH_CG) are configured to be smaller than a predefined (or signaled) number, and/or a case where the number of scheduled cell(s) configured in one scheduling cell (forming the PUCCH_CG) is smaller than a predefined (or signaled) threshold value (and/or a CSS is configured (allowed) even between different PUCCH_CG configuration cell(s)).

Hereinafter, downlink control information (DCI), a search space (SS) for monitoring/detecting DCI, and a method for configuring an aggregation level (AL) and blind decoding (BD) in an SS in a wireless communication system supporting aggregation of a plurality of cells (carriers) will be described. For example, the existing CA supports only aggregation of a maximum of 5 cells, but future CA may support aggregation of a maximum of 32 cells. The present disclosure may be applied to a UE supporting the future CA. However, although the UE supporting future CA may also naturally support aggregation of 5 or less cells, to which the present disclosure may also be applied.

For example, in an environment in which a large number of cell(s) are configured by CA, in order to reduce overhead of (DL/UL) scheduling information transmissions related to the corresponding cell(s), scheduling information related to a plurality of previously configured (or signaled) cell(s) may be transmitted through single DCI (or a control channel) (hereinafter, referred to as "MUCC-DCI"). That is, the MUCC-DCI refers to single DCI including scheduling information related to the plurality of cells.

Here, for example, cells simultaneously scheduled through the MUCC-DCI may be configured (or limited) to the same cell type, TM, system bandwidth, communication type, and/or cell(s) of a CG. Here, for example, the cell type refers to Ucell or Lcell, and the communication type refers to FDD or TDD. Hereinafter, for the purposes of description, DCI (or a control channel) in which one cell-related scheduling information is transmitted (as in the related art) will be referred to as "SICC-DCI".

Figure 13:
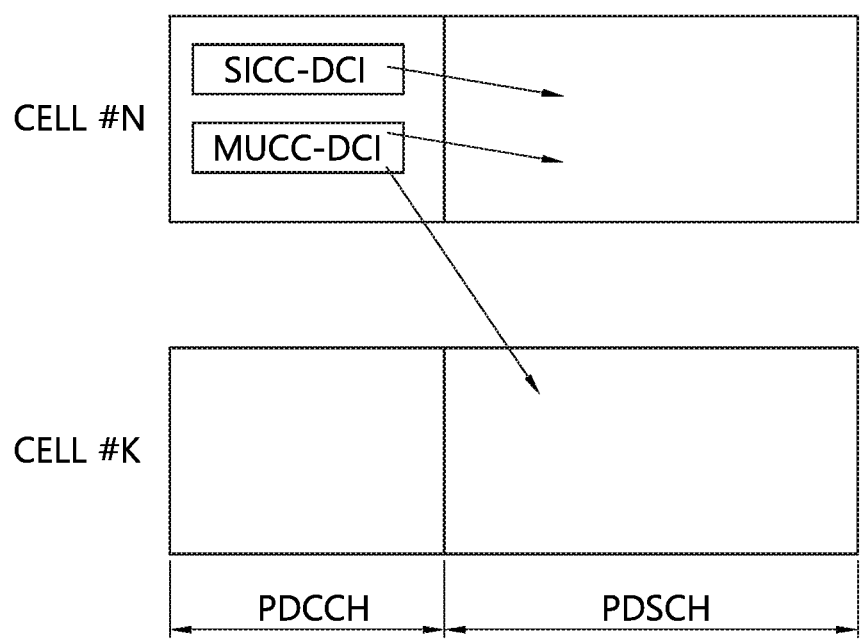
FIG. 13 illustrates an SICC-DCI and a MUCC-DCI.

FIG. 13 illustrates an SICC-DCI and a MUCC-DCI.

Referring to FIG. 13, cells #N and #K represent two of a plurality of cells configured in the same UE. The SICC-DCI transmitted in the cell#N is DCI including scheduling information regarding one cell, e.g., the cell#N. Meanwhile, the MUCC-DCI transmitted in the cell#N is DCI including scheduling information regarding a plurality of cells, e.g., the cells #N and #K. In FIG. 13, an example in which both the SICC-DCI and the MUCC-DCI are transmitted in a PDCCH region, but the present disclosure is not limited thereto and both the SICC-DCI and the MUCC-DCI may be transmitted in an EPDCCH region, or only the MUCC-DCI (or only the SICC-DCI) may be transmitted in the EPDCCH region (or a PDCCH region). Also, in FIG. 12, DL scheduling is illustrated but UL scheduling is not different.

Hereinafter, methods for determining/configuring a length (size) of the SICC-DCI/MUCC-DCI and/or an SS in which the SICC-DCI/MUCC-DCI are transmitted will be described.

[Proposed method #14] A rule may be defined such that SICC-DCI size(s) related to a plurality of previously configured (or signaled) cell(s) as a target of the MUCC-DCI are set (or adjusted) to be equal to a corresponding MUCC-DCI size. That is, if cells as targets of the MUCC-DCI are cells #1, #2, and #3, an SICC-DCI regarding the cell#1, an SICC-DCI regarding the cell#2, and an SICC-DCI regarding the cell#3 are configured to have a length equal to that of the MUCC-DCI. If a SICC-DCI size related to a specific cell as a target of the MUCC-DCI is smaller than the MUCC-DCI size, zero padding may be applied to the SICC-DCI until the SICC-DCI size is equal to the corresponding MUCC-DCI size. Through application of this method, an increase in the number of BD may be prevented when BD is simultaneously performed on the MUCC-DCI and the SICC-DCI.

Also, for example, SICC-DCI size(s) related to a plurality of (predefined (or signaled)) cells(s) as a target of the MUCC-DCI may be adjusted to a longest size or a shortest size among the SICC-DCI size(s) related to the plurality of corresponding cell(s). Or, a rule may be defined such that SICC-DCI size(s) related to a plurality of (predefined (or signaled)) cells(s) as a target of the MUCC-DCI are configured to be equal to a SICC-DCI size related to a previously configured (or signaled) specific cell or a previously configured (or signaled) DCI size. Through application of this method, an increase in the number of BD required for BD of SICC-DCI(s) related to a plurality of (previously configured (or signaled)) cell(s) as a target of the MUCC-DCI on one subframe may be prevented.

[Proposed method #15] The SICC-DCI size(s) related to a plurality of previously configured (or signaled) cell(s) as a target of the MUCC-DCI may be transmitted on a single common search space (or a shared SS).

The corresponding shared SS may be configured in a cell having lowest (or highest) CIDX (or SCIDX), a previously configured (or signaled) specific cell, or a cell configured for PUCCH transmission, among the plurality of (previously configured (or signaled)) cell(s) as a target of the MUCC-DCI.

Or the shared SS may be configured on the basis of a previously configured (or signaled) CIF value (and/or RNTI value), rather than CIDX (or SCIDX or CIF value) of the cell for which the shared SS is configured) (please refer to the aforementioned [proposed method #1]).

Also, for example, a CIF may be newly defined in the SICC-DCI related to a specific cell as a target of the MUCC-DCI transmitted in the corresponding shared SS, and also, the corresponding CIF value may be defined as a CIDX (or SCIDX) of the specific cell (or a CIF value (re)mapped according to the [proposed method #12]/[proposed method #13].

Also, for example, the corresponding MUCC-DCI may be transmitted (together) in the shared SS in which the SICC-DCI(s) related to the plurality of (previously configured (or signaled)) cell(s) as a target of the MUCC-DCI.

Here, for example, the corresponding MUCC-DCI may be blind-decoded on the basis of a previously (newly) configured or signaled RNTI value unlike the SICC-DCI blind-decoded on the basis of a C-RNTI, or may be blind-decoded on the basis of the C-RNTI like the SICC-DCI.

Also, for example, the MUCC-DCI may be transmitted in an SS of a predefined (or signaled) different cell, rather than in the shared SS in which the SICC-DCI(s) related to a plurality of (predefined (or signaled)) cell(s) as a target of the MUCC-DCI, or may be transmitted in an SS configured on the basis of a previously (newly) defined (or signaled) CIF value (and/or RNTI value), rather than a CIDX (or SCIDX or CIF value) of the cell in the cell for which the corresponding shared SS has been configured.

Also, for example, the MUCC-DCI may be transmitted in an SS of a cell having a lowest (or highest) CIDX (or SCIDX) (or an SS of a predefined (or signaled) specific cell or an SS of a cell for which PUCCH transmission has been configured), among a plurality of predefined (or signaled) cell(s) as a target of the MUCC-DCI.

Also, for example, the MUCC-DCI may be transmitted in an SS of a predefined (or signaled) different cell, rather than the plurality of predefined (or signaled) cell (s) as a target of the MUCC-DCI.

Here, in another example, the corresponding different cell in which the MUCC-DCI is transmitted may be designated (or interpreted) as an MUCC-DCI transmission-dedicated cell (hereinafter, referred to as "CELL#MX"). Also, for example, the MUCC-DCI(s) transmitted in the CELL#MX may also be transmitted in (CELL#MX) SS(s) configured on the basis of cell group index(s) as a target of the corresponding MUCC-DCI(s).

[Proposed method #16] AL candidate configuration related to MUCC-DCI and SICC-DCI blind decoding (performed in one subframe (according to the aforementioned [proposed method #12] to [proposed method #15]) and/or the number of BD per AL may be configured to be different.

The proposed method #16 considers that the MUCC-DCI (payload) size may be generally greater than a SICC-DCI (payload) size. Through application of the proposed method #16, it is possible to adaptively configure AL candidates in consideration of the MUCC-DCI (payload) size and/or set the number of BD of each AL, and eventually, reliability of MUCC-DCI transmission may be increased.

In a specific example, AL candidates related to SICC-DCI and MUCC-DCI blind decoding may be ({AL 1, AL 2, AL 4, AL 8}, {AL 4, AL 8}) or ({AL 1, AL 2, AL 4, AL 8}, {AL 2, AL 4, AL 8, AL 16}). In the mark ({ }, { }), the former { } indicates an AL candidate of the SICC-DCI and the latter { } indicates an AL candidate of the MUCC-DCI. This may be interpreted such that the MUCC-DCI is blind-decoded on the basis of AL candidates higher than those of the SICC-DCI. Or, AL candidates related to SICC-DCI and MUCC-DCI blind decoding may be ({AL 1, AL 2, AL 4, AL 8}, {AL 1, AL 2}). This may be interpreted such that the MUCC-DCI is blind-decoded on the basis of AL candidates lower than those of the SICC-DCI.

Also, in another example, (some or all of) the number of BD of predefined (or signaled) AL(s) lower (than those of the SICC-DCI) may be re-allocated to the higher number of BD of AL(s)

In a specific example, in cases where BD number is re-allocated in a situation in which the number of BD of each 'AL {1, 2, 4, 8}' related to the SICC-DCI is defined as 'BD {6, 6, 2, 2}', the number of BD of each 'AL {1, 2, 4, 8}' related to the MUCC-DCI may be changed to 'BD {4, 4, 4, 4}' (that is, the number of BD as twice regarding the existing AL '1' is re-allocated as AL '4' and the number of BD as twice regarding the existing AL '2' is re-allocated as AL '8'). Or, the number of BD of each 'AL {1, 2, 4, 8}' may be changed to 'BD {2, 6, 6, 2}' (that is, the number of BD as four times of the existing AL '1' is re-allocated as AL '4') or may be changed to 'BD {0, 6, 6, 4}' (that is, in the number of BD as a total of six times of the existing AL, the number of BD as four times is re-allocated as AL '4' and the number of BD as twice is re-allocated to AL '8'.

Also, in another example, to ensure reliable transmission/reception of the MUCC-DCI, (MUCC-DCI detection-related) minimum AL value and/or the number of (E)REGs forming one (E)CCE, and the like, may be (re)defined. In a specific example, in a situation in which the number of BD of each 'AL {1, 2, 4, 8}' is defined as 'BD {6, 6, 2, 2}', when the rule is applied, the minimum AL value is increased from '1' to '2', whereby the AL set having the number of BD of 'BD {6, 6, 2, 2}' may be changed to 'AL {2, 4, 8, 16}'. It may be configured such that (total) number of BD is maintained in cases where it is sufficient to support a plurality of AL(s) having a relatively large amount of resource in an (E)PDCCH. Or, an Al set having the number of BD of 'BD {3, 3, 1, 1}' may be changed to 'AL {2, 4, 8, 16}'. That is, it may be configured such that (total) number of BD is reduced (to half) in cases where it is not sufficient to support a plurality of AL(s) having a relatively large amount of resource in the (E)PDCCH.

Also, in another example, when the rule is applied, the number of (E)REGs forming one (E)CCE may be changed from '4' to '8'.

[Proposed method #20] Scheduling information based on the DCI format 1A related to a plurality of previously configured (or signaled) cell(s) according to (some of all) of the aforementioned proposed methods (e.g., according to the [proposed method #12] to [proposed method #16] is transmitted through (one) MUCC-DCI (hereinafter referred to as "MUCC-DCI 1A"), a DCI format 0 size (i.e., SICC-DCI) related to corresponding each cell may be configured to be smaller than a DCI format 1A size (i.e., SICC-DCI) related to each cell (through predefined rule or signaling)

Meanwhile, in the case of existing LTE system, the DCI format 0 size and DCI format 1A size (transmitted in the same SS) related to a specific cell are always equal. That is, among the DCI format 0 and the DCI format 1A, a DCI format having a (relatively small size) is adjusted to a DCI format having a (relatively) large size through zero padding.

By applying the proposed method, a probability of DCI format 0 false detection related to the plurality of cell(s) configured by the MUCC-DCI 1A. Here, for example, the DCI format 0 size may be reduced by omitting previously defined (or signaled) field(s) (e.g., a "FLAG FOR FORMAT0/FORMAT1A DIFFERENTIAION' field, a field for differentiating DCI format 0/1A.

[Proposed method #21] When the [proposed method #20] is applied (or when the UE receives (/detects) a DCI format 1A (i.e., SICC-DCI) related to specific cell(s) in which MUCC-DCI 1A is configured (in cases where the [proposed method #20] is applied (or regardless of application of the [proposed method #20]), the UE may regard the corresponding received(/detected) DCI format 1A (i.e., SICC-DCI) as false detection.

Also, in another example, a rule may be defined such that, if the UE simultaneously receives (/detects) the DCI format 1A (i.e., SICC-DCI) related to the specific cell(s) in which the MUCC-DCI 1A is established, and the MUCC-DCI 1A, the UE may regard the corresponding received (/detected) DCI format 1A (i.e., SICC-DCI) (and/or the MUCC-DCI 1A) as false detection and discard the MUCC-DCI 1A and the DCI format 1A, or discard only the DCI format 1A and regard the MUCC-DCI 1A as valid or may discard only the MUCC-DCI 1A and regard the DCI format 1A as valid.

[Proposed method #23] The MUCC-DCI may be limitedly used for the purpose of transmitting only DL grant(s) (rather than (UL grant(s) related to a plurality of previously configured (or signaled) cell(s)), through one DCI (or control channel). This obtains a reduction in BD.

In another example, the MUCC-DCI may be limitedly used for the purpose of transmitting only UL grant(s) (rather than (DL grant(s) related to a plurality of previously configured (or signaled) cell(s)), through one DCI (or control channel). This also obtains a reduction in BD.

[Proposed method #24] In order to reduce "false detection probability" related to DCI format (reception), CRC size extension may be considered. The corresponding "CRC size extension" may be limitedly applied only to DL grant(s) (rather than UL grant(s)). Or, the "CRC size extension" operation may be limitedly applied only to UL grant(s) (rather than (DL grant(s)).

Figure 14:
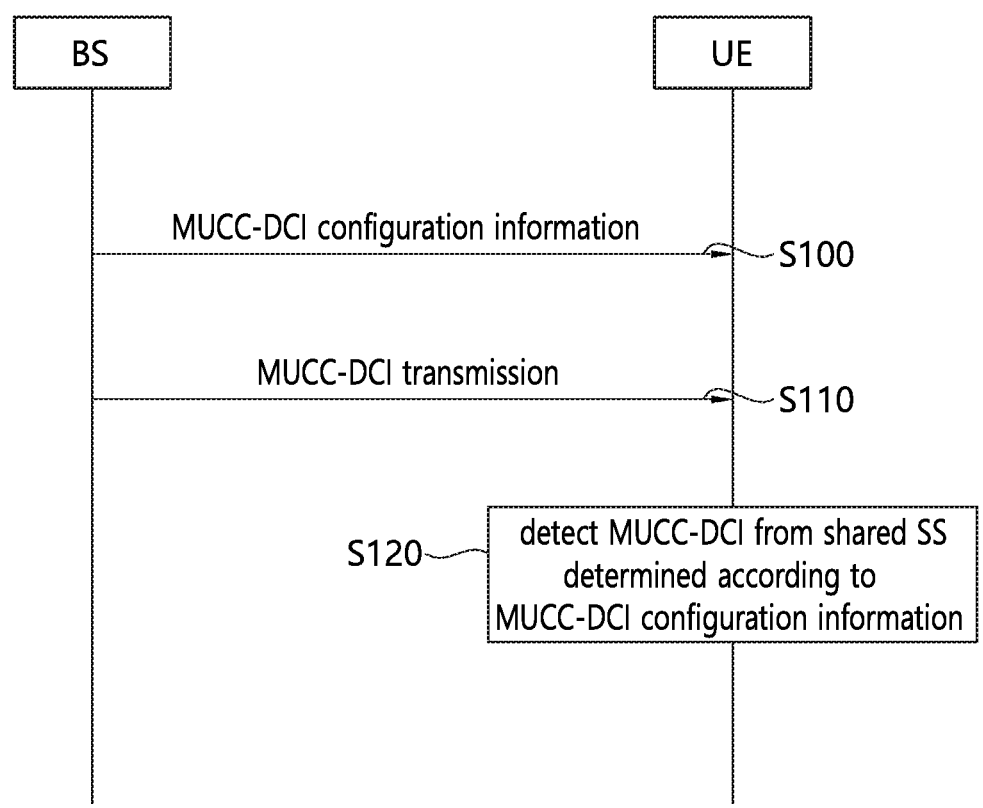
FIG. 14 illustrates an operation method of a UE when the proposed method #14, proposed method #15, proposed method #16, proposed method #20, proposed method #21, proposed method #23, and proposed method #24 described above are applied.

FIG. 14 illustrates an operation method of a UE when the proposed method #14, proposed method #15, proposed method #16, proposed method #20, proposed method #21, proposed method #23, and proposed method #24 described above are applied.

Referring to FIG. 14, the BS provides MUCC-DCI configuration information to the UE (S100). For example, for the MUCC-DCI configuration information, at least one of the following matters may be configured.

1) A size of the SICC-DCI related to a plurality of cells as a target of the MUCC-DCI is configured to be equal to a size of the MUCC-DCI (please refer to the proposed method #14)

2) A cell and a search space in which the MUCC-DCI can be transmitted are configured (please refer to the proposed method #15)

3) An aggregation level (AL) candidate related to blind decoding (BD) regarding the MUCC-DCI and the SICC-DCI performed on one subframe is configured and/or the number of BD for each AL is set (please refer to the proposed method #16)

For example, the MUCC-DCI configuration information may inform about a serving cell in which the shared SS is positioned, among a plurality of serving cells.

The BS transmits the MUCC-DCI to the UE (S110). Here, the BS may transmit the MUCC-DCI in consideration of a cell to be configured for the UE through the MUCC-DCI information, an SS, a configuration of an AL candidate, setting the number of BD, and the like. As described above, single MUCC-DCI may include a plurality of pieces of control information for scheduling one serving cell.

The UE detects/monitors the MUCC-DCI from the shared SS determined according to the MUCC-DCI configuration information (S120). Rules/configurations to be considered in detecting/monitoring the MUCC-DCI have already been described above in the proposed methods #20, #21, #23, and #24.

For example, the MUCC-DCI and the SICC-DCI, DL control information for scheduling one serving cell may be configured to have the same bit size in the shared SS. Also, for example, when the MUCC-DCI is used only for DL grant, monitoring for detecting UL grant may be unnecessary.

Also, if a CRC size of the MUCC-DCI is increased, relative to the existing SICC-DCI, the MUCC-DCI may be monitoring in consideration of the increase in the CRC size of the MUCC-DCI. Also, the UE may blind-decode only the MUCC-DCI which may include scheduling information related to a plurality of serving cells or may blind-decode both the MUCC-DCI and the SICC-DCI in the shared SS.

Al candidates when blind-decoding is performed on the MUCC-DCI and AL candidates when blind decoding is performed on the SICC-DCI, DL control information for scheduling one serving cell may be configured to be different. The number of BD in each AL when blind-decoding is performed on the MUCC-DCI and the number of BD in each AL when blind decoding is performed on the SICC-DCI may be set to be different. In each AL, the number of BD previously determined for the MUCC-DCI may be reset/reallocated. Details thereof have described above (e.g., the proposed method #16). Also, blind decoding may be performed on the premise that a cyclic redundancy check (CRC) longer than the SICC-DCI, DL control information for scheduling one serving cell, can be added to the MUCC-DCI.

Hereinafter, a method for effectively transmitting eIMTA DCI will be described. The eIMTA refers to a case where TDD UL-DL configuration of each cell is different in a state in which cells operating by TDD are aggregated. When cell(s) more than the existing case operate in the eIMTA mode in an environment in which cell(s) more than the existing 5 cells are configured through CA, a method for effectively transmitting a (corresponding eIMTA cell(s)-related) eIMTA DCI is required.

For example, the (corresponding eIMTA cell(s)-related) eIMTA DCI may be transmitted through an SS of a predefined (or signaled) cell (e.g., Pcell common search space (CSS) or through DL cell (C)SS interworking with a cell_PUCCH.

For example, through application of the following method, (1) a problem that only a limited number of UL-DL configuration indicators (e.g., 3 bits) are transmitted through (one) eIMTA DCI and/or (2) a problem of congestion of an SS (e.g., Pcell CSS or DL cell (C)SS interworking with the cell_PUCCH) of a predefined (or signaled) specific cell in which the eIMTA DCI is transmitted, and the like, may be alleviated.

Also, for example, the [proposed method #19] is limitedly applied only to a case where a massive CA mode in which more than 5 cells are aggregated is configured, a case where (eIMTA) cell(s) (or (eIMTA) Lcell(s), (eIMTA) Ucell(s), or (eIMTA) Lcell(s)/Ucell(s)) are configured to be equal to or greater than a predefined (or signaled) number (or a case where configured (eIMTA) cell(s) (configured (eIMTA) Lcell(s), configured (eIMTA) Ucell(s), or configured (eIMTA) Lcell(s)/Ucell(s)) are configured to be equal to or greater than a predefined (or signaled) number), and/or a case where activated (eIMTA) cell(s) (activated (eIMTA) Lcell(s), activated (eIMTA) Ucell(s), or activated (eIMTA) Lcell(s)/Ucell(s)) are configured to be equal to or greater than a predefined (or signaled) number.

Here, for example, a rule may be defined such that the existing (REL-12 LTE) operation is applied to a case where the massive CA mode is not configured, a case where (eIMTA) cell(s) ((eIMTA) Lcell(s), (eIMTA) Ucell(s), or (eIMTA) Lcell(s)/Ucell(s)) are configured to be smaller than a predefined (or signaled) number, a case where configured (eIMTA) cell(s) (configured (eIMTA) Lcell(s), configured (eIMTA) Ucell(s) (or configured (eIMTA) Lcell(s)/Ucell(s)) are configured to be smaller than a predefined (or signaled) number), and/or a case where activated (eIMTA) cell(s) (activated (eIMTA) Lcell(s), activated (eIMTA) Ucell(s), or activated (eIMTA) Lcell(s)/Ucell(s)) are configured to be smaller than the predefined (or signaled) number.

[Proposed method #19] A rule may be defined (hereinafter, referred to as "OPTION#A") such that pieces of subframe position information in which related eIMTA DCI is received by eIMTA cell (groups) are (partially or entirely) different, and/or a rule may be defined such that pieces of (eIMTA-)RNTI (hereinafter, referred to as "OPTION#B") information (used for receiving/decoding eIMTA DCI) are (partially or entirely) different. Also, a rule may be defined such that pieces of field position information on eIMTA DCI in which updated UL-DL configuration (of eIMTA cell (group)) is received are (partially or entirely) different, a rule may be defined such that pieces of reconfiguration periodicity information are (partially or entirely) different, and/or a rule may be defined such that cells and/or SS types in which eIMTA DCI is received are (partially or entirely) different.

Here, in an example of a case in which such a rule is applied, different eIMTA DCI reception subframe position information and different (eIMTA-)RNTI information (used for receiving/decoding eIMTA DCI) are configured by eIMTA cell (groups), or a common eIMTA DCI reception subframe position information (between eIMTA cell (groups) and (eIMTA-)RNTI information (used for receiving/decoding eIMTA DCI) different for each eIMTA cell (group) may be configured, or common eIMTA RNTI information (used for receiving/decoding eIMTA DCI) (between eIMTA cell (groups)) and eIMTA DCI reception subframe position information different in eIMTA cell (groups) may be configured.

Also, in another example, a network (or a BS) may inform (configurability) the UE about one applied rule among the OPTION#A rule and the OPTION#B rule through predefined signaling (e.g., higher layer signaling or physical layer signaling) in consideration of factors such as (1) how many UL-DL configuration indicators (e.g., 3 bits) can be (simultaneously) transmitted through (one) eIMTA DCI (under the current system bandwidth) and/or (2) to which degree an SS (e.g., Pcell SS or DL cell (C)SS) interworking with a cell_PUCCH) of a predefined (or signaled) specific cell in which the eIMTA DCI is transmitted is congested, and the like.

Hereinafter, methods for effectively configuring(/signaling) (a maximum number) of blind decoding (BD) per cell based on (some or all of) the foregoing proposed methods will be described.

[Proposed method #25] When TDD cells for which different TDD UL-DL configuration(s) are configured are configured by CA (or when TDD cell(s) and FDD cell(s) are configured by CA), the number of DL subframe (SF) cells may differ by subframes. Thus, in consideration of this, the number of BD related to a specific cell may be independently (or (partially or entirely) differently) set by subframes. When this method is applied, the number of BD related to the UL SF cell(s) may be (re)allocated to DL SF cell(s) at a specific timing.

[Proposed method #26] (In the case of a specific cell (e.g., Scell), the number of (USS) BD may be independently (or (partially or entirely) differently) set by DCI formats. For example, the number of (USS) BD may be independently set for each of a DCI format 2D(/4), a TM-dependent DCI format, and a DCI format 1A(/0), a fallback DCI format. For example, extremely, the number of (USS) BD regarding a specific DCI format (e.g., DCI format 1A/0) related to a specific cell (e.g., Scell) may be set to 0, so that (USS0 monitoring (or BD) may not be performed on the specific DCI format (e.g., the DCI format 1A/0) related to the specific cell (e.g., Scell).

Here, for example, when such a method is applied, a transmission opportunity may be increased or a blocking probability may be lowered by allocating a relatively large number of BD to a DCI format having a relatively large payload size. This results from consideration of a high possibility that a relatively high aggregation level (AL) is used for transmission of a DCI format having a large payload size to ensure reliable transmission.

Also, in another example, since a negative influence (e.g., causing large size PUCCH format TX (transmission)) of DL DCI (format) false detection on a system is relatively large, compared with a case of UL DCI (format) false detection, the number of BD for the DL DCI format and UL DCI format in the case of a specific cell may be independently (or (partially or entirely) differently) set.

[Proposed method #27] The BS may inform about "the number/position of (E)PDCCH candidates of a specific AL" on which BD is actually performed, in a "full bitmap" form.

For example, regarding a USS of a specific cell, it is assumed that the number of BD for AL 1 is 6, the number of BD for AL 2 is 6, the number of BD for AL 4 is 2, and the number of BD for AL 8 is 2. Also, it is assumed that the numbers of (E)PDCCH candidates regarding ALs 1, 2, 4, 8 are sequentially 6, 6, 2, 2. Here, the BS may inform about "the number/position of (E)PDCCH candidates of the specific AL" on which BD is actually performed by a 16-bit bitmap.

For example, when a bitmap of '101000 010100 10 01' is signaled, the UE may actually perform BD on first and third (E)PDCCH candidates, among a total of six (E)PDCCH candidates regarding the AL 1, on second and fourth (E)PDCCH candidates among the total of six (E)PDCCH candidates regarding AL 2, on a first (E)PDCCH candidate among the total of two (E)PDCCH candidates regarding AL 4, and on second (E)PDCCH candidate among the total of two (E)PDCCH candidates regarding AL 8.

[Proposed method #28] Information related to) "the number of (E)PDCCH candidates of a specific AL on which BD is (actually) performed per cell.

For example, such a proposed method may be limitedly used for the purpose of providing (information related to) the number of (E)PDCCH candidates related to a specific AL on an (E)PDCCH per cell. For example, it is assumed that, in a USS of a specific cell, the number of BD for AL 1 is 6, the number of BD for AL 2 is 6, the number of BD for AL 4 is 2, and the number of BD for AL 8 is 2. Here, the BS may provide (information related to) "the number of (E)PDCCH candidates of a specific AL (related to a specific cell) through a 10-bit bitmap. For example, in the 10-bit bitmap, first three bits may represent the number of BD on AL 1, next three bits may represent the number of BD on AL 2, the next two bits may represent the number of BD on AL 4, and the remaining two bits may represent the number of BD on AL 8.

Informing using the bit map is merely illustrative. That is, the BS may inform about the number of (USS) PDCCH candidates or the number of (USS) EPDCCH candidates of each AL of each cell through higher layer signaling such as RRC signaling. Here, the BS may explicitly inform about the number of (USS) PDCCH candidates or the number of (USS) EPDCCH candidates of each AL of each cell or may inform about how many existing (USS) PDCCH candidates or (USS) EPDCCH candidates of each AL of each cell are to be reduced (that is, the number of finally applied (E)PDCCH candidates (of each AL) may be derived through calculation of a reduction rate value (of each AL of each cell) (e.g., "ROUND (reduction rate value*number of existing (USS) (E)PDCCH candidates)".

For example, it is assumed that eight cells (cell#1 to #8) are aggregated to the UE and cross-carrier scheduling is configured so that scheduling information regarding eight cells is transmitted through one cell (cell#1). Here, the number of (USS) BD to be performed on each AL by cells in the USS of the cell#1 may be determined. For example, it is assumed that the number of (USS) BD called $N_K$ is determined on AL#K related to a specific cell#X. $N_K$ may be considered to indicate the number of existing (USS) PDCCH candidates or the number of (USS) EPDCCH candidates.

Here, however, it may be required to reduce the number of partial (USS) BD related to some cells due to a limitation in the number of (USS) BD which can be maximally supported (or performed) (for each subframe) (reported by UE capability) by the UE. In this case, for example, when the [proposed method #28] is applied, it is possible to configure (information related to) the number of (E)PDCCH candidates of each specific AL of an (E)PDCCH USS of optimal (cells) in consideration of a transmission mode of each cell (which affects a payload size of a DCI, for example) and/or a (control) channel state, and the like.

In this case, the BS may provide, to the UE, information indicating how many $N_K$, the number of (USS) BD regarding AL#K related to the cell#X (i.e., the number of (USS) (E)PDCCH candidates), is to be reduced. For example, the information may consist of 2 bits and informs such that "00" indicates 0% of $N_K$ (that is, it indicates absence of (USS) (E)PDCCH candidate for AL#K), "01" indicates 33% of $N_K$, "10" indicates 66% of $N_K$, and "11" indicates 100% of $N_K$ (that is, it is the same as $N_K$). Here, it may be convenient to indicate the finally derived number of (USS) BD (or the number of (USS) (E)PDCCH candidates) as an integer, and thus, the finally derived number of (USS) BD may be determined as a result value obtained by applying a function such as ROUND(/FLOOR/CEIL), and the like, to the value "reduction rate value*number of existing (USS) (E)PDCCH candidates". In this example, only the number of (USS) BD regarding AL#K related to the cell#X is described, but the present disclosure is not limited thereto and the BS may provide the 2-bit information regarding each AL of each cell.

FIG. 15 illustrates an example in which a UE blind-decodes only some (E)PDCCH candidates on the basis of signaled information, among the existing (USS) (E)PDCCH candidates related to a specific cell.

Referring to FIG. 15, it is illustrated that, regarding AL#M related to a specific cell, the number of existing (USS) (E)PDCCH candidates is K but the number of (USS) (E)PDCCH candidates to be actually blind-decoded is derived (or signaled) as "P". For example, the BS may reduce K, the number of (USS) (E)PDCCH candidates related to AL#M of a specific cell, to 33% with 2-bit information, and here, ROUND(K*0.33)=P.

In this case, the UE (actually) performs BD from a first (USS) (E)PDCCH candidate to Pth (USS) (E)PDCCH candidate (sequentially (or in (USS) (E)PDCCH candidates index) ascending order)), among a total of K number of (USS) (E)PDCCH candidates related to AL #M of the specific cell.

Here, in another example, the BS may transfer, to the UE, predefined (additional) signaling (e.g., higher layer signaling or physical layer signaling) (referred to as "ORDER_INDI") to thereby inform about in which manner (/direction) the signaled "P" number of (USS) (E)PDCCH candidates (related to the corresponding specific AL), among the total "K" number of (USS) (E)PDCCH candidates related to the specific AL, is selected.

In a specific example, through ORDER_INDI (e.g., 1 bit), whether the signaled "P" number of (USS) (E)PDCCH candidates (related to the corresponding specific AL), among the total "K" number of (USS) (E)PDCCH candidates related to the specific AL, is selected in ascending order of (USS) (E)PDCCH candidate index (for example, the UE (actually) performs BD from a first (USS) (E)PDCCH candidate to Pth (USS) (E)PDCCH candidate (sequentially (or in (USS) (E)PDCCH candidates index ascending order), or in descending order (for example, the UE (actually) performs BD from the Kth (USS) (E)PDCCH candidate to (K-P+1)th (USS) (E)PDCCH candidate in reverse order (or in (USS) (E)PDCCH candidates index descending order).

Also, in another example, when information regarding the number of (USS) (E)PDCCH candidate(s) related to 'AL 4' and/or 'AL 8' (on which BD is to be (actually) performed) is provided, '(full) bitmap' form (based on the [proposed method #27]) may be exceptionally used. Through this, the number/position of (USS)(E)PDCCH candidates of 'AL 4' and/or 'AL 8' (on which BD is to be (actually) performed), without a change in a size of (related) bitmap (e.g., 2 bits), may be informed in detail (or specifically).

Figure 16:
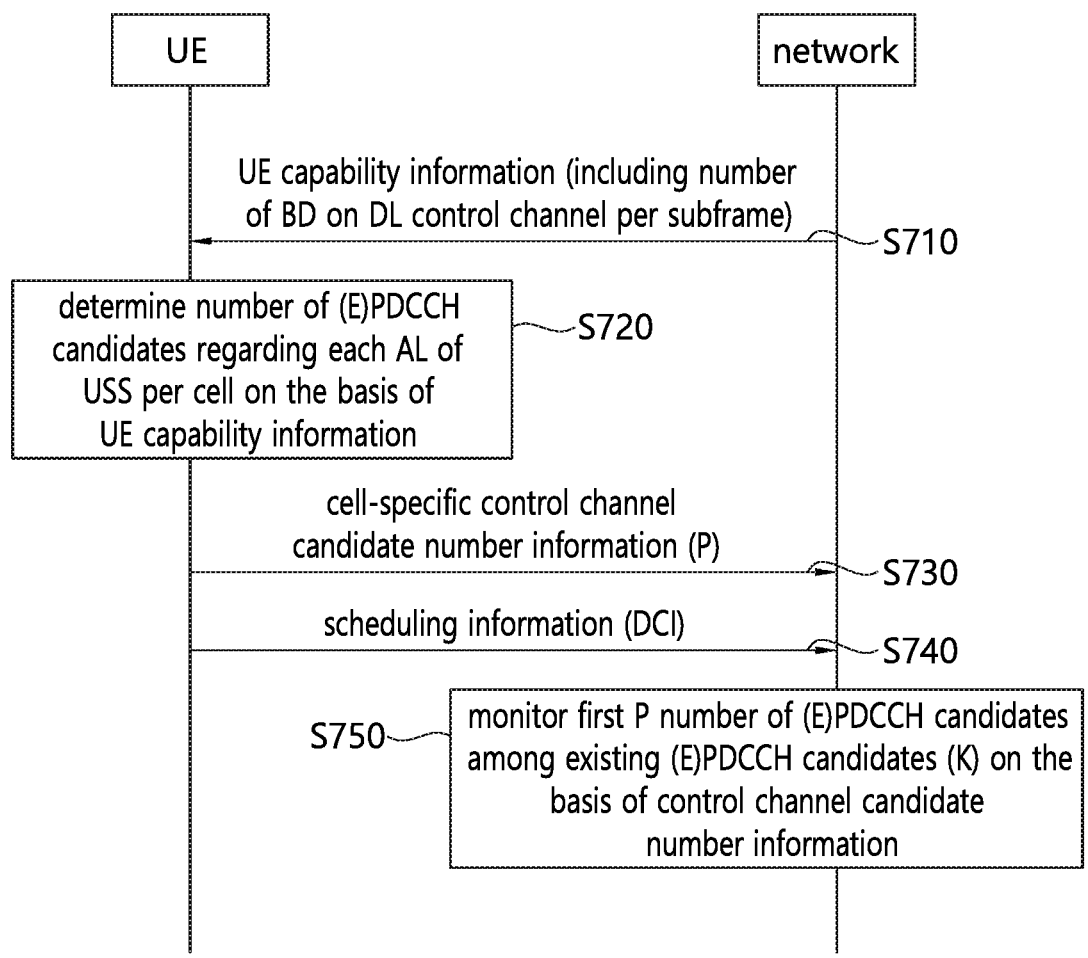
FIG. 16 illustrates an example of applying the aforementioned proposed method #28.

FIG. 16 illustrates an example of applying the aforementioned proposed method #28.

Referring to FIG. 16, the UE reports UE capability information to the BS (S710). As described above, the UE capability information may include 'BD CAPABILITY INFOMRATION' indicating (USS) DL control channel decoding capability (or a (maximum) number) of each subframe. That is, the UE reports capability (or (maximum) number) for decoding (USS) DL control channel by subframes to a network. For example, the UE may report a (maximum) number for blind-decoding a PDCCH and/or an EPDCCH in a UE-specific search space (USS) by subframes to the network. Here, for example, the UE may support aggregation of more than 5 cell (carriers).

The BS determines the number of PDCCH (and/or EPDCCH) candidates regarding each AL of the USS of each cell on the basis of the corresponding UE capability information (S720).

The BS provides control channel candidate number information to the UE (S730).

The control channel candidate number information may be provided to the UE through a higher layer signal such as an RRC message. As described above, the control channel candidate number information indicates the number of control channel candidates regarding each aggregation level (AL) of a search space (SS) per cell.

For example, the control channel candidate number information is information indicating the number of PDCCH candidates and/or EPDCCH candidates regarding each AL in a UE-specific search space (USS) of each cell (which the UE is to (actually) perform) and 2-bit information indicating how many existing (E)PDCCH candidates are to be reduced may be provided by ALs (of the USS per cell). That is, the control channel candidate number information indicates a ratio of the number of first some control channel candidates to be actually monitored by the UE to the number of existing control channel candidates of each AL of the (UE-specific) SS per cell. In cases where the 2 bits are '00', '01', '10', and '11', the ratios are sequentially 0, 0.33, 0.66, and 1. This has been described in detail above.

In this example, it is assumed that, when the number of existing (USS) (E)PDCCH candidates regarding an AL#M of a specific cell is K, (USS) (E)PDCCH candidate number information related to corresponding cell (on the basis of the methods described above) is derived (or signaled) as P (K>P).

The BS transmits scheduling information to the UE (S740). Here, the BS may transmit scheduling information regarding each cell to the UE on the basis of the control channel candidate number information (S730) provided to the UE from the BS.

In order to detect a specific cell-related DCI, the UE monitors first P number of (E)PDCCH candidates among existing (E)PDCCH candidates (K number of candidates) related to the AL#M on the basis of the corresponding cell-related control channel candidate number information (S730) (S750).

[Proposed method #29] A total number of (E)PDCCH candidates on which BD is (actually) performed (without differentiation of ALs per cell may be informed.

Here, in a specific example, it is assumed that, regarding a USS of a specific cell, the number of BD for AL 1 is 6, the number of BD for AL 2 is 6, the number of BD for AL 4 is 2, and the number of BD for AL 8 is 2. In this case, a total number of (E)PDCCH candidates on which BD is (actually) performed may be informed by 4 bits (bitmap). For example, in cases where a total number of (E)PDCCH candidates on which BD is (actually) performed is signaled as 10, 10 (E)PDCCH candidates may be selected and (actually) blind-decoded, sequentially (or in (AL index and/or (E)PDCCH candidate index) ascending order) starting from a first (E)PDCCH candidate, among (the entire) 16 USS (E)PDCCH candidate(s).

[Proposed method #30] A supportable maximum number of BD reported by the UE will be termed "MAX_BDCAPA_NUM", and a (maximum) number of BD related to false detection (occurrence) probability less than a predefined (or signaled) threshold value will be termed "MAX_FALBD_NUM". For example, in a situation in which N number of cells are configured by CA, when a total number of BD calculated according to the existing BD method/rule (that is, 'N*K', here, 'K' is the number of BD per cell according to the existing method (e.g., '32 BD(s) per (S)cell')) is termed "TOTAL_BD_NUM", (some or all of) the following rules may be applied.

(Rule #30-1) BD may be performed on CA (i.e., N) satisfying both 'MAX_BDCAPA_NUM≥TOTAL_BD_NUM' and 'MAX_FALBD_NUM≥TOTAL_BD_NUM' according to "TOTAL_BD_NUM" based on the existing method, without separately (re)setting(/signaling) "the number of BD per cell".

(Rule #30-2) BD may be performed on CA (i.e., N) in which 'MAX_BDCAPA_NUM<TOTAL_BD_NUM' or 'MAX_FALBD_NUM<TOTAL_BD_NUM' according to (re)setting newly signaled (/defined) "number of BD per cell".

[Proposed method #31] For example, in order to signal (/set) a BD value (or (E)PDCCH candidate number) regarding different control channel structure/control channel sets (e.g., the same and/or different ALs (termed "AL type") of PDCCH and EPDCCH (set #1/#2), a limited "N" number of bits (e.g., 2 bits) which are previously set (/signaled) by AL types may be used (OPTION#31-A) That is, in order to allocate a BD value (or the number of (E)PDCCH candidates) of each AL type, "N" number of bits (e.g., 2 bits) may be used.

Table 22 below illustrates a total (maximum) of BD value candidates (or (E)PDCCH candidate number candidates) of each control channel structure/control channel set of each of predefined (or signaled) AL types.

TABLE 22

| Control type | Total (maximum) BD value candidates related to first AL type (or (E)PDCCH candidate number candidates) | Total (maximum) BD value candidates related to second AL type (or (E)PDCCH candidate number candidates) | Total (maximum) BD value candidates related to third AL type (or (E)PDCCH candidate number candidates) | Total (maximum) BD value candidates related to fourth AL type (or (E)PDCCH candidate number candidates) | Total (maximum) BD value candidates related to fifth AL type (or (E)PDCCH candidate number candidates) |
|---|---|---|---|---|---|
| PDCCH one EPDCCH set is configured | 6 4, 6, 8 | 6 2, 4, 5, 6 | 2 1, 2, 3 | 2 1, 2 | 1 |
| Two EPDCCH set(s) are configured | First EPDCCH SET: 2, 3, 4, 5, 6 Second EPDCCH set: 1, 2, 3, 4 | First EPDCCH SET: 2, 3, 4 Second EPDCCH set: 1, 2, 3, | First EPDCCH SET: 1, 2, 3, 4 Second EPDCCH set: 1, 2, 4 | First EPDCCH SET: 1 Second EPDCCH set: 1, 2 | First EPDCCH SET: 1 Second EPDCCH set: 1 |

Here, for example, in the case of PDCCH, "first AL type, second AL type, third AL type, fourth AL type, and fifth AL type" may respectively be defined(/interpreted) as "AL1, AL2, AL4, AL8, and N/A", and also, in the case of EPDCCH, "first AL type, second AL type, third AL type, fourth AL type, and fifth AL type" may respectively be defined(/interpreted) as "AL1, AL2, AL4, AL8, and AL16" (and/or "AL2, AL4, AL8, AL16, AND AL32"). When (OPTION#31-A) described above is applied, for example, if a total (maximum) number of PDCCH/EPDCCH candidates (or BD value) related to different control channel structure/ control channel sets (e.g., PDCCH and EPDCCH (set#1/#2)) configured to the UE is "N" or smaller regarding all the AL(s) within the (specific) AL type, "N" number of bits (within the corresponding (specific) AL type) may be interpreted according to the [proposed method #27] (that is, the method of indicating the "number/position of PDCCH/ EPDCCH candidates of specific AL" on which BD is (actually) performed per cell, in the form of "full bitmap").

Here, for example, such a rule may be applied to a case where "N" is defined(/signaled) as '2' and a total (maximum) BD value (or the number of (E)PDCCH candidates) related to a third AL type of a PDCCH and one previously configured (/signaled) EPDCCH set are respectively set to '2', '2' (and/or '1') (or a case where a total (maximum) BD value (or the number of (E)PDCCH candidates) related to a third AL type of a PDCCH and first/second previously configured (/signaled) EPDCCH set are respectively set to '2', '2/2' (and/or '1/2' and/or '2/1', and/or '1/1')

In such a case, for example, the corresponding 2 bits directly indicate the number/position of PDCCH/EPDCCH candidates related to a third AL type on which BD is (actually) performed (e.g., '00', '01', '10', and '11' respectively directly indicate that 'the number (/position) of PDCCH/EPDCCH candidates on which BD is (actually) performed is not present', 'the number (/position) of PDCCH/EPDCCH candidates on which BD is (actually) performed is one/first PDCCH/EPDCCH candidate', 'number (/position) of PDCCH/EPDCCH candidates on which BD is (actually) performed is one/second PDCCH/EPDCCH candidate', and 'number (/position) of PDCCH/EPDCCH candidates on which BD is (actually) performed is two/first and second PDCCH/EPDCCH candidates').

Meanwhile, for example, if a total (maximum) number of PDCCH/EPDCCH candidates (or BD value) (which are termed ("PDCCH_MAXBDNUM" and "EPDCCH_ MAXBDNUM") related to different control channel structure/control channel sets (e.g., PDCCH and EPDCCH (set#1/#2)) configured to the UE exceeds "N" regarding at least one AL (or all the AL(s) within the (specific) AL type, "N" number of bits (within the corresponding (specific) AL type) may be used for the purpose of indicating a predefined (/signaled) percent value (e.g., it may be configured such that '00', 01', '10', and '11' indicate '0%', '33%', '66%', and '100%', respectively). Here, for example, such a rule may be applied to a case where "N" is defined(/signaled) as '2' and a total (maximum) BD value (or the number of (E)PDCCH candidates) related to a second AL type of a PDCCH and one previously configured (/signaled) EPDCCH set are respectively set to '6', '4'.

In this case, for example, if the corresponding 2 bits are signaled(/set) to '01', the number(/position) of PDCCH/ EPDCCH candidates on which BD is actually performed are 'ROUND(6*0.33)' (or 'FLOOR(6*0.33)' or 'CEILING (6*0.33)'), 'ROUND(4*0.33)' (or 'FLOOR(4*0.33)' or 'CEILING(4*0.33)'), respectively, (in ascending order (or descending or) of PDCCH/EPDCCH candidate index)

Also, in another example, when (OPTION#31-A) described above is applied, for example, if a total (maximum) number of PDCCH/EPDCCH candidates (or BD value) related to different control channel structure/control channel sets (e.g., PDCCH and EPDCCH (set #1/#2)) configured to the UE is "N" or smaller regarding some of the AL(s) within the (specific) AL type, "N" number of bits may also be configured to be interpreted according to the [proposed method #27] (that is, the method of indicating the "number/position of PDCCH/EPDCCH candidates of specific AL" on which BD is (actually) performed per cell, in the form of "full bitmap") only for some AL(s) (within the corresponding (specific) AL type) (e.g., the 'N' number of bits are used for the purpose of indicating a predefined(/ signaled) percent value for the other remaining AL(s) (within the corresponding (specific) AL type).

Table 23 below illustrates an example of a case in which a plurality of previously configured(/signaled) AL type(s) in Table 22 are (re)defined(/(re)integrated) (or bound) to one (representative) AL type.

TABLE 23

| Control type | Total (maximum) BD value candidates related to first AL type (or (E)PDCCH candidate number candidates) | Total (maximum) BD value candidates related to second AL type (or (E)PDCCH candidate number candidates) | Total (maximum) BD value candidates related to third AL type (or (E)PDCCH candidate number candidates) | Total (maximum) BD value candidates related to fourth AL type (or (E)PDCCH candidate number candidates) |
|---|---|---|---|---|
| PDCCH one EPDCCH set is configured | 6 4, 6, 8 | 6 2, 4, 5, 6 | 2 1, 2, 3 | 2 1, 2, 3 |
| Two EPDCCH set(s) are configured | First EPDCCH SET: 2, 3, 4, 5, 6 Second EPDCCH set: 1, 2, 3, 4 | First EPDCCH SET: 2, 3, 4 Second EPDCCH set: 1, 2, 3, | First EPDCCH SET: 1, 2, 3, 4 Second EPDCCH set: 1, 2, 4 | First EPDCCH SET: 1, 2 Second EPDCCH set: 1, 2, 3 |

Table 23 illustrates a case where 'fourth AL type' and 'fifth AL type' in Table 23 are (re)defined(/(re)integrated) to one (representative AL type (e.g., (representative) fourth AL type (Table 23)). Here, for example, a total (maximum) BD value (or (E)PDCCH candidate number) related to the fifth AL type of Table 22 may be set or not. Thus, a (specific) total (maximum) BD value (or (E)PDCCH candidate number) related to the (representative) fourth AL type of Table 23 may include the sum of the total (maximum) BD values (or (EPDCCH candidate numbers) related to partially (or entirely) different AL(s) (CASE #31-1) or may include the sum of the total (maximum) BD values (or (E)PDCCH candidate numbers) related to the same AL(s) (CASE #31-2).

Here, for example, in the case of (CASE #32-1) (and/or (CASE #32-2), when 'N' number of bits are used according to the [proposed method #27] (that is, the method of indicating the "number/position of PDCCH/EPDCCH candidates of specific AL" on which BD is (actually) performed per cell, in the form of "full bitmap"), and/or 'N' number of bits are used for the purpose of indicating predefined(/signaled) percent value (e.g., '00', 01', '10', and '11' are respectively configured to indicate '0%', '33%', '66%', and '100%'), the final number/position of EPDCCH candidates on which BD is (actually) performed may be determined(/selected) after (some or all of) the following interleaving rules are applied.

Hereinafter, for the purposes of description, it is assumed that a total (maximum) BD value (or EPDCCH candidate number) of the (representative) fourth AL type related to one ((re)defined(/(re)integrated)) EPDCCH set includes 'AL8-related two EPDCCH candidate(s) (e.g., AL8_EPDCCHCANDI#1 and AL8_EPDCCHCANDI#2)' and 'AL16-related one EPDCCH candidate(s) (e.g.,) AL16_EPDCCHCANDI#1)'.

(Rule #31-1) For example, a rule may be defined such that (E)PDCCH candidate(s) of a relatively high (or low) AL are positioned ahead.

(Rule #31-2) For example, a rule may be defined such that (E)PDCCH candidate of a relatively low (or high) (E)PDCCH candidate index is positioned ahead. This rule may be used to (re)define a disposition order of the same AL-related (E)PDCCH candidate(s). In cases where interleaving rule(s) based on (Rule #31-1) and/or (Rule #31-2) are applied to the assumed example situation, 'AL16_EPDCCHCANDI#1, AL8_EPDCCHCANDI#1, and AL8_EPDCCHCANDI#2 (that is, a case where the (E)PDCCH candidate(s) of the relatively high AL and the (E)PDCCH candidate of the relatively low (E)PDCCH candidate index are configured to be positioned ahead)' (or 'AL8_EPDCCHCANDI#1, AL8_EPDCCHCANDI#2, AL16_EPDCCHCANDI#1' (that is, a case where the (E)PDCCH candidate(s) of the relatively low AL and the (E)PDCCH candidate of the relatively low (E)PDCCH candidate index are configured to be positioned ahead) are mixed.

[Proposed method #32] if (in the case of applying the [proposed method #31]) two EPDCCH set(s) are configured and a predefined (/signaled) percent value indicated by 'N' number of bits (e.g., 2 bits) (e.g., '00', 01', '10', and '11' may be configured to respectively indicate '0%', '33%', '66%', and '100%') is applied to the sum of a total (maximum) BD value (or EPDCCH candidate number) related to the two EPDCCH set(s), a final number/position of EPDCCH candidates on which BD is (actually) performed may be determined(/selected) after EPDCCH candidate(s) are interleaved according to (some or all of) the following rules.

Hereinafter, for the purposes of description, it is assumed that a total (maximum) BD value (or EPDCCH candidate number) of first/second EPDCCH sets is set to '6 (e.g., FIRSTSET_IDX#1, FIRSTSET_IDX#2, FIRSTSET_IDX#3, FIRSTSET_IDX#4, FIRSTSET_IDX#5, FIRSTSET_IDX#6) and '3 (e.g., 'SECONDSET_IDX#1, SECONDSET_IDX#2, SECONDSET_IDX#3)' and bits of 'N=2' are signaled(/set) to '01'.

(Rule #32-1) It may be defined such that, between EPDDCH set-related EPDCCH candidates having a relatively large "total (maximum) BD value (or EPDCCH candidate number) (which is termed "LARGER_BDNUM")', an EPDCCH candidate(s) related to an EPDCCH set having a relatively small 'total (maximum) BD value (or the EPDCCH candidate number) (which is termed "SMALLER_BDNUM")' are inserted with an offset (/interval) of 'FLOOR(LARGER_BDNUM/SMALLER_BDNUM)' (or 'FLOOR(LARGER_BDNUM/SMALLER_BDNUM)' or 'CEILING(LARGER_BDNUM/SMALLER_BDNUM)') (or a previously signaled(/configured) offset (/interval)).

Here, for example, when such an interleaving rule is applied in the assumed example situation, EPDCCH candidate(s) related to two EPDCCH set(s) are mixed in the form of 'FIRSTSET_IDX#1, FIRSTSET_IDX#2, SECONDSET_IDX#1, FIRSTSET_IDX#3, FIRSTSET_IDX#4, SECONDSET_IDX#2, FIRSTSET_IDX#5, FIRSTSET_IDX#6, SECONDSET_IDX#3', and a final number/position of EPDCCH candidates on which BD is (actually) performed by bits of signaled(/configured) '01' (i.e., '33%') are 'ROUND(9*0.33)(=3)'/'FIRSTSET_IDX#1, FIRSTSET_IDX#2, SECONDSET_IDX#1' (or 'FLOOR(9*0.33) (=2)'/'FIRSTSET_IDX#1, FIRSTSET_IDX#2' or 'CEILING(9*0.33)(=3)'/'FIRSTSET_IDX#1, FIRSTSET_IDX#2, SECONDSET_IDX#1').

When such an interleaving rule is applied in the assumed example situation, EPDCCH candidate(s) related to two EPDCCH set(s) are mixed in the form of 'SECONDSET_IDX#1, FIRSTSET_IDX#1, FIRSTSET_IDX#2, SECONDSET_IDX#2, FIRSTSET_IDX#3, FIRSTSET_IDX#4, SECONDSET_IDX#3, FIRSTSET_IDX#5, FIRSTSET_IDX#6', and a final number/position of EPDCCH candidates on which BD is (actually) performed by bits of signaled(/configured) '01' (i.e., '33%') are 'ROUND(9*0.33)(=3)'/'SECONDSET_IDX#1, FIRSTSET_IDX#1, FIRSTSET_IDX#2' (or 'FLOOR(9*0.33)(=2) '/'SECONDSET_IDX#1, FIRSTSET_IDX#1' or 'CEILING(9*0.33)(=3)'/'SECONDSET_IDX#1, FIRSTSET_IDX#1, FIRSTSET_IDX#2').

Embodiments regarding the aforementioned proposed methods are also included as one of implementation methods of the present disclosure, and thus, they are obviously regarded as a sort of proposed methods. Also, the aforementioned proposed methods may be independently implemented or may also be implemented in the form of combination (or merging) of some proposed methods.

In another example, a rule may be defined such that some (or all) of the aforementioned proposed methods are limitedly applied only to a situation of cross-carrier scheduling (CCS) (and/or self-scheduling (SFS)).

Also, for example, a rule may be defined such that some (or all) of the aforementioned proposed methods are limitedly applied only to a case where Scell (not Pcell) PUCCH transmission mode is configured.

Also, for example, some (or all) of the aforementioned proposed methods may also be extendedly applied between Lcell(s) and Lcell(s) (or between Lcell(s) and Ucell(s) or between Ucell(s) and Ucell(s)). Also, for example, a rule may be defined such that the aforementioned proposed methods (e.g., (maximum) BD (number) reduction method and SS sharing method) are limitedly applied only to a case where a massive CA mode is configured, a case where cell(s) (Lcell(s), Ucell(s), or Lcell(s)/Ucell(s)) are configured to be equal to or greater than a predefined (or signaled) number (or a case where configured cell(s) (configured Lcell(s), configured Ucell(s), or configured Lcell(s)/Ucell(s)) are configured to be equal to or greater than a predefined (or signaled) number), a case where activated cell(s) (activated Lcell(s), activated Ucell(s), or activated Lcell(s)/Ucell(s)) are configured to be equal to or greater than a predefined (or signaled) number, and/or a case where the number of scheduled cell(s) configured in one scheduling cell is equal to or greater than a predefined (or signaled) threshold value.

Here, for example, a rule may be defined such that the existing (REL-12 LTE) operation is applied to a case where the massive CA mode is not configured, a case where cell(s) (Lcell(s), Ucell(s), or Lcell(s)/Ucell(s)) are configured to be smaller than a predefined (or signaled) number, a case where configured cell(s) (configured Lcell(s), configured Ucell(s) (or configured Lcell(s)/Ucell(s)) are configured to be smaller than a predefined (or signaled) number), a case where activated cell(s) (activated Lcell(s), activated Ucell(s), or activated Lcell(s)/Ucell(s)) are configured to be smaller than a predefined (or signaled) number, and/or a case where the number of scheduled cell(s) configured in one scheduling cell is smaller than a predefined (or signaled) threshold value.

Also, for example, the term "CG" in the present disclosure may be interpreted as generally referring to cell(s) interworking with a specific cell (i.e., termed "cell_PUCCH") in which PUCCH transmission is configured (or allowed). Here, for example, one CG may be interpreted as indicating a specific cell_PUCCH and cell(s) in which a (PUCCH-based) UCI is transmitted through the corresponding cell_PUCCH (together), or one CG may be interpreted as indicating only cell(s) in which a (PUCCH-based) UCI is transmitted through a specific cell_PUCCH (but not including the corresponding cell_PUCCH).

Figure 17:
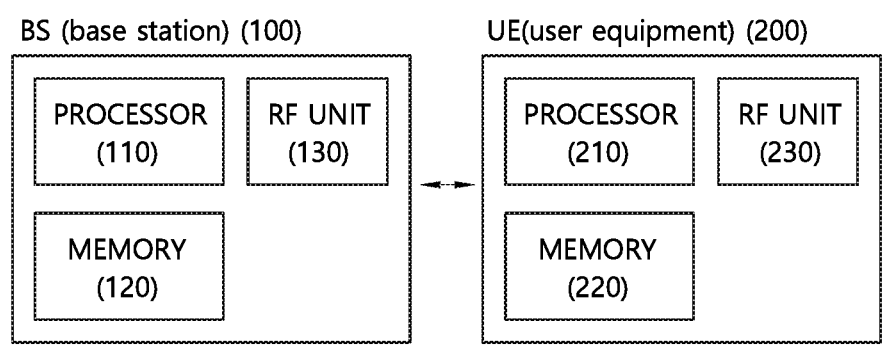
FIG. 17 is a block diagram illustrating a BS and a UE.

FIG. 17 is a block diagram illustrating a BS and a UE.

The BS 100 includes a processor 110, a memory 120, and a radio frequency (RF) unit 130. The processor 110 implements the proposed functions, processes and/or methods. The memory 120 is connected to the processor 110 and stores various types of information for driving the processor 110. The RF unit 130 is connected to the processor 110 and transmits and/or receives a radio signal.

A UE 200 includes a processor 210, a memory 220, and an RF unit 130. The processor 210 implements the proposed functions, processes and/or methods. The memory 220 is connected to the processor 210 and stores various types of information for driving the processor 210. The RF unit 230 is connected to the processor 210 and transmits and/or receives a radio signal.

The processors 110 and 210 includes may include an ASIC (Application-Specific Integrated Circuit), a chip set, a logical circuit, and/or a data processing device. The memories 120 and 220 may include a ROM (Read-Only Memory), a RAM (Random Access Memory), a flash memory, a memory card, a storage medium, and/or any other storage device. The RF units 130 and 230 may include a baseband circuit for processing a radio signal. When the embodiment is implemented by software, the foregoing techniques may be implemented as modules (processes, functions, and the like) performing the foregoing functions. The modules may be stored in the memories 120 and 220 and executed by the processors 110 and 210. The memories 120 and 220 may be provided within or outside the processors 110 and 120 and may be connected to the processors 110 and 210 through a well-known unit.

What is claimed is:

1. A method for operating a user equipment (UE) in a wireless communication system, the method comprising:

receiving a higher layer signal informing a first carrier index field (CIF) value, wherein the first CIF value is used in a first scheduling cell included in a first cell group to indicate a first scheduled cell included in the first cell group;

receiving another higher layer signal informing a second CIF value, wherein the second CIF value is used in a second scheduling cell included in a second cell group to indicate a second scheduled cell included in the second cell group;

monitoring physical downlink control channel (PDCCH) candidates for the first scheduled cell in the first scheduling cell based on the first CIF value informed by the higher layer signal; and monitoring PDCCH candidates for the second scheduled cell in the second scheduling cell based on the second CIF value informed by the other higher layer signal, wherein a number of candidates of the first CIF value is smaller than a number of candidates of a serving cell index of the first scheduled cell, and wherein a number of candidates of the second CIF value is smaller than a number of candidates of a serving cell index of the second scheduled cell.

2. The method of claim 1, wherein the carrier index field comprises 3 bits.

3. The method of claim 1, wherein the higher layer signal is a radio resource control (RRC) message.

4. A user equipment (UE) in a wireless communication system, the UE comprising:

a transceiver; and a processor operatively connected to the transceiver and configured to:

receive a higher layer signal informing a first carrier index field (CIF) value, wherein the first CIF value is used in a first scheduling cell in a first cell group to indicate a first scheduled cell included in the first cell group;

receive another higher layer signal informing a second CIF value, wherein the second CIF value is used in a second scheduling cell included in a second cell group to indicate a second scheduled cell included in the second cell group;

monitor physical downlink control channel (PDCCH) candidates for the first scheduled cell in the first scheduling cell based on the first CIF value informed by the higher layer signal; and monitor PDCCH candidates for the second scheduled cell in the second scheduling cell based on the second CIF value informed by the other higher layer signal, wherein a number of candidates of the first CIF value is smaller than a number of candidates of a serving cell index of the first scheduled cell, and wherein a number of candidates of the second CIF value is smaller than a number of candidates of a serving cell index of the second scheduled cell.

5. The UE of claim 4, wherein the carrier index field comprises 3 bits.

6. The UE of claim 4, wherein the higher layer signal is a radio resource control (RRC) message.

* * * * *